United States Patent [19]

Edelsbrunner et al.

[11] Patent Number: 5,850,229

[45] Date of Patent: Dec. 15, 1998

[54] APPARATUS AND METHOD FOR GEOMETRIC MORPHING

[75] Inventors: Herbert Edelsbrunner; Ping Fu, both of Champaign, Ill.

[73] Assignee: Raindrop Geomagic, Inc., Champaign, Ill.

[21] Appl. No.: 570,614

[22] Filed: Dec. 15, 1995

[51] Int. Cl.$^6$ ........................................................ G06T 1/00
[52] U.S. Cl. .......................... 345/473; 345/423; 345/425; 345/953; 345/955; 382/276
[58] Field of Search .................................... 395/123, 125, 395/127, 128, 139, 173, 175, 955, 953, 952; 345/122, 423, 425, 427, 428, 439, 473, 475, 474, 952, 953, 955; 382/190, 199, 201, 205, 206, 215, 216, 256, 285, 286, 288, 291, 294, 299, 276

[56] References Cited

U.S. PATENT DOCUMENTS

| 4,912,664 | 3/1990 | Weiss et al. ........................ 395/141 X |
| 5,465,323 | 11/1995 | Mallet ...................................... 395/123 |
| 5,553,206 | 9/1996 | Meshkat .............................. 395/119 X |

OTHER PUBLICATIONS

Cecil Jose A. Delfinado and Herbert Edelsbrunner, "An Incremental Algorithm for Betti Numbers of Simplicial Complexes on the 3–Sphere", Computer Aided Geometric Design 12, pp. 771–784 (1995).

David P. Dobkin and Michael J. Laszlo, "Primitives for the Manipulation of Three–Dimensional Subdivisions", Algorithmica 4, pp. 3–32 (1989).

H. Edelsbrunner, "The Union of Balls and Its Dual Shape", Discrete Computer Geometry 13, pp. 415–440 (1995).

Herbert Edelsbrunner, David O. Kirkpatrick and Raimund Seidel, "On the Shape of a Set of Points in the Plane", IEEE Trans. Inform. Theory IT–29, pp. 551–559 (1983).

Herbert Edelsbrunner and Ernst Peter Mucke, "Simulation of Simplicity: A Technique to Cope with Degenerate Cases in Geometric Algorithms", ACM Trans. Graphics 9, pp. 67–104 (1990).

Herbert Edelsbrunner and Ernst P. Mucke, "Three–Dimensional Alpha Shapes", ACM Trans. Graphics 13, pp. 43–72 (1994).

"Handbook of Convex Geometry" vol. A and B, Edited by P.M. Gruber, Chapter 1.2, Mixed Volumes, pp. 43–71, North–Holland, Amsterdam (1993)

John F. Hughes, "Scheduled Fourier Volume Morphing", Computer Graphics 26, pp. 43–46 (1992).

Anil Kaul and Jarek Rossignac, "Solid–Interpolating Deformations: Construction and Animation of PIPS", In Proc. Eurographics, pp. 493–505 (1991).

James R. Kent, Wayne E. Carlson and Richard E. Parent, "Shape Transformation for Polyhedral Objects", Computer Graphics 26, pp. 47–54 (1992).

Carl W. Lee, "Regular Triangulations of Convex Polytopes", ACM and AMS, pp. 443–456 (1991).

(List continued on next page.)

*Primary Examiner*—Joseph H. Feild
*Attorney, Agent, or Firm*—Banner & Witcoff Ltd

[57] ABSTRACT

A method of geometric morphing between a first object having a first shape and a second object having a second shape. The method includes the steps of generating a first Delaunay complex corresponding to the first shape and a second Delaunay complex corresponding to the second shape and generating a plurality of intermediary Delaunay complexes defined by a continuous family of mixed shapes corresponding to a mixing of the first shape and the second shape. The method further includes the steps of constructing a first skin corresponding to the first Delaunay complex and a second skin corresponding to the second Delaunay complex and constructing a plurality of intermediary skins corresponding to the plurality of intermediary Delaunay complexes. The first skin, second skin and plurality of intermediary skins may be visually displayed on an output device.

23 Claims, 14 Drawing Sheets

OTHER PUBLICATIONS

Ernst Peter Mucke, "Shapes and Implementations in Three–Dimensional Geometry", Dept. Computer Sci., Univ. of Illinois at Urbana–Champaign, Illinois, Ph.D. thesis, rept. UIUCDCS–R–93–1836 (1993).

Vishwa Ranjan and Alain Fournier, "Shapes Interpolations with Unions of Spheres", Manuscript of V. Ranjan and A. Fournier, pp. 1–11, Dept. of Computer Science, Univ. of British Columbia (1995).

Edwin H. Spanier, "Algebraic Topology", Chapter Nine, Spectral Sequences and Homotopy Groups of Spheres, pp. 465–521, Springer–Verlag, New York (1966).

Chee–Keng Yap, "Symbolic Treatment of Geometric Degeneracies", In: Proceedings 13th IFIPS, Conference on System Modelling and Optimization, Tokyo, pp. 1–19 (Aug., 1987).

Chee–Keng Yap, "Symbolic Treatment of Geometric Degeneracies", J. Symbolic Comput. 10, pp. 349–370 (1990).

FIG. 13
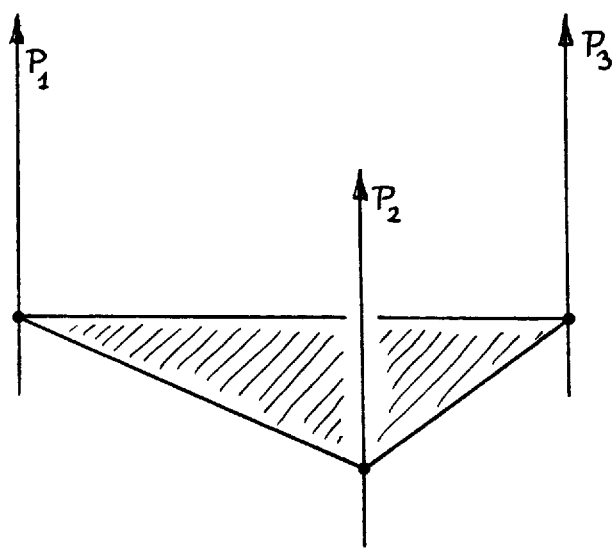
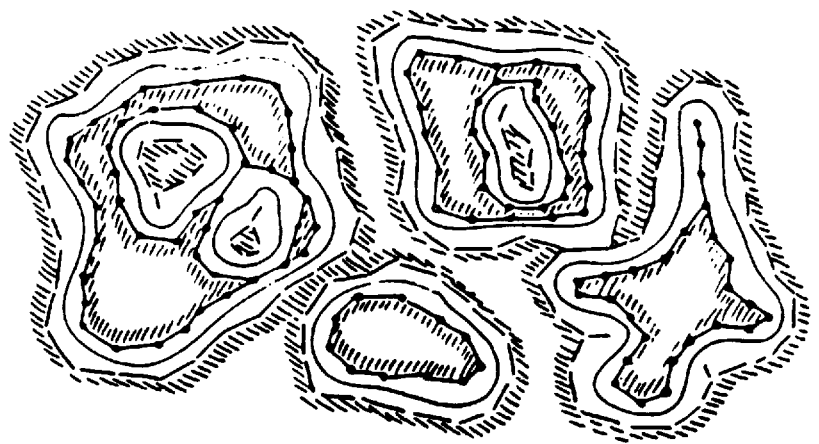
FIG. 14

APPARATUS AND METHOD FOR GEOMETRIC MORPHING

This invention was made with Government support under Contract No. ASC-9200301 by the National Science Foundation. The Government has certain rights in the invention.

A portion of the disclosure of this patent document contains material which is subject to copyright protection. The copyright owner has no objection to the facsimile reproduction by any one of the patent disclosure, as is appears in the Patent and Trademark Office patent files or records, but otherwise reserves all copyright rights whatsoever.

FIELD OF THE INVENTION

The present invention relates generally to a system and method for computerized automatic deformation and metamorphosis of shapes.

BACKGROUND OF THE INVENTION

For several years, movies and television have depicted the concept of visually transforming one object into another object. In a well-known science fiction action movie, a character transforms or melts into a puddle on the floor. Other examples of this principle are music videos and shaving commercials where one face transforms into a different face. The basic principle of gradually transforming one geometric or graphical object to another is known as morphing.

Problems with known morphing techniques include a lack of accurate and rational representation of changes in the objects being morphed, a lack of robust geometric computation in the morphing process, and an inability to accurately morph through topology changes. Past attempts to address these problems have included limiting morphing to simple shapes, permitting inaccurate representations and approximations, and manually changing topology. Other attempts to solve the problems have required users to change input or operation parameters to repeat the transformation process.

SUMMARY OF THE INVENTION

In principal aspect, the present invention relates to a method of geometric morphing between a first object with a first shape and a second object with a second shape. The method includes the steps of generating a first Delaunay complex corresponding to the first shape and a second Delaunay complex corresponding to the second shape, and generating a plurality of intermediary Delaunay complexes defined by a continuous family of mixed shapes corresponding to a mixing of the first shape and the second shape.

The method may also include the steps of constructing a first skin corresponding to the first Delaunay complex and a second skin corresponding to the second Delaunay complex, constructing a plurality of intermediary skins corresponding to the plurality of intermediary Delaunay complexes, and graphically displaying the skins on an output device.

It is thus an object of the present invention to use precise and exact methodology and symbolic perturbation in a morphing process. A further object of the invention is to give priority to geometry considerations over topology considerations. An additional object of the invention is to allow the rational study of intermediate shapes necessary for meaningful scientific observation. It is also an object of the present invention to allow for the use or display of intermediate shapes along a morph path.

Another object of the present invention is a system to produce smooth deformations of shapes. Yet a further object of the present invention is to allow morphing of complex shapes without previously known limitations and inaccuracies. It is also an object of the invention to allow a user to automatically generate a time-series of smoothly changing shapes interpolating between 2 or more given shapes.

These and other objects, features, and advantages of the present invention are discussed or are apparent in the following description of the invention.

BRIEF DESCRIPTION OF THE DRAWINGS

In the detailed description that follows, reference will be made to the drawing comprised of the following figures:

FIG. 13 depicts an arrangement obtained by taking vertices of a simplex and drawing a line through each vertex orthogonal to the affine hull of the simplex; and FIGS. 14–22 relate to the process of forming a skin.

DESCRIPTION OF THE PREFERRED EMBODIMENT

The gradual transformation of one geometric or graphical object to another is referred to as morphing. This specification describes a method based on simplicial complexes in $R^3$ and $R^4$ that produces such a transformation for two 3-dimensional geometric shapes. The method can be extended to allow multiple morphing paths, it can morph between 3 and more shapes, and it generalizes to any fixed number of dimensions. At any moment in time during the process, the changing shape is a proper geometric object whose metric, topological, and combinatorial properties can be monitored by efficient algorithms.

In category theory, a morphism is a map between objects in a category, see [J. J. ROTMAN. *An Introduction to*

*Algebraic Topology.* Springer-Verlag, New York, 1988], and [E. H. SPANIER. *Algebraic Topology.* Springer-Verlag, New York, 1966]. The method referred to as morphing, which recently surfaced in computer graphics, bears little resemblance to these maps, see e.g. [J. F. HUGHES. Scheduled Fourier volume morphing. *Computer Graphics* 26 (1992), 43–46], [A. KAUL AND J. ROSSIGNAC. Solid-interpolating deformations: construction and animation of PIPs. *In "Proc. Eurographics, 1991"*, 493–505], [J. R. KENT, W. E. CARLSON AND R. E. PARENT. Shape transformation for polyhedral objects. *Computer Graphics* 26 (1992), 47–54], and [V. RANJAN AND A. FOURNIER. Shapes interpolation with unions of spheres. Manuscript, 1995]. It is intentionally vague and is associated with the gradual or continuous change of a source to a target object. It is thus related but not restricted to homotopies studied in topology, see e.g. [J. J. ROTMAN. *An Introduction to Algebraic Topology.* Springer-Verlag, New York, 1988] and [E. H. SPANIER. *Algebraic Topology.* Springer-Verlag, New York, 1966].

One considers geometric objects or shapes in two complementing representations: one structural and the other visual. The structure of the shape is captured by a complex, which is the main data structure used by this method. The visual appearance of the shape is based on a smooth surface surrounding the complex.

Figure 1:
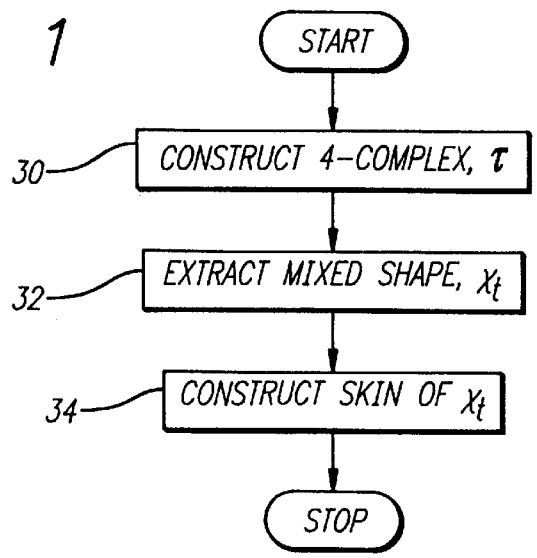
FIG. 1 is a block diagram depicting a method of the preferred embodiment of the invention.
Figure 6:
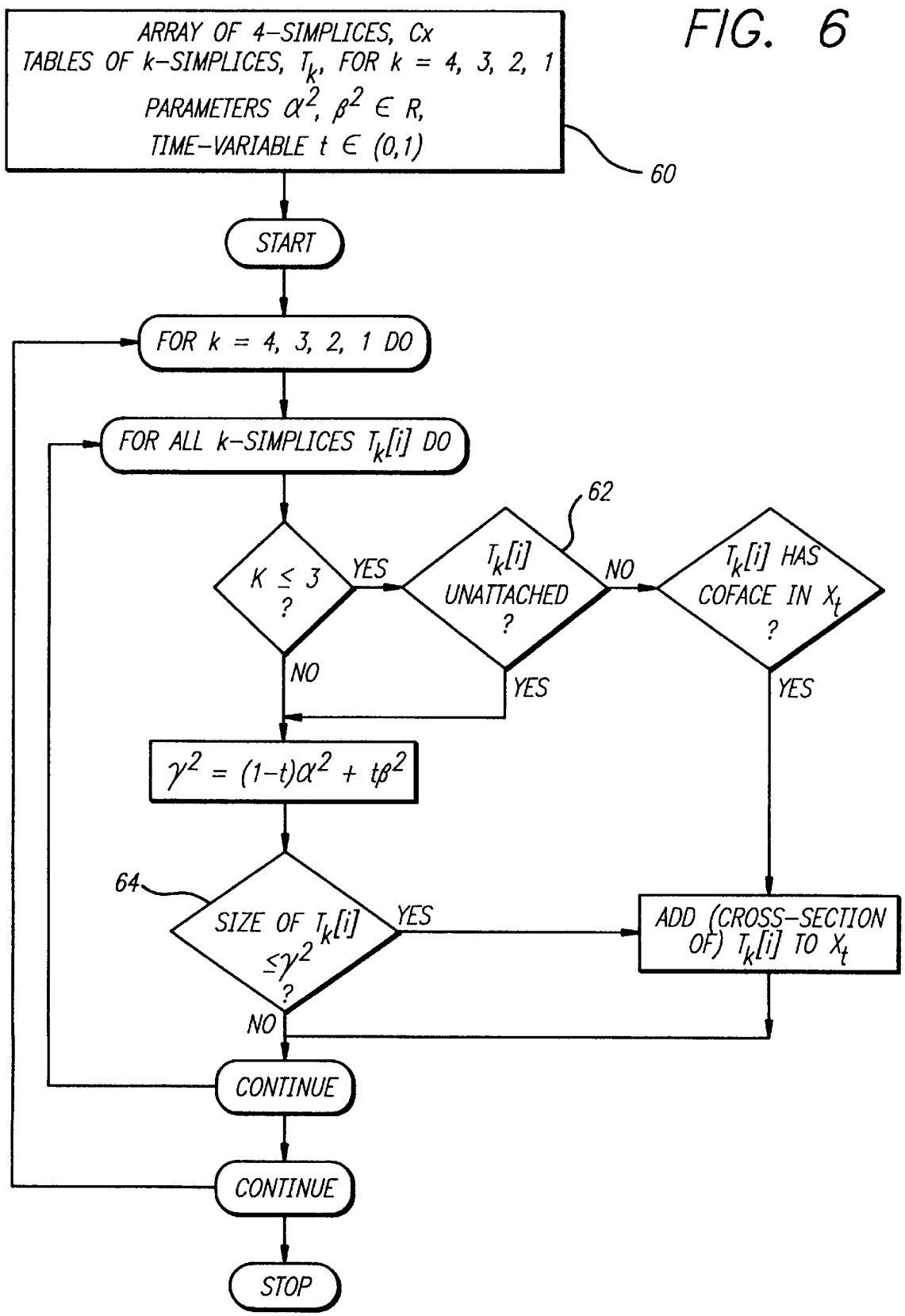
FIG. 6 is a block diagram depicting further details of the step of extracting a mixed shape shown in FIG. 1.
Figure 7:
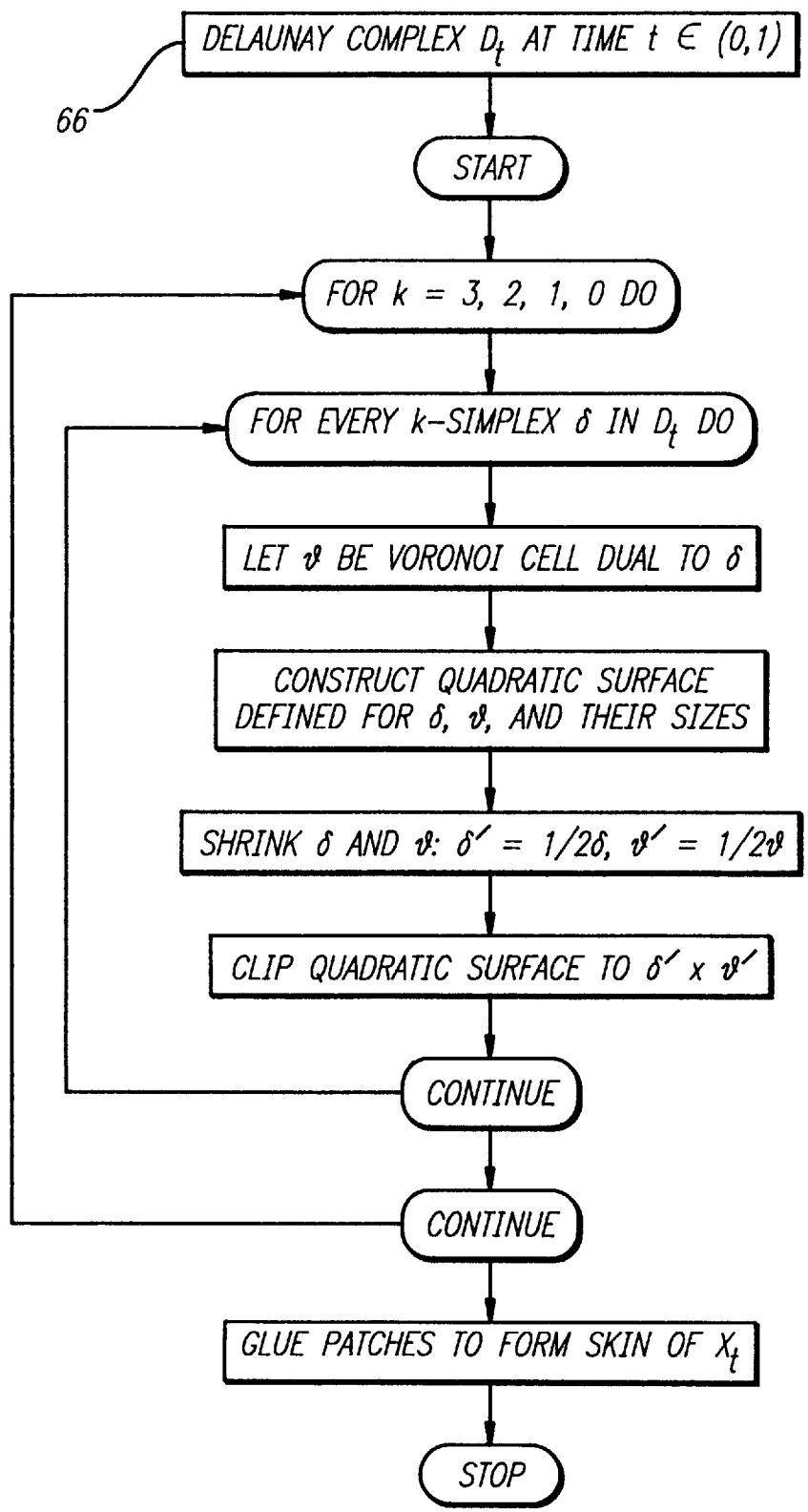
FIG. 7 is a block diagram depicting further details of the step of constructing a skin shown in FIG. 1.

Referring to FIG. 1, generally a first step in the method, as shown at $30_1$, is to construct a 4-complex corresponding to the two shapes to be morphed. As is described in detail later in this specification, this complex is a 4-dimensional weighted Delaunay complex. The next step, as shown in 32, is to extract a mixed shape at a certain time through the process. This step is described in detail later in this specification and in FIG. 6. The step of constructing the skin for the shapes being morphed, including the intermediary mixed shapes, is shown in 34. Further details of this step are depicted in FIG. 7, and a detailed discussion of the skin is also found later in this specification.

Representation and transformation.

The input to the method is a source shape, Y, and a target shape, Z, each represented by an alpha shape or complex. See e.g. [H. EDELSBRUNNER, D. G. KIRKPATRICK AND R. SEIDEL. On the shape of a set of points in the plane. *IEEE Trans. Inform. Theory* IT-29 (1983), 551–559], and [H. EDELSBRUNNER AND E. P. MÜCKE. Three-dimensional alpha shapes. *ACM Trans. Graphics* 13 (1994), 43–72]. The visual appearance is determined by the skin surface as defined later in this specification and in [H. EDELSBRUNNER. Smooth surfaces for multi-scale shape representation. In "Proc. 15th Conf. Found. Software Techn. Theoret.] The following mathematical properties of the skin of an alpha complex $\mathcal{K}$ are essential for its use in morphing:

(i) The body surrounded by the skin has the same homotopy type as $\mathcal{K}$.

(ii) The skin is piecewise quadratic and differentiable everywhere.

(iii) The skin changes continuously with $\mathcal{K}$.

Property (i) allows one to focus the morphing process on the manipulation of the structural shape representation. Properties (ii) and (iii) guarantee that the resulting visual appearance of the shape metamorphism is smooth and visually pleasing.

One of the advantages of alpha complexes over other geometric representations is their natural affinity to non-convexity. Alpha complexes model self-consistent non-convex shapes with ease. Mathematically, the non-convexity of a 3-dimensional alpha complex can be interpreted as the interaction of two convex bodies in 4 dimensions. This idea is fundamental to this method and makes it amenable to standard techniques in convex geometry. See e.g. [P. M. GRUBER AND J. WILLS, EDS. *Handbook of Convex Geometry, volumes A and B.* North-Holland, Amsterdam, 1993].

The process of morphing from Y to Z is defined by a continuous family of shapes $X_t$, $t \in [0,1]$, with $Y=X_0$ and $Z=X_1$. In this method, all shapes $X_t$ are geometrically defined and represented the same way as Y and Z. The methods for constructing the $X_t$ follow the mathematical definition, not the other way round. $X_t$ depends on the alpha complexes of Y and Z. $X_t$ is sometimes called a mixed shape or a mixing of Y and Z in proportions 1—t and t. Definitions are given in the following section.

DEFINITIONS

This section presents definitions, including of alpha shapes and complexes. Mixed shapes are extracted from cross-sections of a 4-dimensional simplicial complex. Referring to FIG. 1, the first step in the method is constructing a 4-complex for the source shape and the target shape, as seen at 30. The method of mixing two complexes in $R^3$ described in this specification has its most natural interpretation in $R^5$, where it concerns the interaction between a convex polytope and a convex parabolic cylinder. Take two 4-dimensional views of this 5-dimensional scenario. One such view considers the interaction between a Minkowski sum of two convex polytopes and the convex paraboloid $\varpi$: $x_4 = \Sigma^3_{i=1} x_i^2$. This can also be interpreted directly in $R^3$ in terms of alpha complexes for points with real weights. First is a general definitions related to complexes. See also [P. J. GIBLIN. *Graphs, Surfaces and Homology.* 2nd edition, Chapman and Hall, London, 1977], [J. J. ROTMAN. *An Introduction to Algebraic Topology.* Springer-Verlag, New York, 1988], and [E. H. SPANIER. *Algebraic Topology.* Springer-Verlag, New York, 1966]. This is followed by a sketchy introduction of alpha complexes in $R^3$ which are then embedded in $R^4$ and $R^5$. [H. EDELSBRUNNER AND E. P. MÜCKE. Three-dimensional alpha shapes. *ACM Trans. Graphics* 13 (1994), 43–72].

Simplices and complexes.

A simplex $\sigma$ is the convex hull of a collection S of affinely independent points. In $R^d$, at most d+1 points can be affinely independent. The dimension of $\sigma$ is dim $\sigma$=card S−1. A k-simplex is a simplex of dimension k. Each subset $T \subseteq S$ defines a simplex $\tau$=conv T, called a face of $\sigma$. $\tau$ is a proper face of $\sigma$ if $0 \leq$ dim $\tau \leq$ dim $\sigma$−1. One calls $\sigma$ a coface of $\tau$. An ordering of a simplex is a permutation of its vertices. The collection of possible orderings is partitioned into two classes, called orientations, so that any two orderings in the same class differ by an even number of transpositions. A vertex or 0-simplex has only one ordering and thus only one orientation. If $\sigma$=conv S and $\sigma'$=conv S' are such that the points in S$\cup$S' are affinely independent then the join of $\sigma$ and $\sigma'$ is $\sigma * \sigma'$=conv (S$\cup$S'). Clearly, dim $\sigma * \sigma'$=dim $\sigma$+dim $\sigma'$+1. One uses the join operation also for orderings of simplices, namely the ordering of $\sigma * \sigma'$ is the concatenation of the two orderings, the one of $\sigma$ followed by the one of $\sigma'$. The join operation is thus commutative for simplices but not for orderings.

A simplicial complex is a collection $\mathcal{K}$ of simplices that satisfies the following two conditions: if $\tau$ is a face of $\sigma$ and $\sigma \in \mathcal{K}$ then $\tau \in \mathcal{K}$, and if $\sigma, \sigma' \in \mathcal{K}$ then $\sigma \cap \sigma'$ is a (possibly empty) face of both. The set of vertices defining the simplices in $\mathcal{K}$ is the vertex set, Vert $\mathcal{K}$. A subcomplex of $\mathcal{K}$ is a simplicial complex $\mathcal{L} \subseteq \mathcal{K}$. The combinatorial closure of a subset $L \subseteq \mathcal{K}$ is the smallest subcomplex Cl $L \subseteq \mathcal{K}$ that contains L. The underlying space of $\mathcal{K}$ is $\cup \mathcal{K} = \cup_{\sigma \in \mathcal{K}} \sigma$. The difference between $\mathcal{K}$ and its underlying space is that $\mathcal{K}$ is a collection of simplices, whereas $\cup \mathcal{K}$ is a subset of $R^d$. The boundary of $\cup \mathcal{K}$, bd $\cup \mathcal{K}$, is the set of points $x \in R^d$ for which every open neighborhood contains points of $\cup \mathcal{K}$ and of its complement. The frontier of $\mathcal{K}$ is Fr$\mathcal{K} = \{\sigma \in \mathcal{K} | \sigma \subseteq \text{bd} \cup \mathcal{K}\}$.

Simplicial complexes are often obtained from combinatorial objects. An abstract simplicial complex, $\mathcal{A}$, is a finite system of sets for which $\tau \subseteq \sigma$ and $\sigma \in \mathcal{A}$ E A implies $\tau \in \mathcal{A}$. The vertex set of $\mathcal{A}$ is Vert $\mathcal{A} = \cup \mathcal{A}$. A simplicial complex $\mathcal{K}$ is a geometric realization of $\mathcal{A}$ if there is a bijection $f$: Vert $\mathcal{A} \to$ Vert $\mathcal{K}$ so that $\sigma \in \mathcal{A}$ iff conv $f(\sigma) \in \mathcal{K}$. Given a finite collection of sets, B, the nerve of B is Nrv B = $\{C \subseteq B | \cap C \neq \phi\}$. Clearly, Nrv B is an abstract simplicial complex. One will use nerves of convex sets to define the complexes used in morphing one shape to another.

Alpha complexes generally.

An alpha complex is a concrete geometric object that is uniquely defined. It consists of vertices, edges, triangles, and tetrahedra describing the shape of a given set of points in space. An alpha complex provides a quantitative and rigorous basis for accurately describe and compute shape at many levels of details in 3-dimensional space. Alpha shapes and complexes are known to those skilled in the art and is set forth in further detail in, for example, H. EDELSBRUNNER AND E. P. MÜCKE. Three-dimensional alpha shapes. *ACM Trans. Graphics* 13 (1994), 43–72] which is expressly incorporated by reference in this patent application. As set forth in that article, alpha complexes are a generalization of the convex hull of a point set. Intuitively, if S is a finite set in $R^3$ and $\alpha$ is a real number between 0 and infinity, the part of space covered by the $\alpha$-complex is a polytope that is neither necessarily convex nor necessarily connected. For $\alpha = \infty$, the $\alpha$-complex exactly covers the convex hull of S. As $\alpha$ gets smaller, the $\alpha$-complex shrinks and may develops cavities. A particular piece of the complex disappears at the time $\alpha$ becomes small enough so that a sphere with radius $\alpha$, or several such spheres, occupy the space of that piece without covering any of the points of S. For example, one can think of $R^3$ filled with styrofoam and the points of S made of a more solid material, such as rock. If one imagines a spherical eraser with a radius $\alpha$, that eraser is omnipresent in the sense that it carves out styrofoam at all positions where it does not enclose any of the sprinkled rocks, that is points of S. The resulting geometric object is the $\alpha$-hull. Its surface is straightened out by substituting straight edges for circular arcs and triangular patches for spherical caps. The resulting object is the space covered by the $\alpha$-complex of S. It is a polytope in a fairly general sense: it can be concave and even disconnected; it can contain 2-dimensional patches of triangles and 1-dimensional strings of edges, and its component can be as small as single point.

Alpha complexes in 3 dimensions.

Let $M \subseteq R^3 \times R$ be a finite set of weighted points in $R^3$. One can think of a weighted point m with coordinates $\mu$; and weight $w_m$ as a ball, $b_m$, with center $z_m = (\mu_1, \mu_2, \mu_3)$ and radius $r_m = \sqrt{w_m}$. Let B = $\{b_m | m \in M\}$ and consider the union, $\cup B = \cup_{m \in M} b_m$. For $w_m < 0$, $b_m$ has imaginary radius and does not contribute to the union. Denote the Euclidean distance between points x, y $\in R^3$ by $|xy|$. The (weighted) Voronoi cell of a point $m \in M$ is $$V_m = \{x \in R^3 | |xz_m|^2 - w_m \leq |x_l| - w_l, l \in M\}.$$

$V_m$ is the intersection of finitely many half-spaces, and $V_m \cap \cup B = V_m \chi b_m$. The Voronoi cells decompose $\cup B$ into convex cells with disjoint interiors. If the points and weights are in general position, the common intersection of i cells is either empty or a convex set of dimension 4–i. It follows a point belongs to at most 4 cells. Define $$N = \{L \subseteq M | \cap_{l \in L} (V_l \cap b_l) \neq \phi\},$$

which is isomorphic to the nerve of the collection of cells $V_m \cap b_m$. When one takes the convex hull of a set of weighted points $L \subseteq M$ one ignores the weights and obtain a convex polytope. If card $L \leq 4$ and the points are in general position then conv L is a simplex in $R^3$. The dual complex of M or B is $$\mathcal{K}(M) = \{\text{conv } L | L \in N\};$$

it is a geometric realization of N [H. EDELSBRUNNER. The union of balls and its dual shape. *Discrete Comput. Geom.* 13 (1995), 415–440]. The dual shape is $\cup \mathcal{K}(M)$.

It will be convenient to grow or shrink the balls in a manner that retains the Voronoi cells. This can be done by uniformly altering the weights of the points as follows. Let $v \in R$ and set $\alpha = \sqrt{v}$. One writes $\alpha \in R^{1/2}$ and mean that $\alpha$ is either a non-negative real or a non-negative real multitude of the imaginary unit. Define $m_\alpha$ with $z_{m\alpha} = z_{m=(\mu_1, \mu_2, \mu_3)}$ and $w_{m\alpha} = w_m + v$. Note that the radius of $m_\alpha$ is $r_{m\alpha} = \sqrt{r_m^2 + \alpha^2}$. The $\alpha$-complex of M is $$\mathcal{K}_\alpha(M) = \mathcal{K}(M_\alpha),$$

where $M_\alpha = \{m_\alpha | m \in M\}$. The $\alpha$-shape of M is $\cup \mathcal{K}_\alpha(M)$. The larger v is, the larger are the balls $b_m$ and the cells $V_m \cap b_m$. It follows that $$\mathcal{K}_{\alpha 1}(M) \subseteq \mathcal{K}_{\alpha 2}(M),$$

if $\alpha_1^2 \leq \alpha_2^2$. In the limit, when $v = \alpha^2$ approaches $+\infty$, the $\alpha$-complex is a geometric realization of the nerve of the collection of Voronoi cells. In this case, the complex is known as the (weighted) Delaunay complex, $D(M)$, of M. In the mathematics and computer science literature, $D(M)$ is also known as the regular triangulation or the coherent triangulation of M. See e.g. [C. W. LEE. Regular triangulations of convex polytopes. In "Applied Geometry and Discrete Mathematics: the Victor Klee Festschrift", ed. P. Gritzmann and B. Sturmfels, ACM and AMS, 1991], and [I. M. GELFAND, M. M. KAPRANOV AND A. V. ZELEVINSKY. *Discriminants, Resultants and Multidimensional Determinants*. Birkhäuser, Boston, Massachusetts, 1994].

Lifting to 4 dimensions.

One interprets alpha complexes in $R^4$. For a point $m \in M$, define $$m^+ = (\mu_1, \mu_2, \mu_3, \mu_4) \in R^4,$$

with $\mu_4 = \Sigma_i^3 = 1 \mu_i^2 - w_m$. For zero weight, $m^+$ is the vertical projection of $(\mu_1, \mu_2, \mu_3, 0)$ to the paraboloid $\varpi$. A non-zero weight implies a vertical displacement from the point of projection. One defines $M^+ = \{m^+ | m \in M\}$. It can be shown that the simplices of $D(M)$ are projections of the lower faces of conv $M^+$, that are faces contained in supporting hyperplanes so that the half-space of the form $$x_4 \geq \sum_{i=1}^{3} a_i x_i + a_4,$$

contains conv $M^+$. The projection of a lower face belongs to $\mathcal{K}(M)$ iff there is a supporting hyperplane bounding a half-space that contains the entire paraboloid $\varpi$.

The 4-dimensional interpretation illustrates the difference and similarity between the dual complex and the α-complex of M. Corresponding points differ only by their weights, and the weight difference is the same for each point: $w_{m\alpha} - w_m = v$ for each $m \in M$. It follows that conv $M_\alpha^+$ is conv $M^+$ translated along the $x_4$-axis. All projections remain unchanged, only the condition when a simplex belongs to the selected complex is affected.

More specifically, a non-vertical hyperplane $h: x_4 = 2\Sigma_{i=1}^{3} a_i x_i - \alpha_4$ is tangent to $\varpi$ iff $\alpha_4 = \Sigma_{i=1}^{3} \alpha_i^2$; the point of tangency is $h \cap \varpi = (\alpha_1, \alpha_2, \alpha_3, \Sigma_{i=1}^{3} \alpha_i^2)$. One defines $|h| = \Sigma_{i=1}^{3} \alpha_i^2 = \alpha_4$, which vanishes iff h is tangent to $\varpi$. In general, $|h|$ is the signed vertical distance from h to its translate tangent to $\varpi$; it is negative if h is below and positive if h is above this translate. For a simplex $\tau \in D(M)$ let $\tau^+$ be the corresponding lower face of conv $M^+$, and define its size as $$|\tau| = \min_{\tau^+ \subseteq h} |h|.$$

$|\tau| \leq 0$ is a necessary condition for $\tau \in \mathcal{K}(M)$, but it is not sufficient. Let $h_\tau$ be the hyperplane containing $\tau^+$ with $|h_\tau| = |\tau|$. If $h_\tau$ supports conv $M^+$ then $|\tau| \leq 0$ is also sufficient for $\tau \in \mathcal{K}(M)$. Otherwise, at least one coface $\sigma^+$ of $\tau^+$ lies vertically below $h_\tau$, and one says a hides τ. In this case, $\tau \in \mathcal{K}(M)$ iff at least one coface of τ belongs to $\mathcal{K}(M)$.

To understand the relationship between conv $M^+$ in $R^4$ and $\mathcal{K}(M)$ in $R^3$ it is important to distinguish between faces with and without hiding cofaces. A simplex $\sigma \in D(M)$ is unattached if it has no hiding coface, and it is attached if it has at least one hiding coface. Note that all 3-simplices are unattached simply because they do not have proper cofaces.

The selection for the α-complex, $\mathcal{K}_\alpha(M)$, is the same as for the dual complex, except that sizes are decremented. An unattached simplex $\tau \in D(M)$ belongs to $\mathcal{K}_\alpha(M)$ off $|\tau| - \alpha^2 \leq 0$, or equivalently $|\tau| \leq \alpha^2$. An attached simplex belongs to $\mathcal{K}_\alpha(M)$ iff at least one coface belongs to $\mathcal{K}_\alpha(M)$. The larger $v = \alpha^2$, the more simplices of $D(M)$ belong to $\mathcal{K}_\alpha(M)$. This is consistent with (1).

The morphing path is described by a sequence of dual complexes corresponding to Minkowski sums formed between the 4-dimensional convex polytope of the source shape and that of the target shape. This is explained in $R^5$. Embedding in 5 dimensions.

Figure 9:
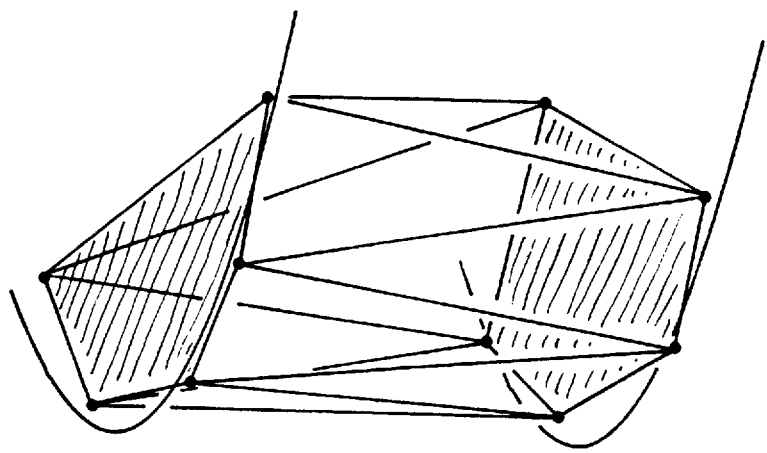
FIG. 9 depicts Delaunay complexes of point sets in one dimension.

Let $P, Q \subseteq R^3 \times R$ be finite sets of 3-dimensional points with real weights. Let $\alpha^2, \beta^2 \in R$ so $\mathcal{K}_\alpha(P)$ represents the source shape Y and $\mathcal{K}_\beta(Q)$ represents the target shape Z. For $p \in P$ with $z_p = (\phi_1, \phi_2, \phi_3) \in R^3$ and weight $w_p \in R$, define $p^* = (\phi_1, \phi_2, \phi_3, \phi_4, \phi_5)$, with $\phi_4 = \Sigma_{i=1}^{3} \phi_i^2 - w_p$ and $\phi_5 = 0$. Similarly, for $q \in Q$ with $z_q = (\psi_1, \psi_2, \psi_3)$ and weight $w_q$, define $q^* = (\psi_1, \psi_2, \psi_3, \psi_4, \psi_5)$, with $\psi_4 = \Sigma_{i=1}^{3} \psi_i^2 - w_q$ and $\psi_5 = 1$. $P^*$ and $Q^*$ are the sets of points $p^*$ and $q^*$, respectively. The convex polytope $$\Xi = \text{conv}(P^* \cup Q^*),$$

is like a 5-dimensional drum connecting two parallel 4-dimensional convex polytopes, conv $P^*$ and conv $Q^*$, see FIG. 9. As shown in FIG. 9, if P, Q are point sets in 1 dimension, the lifting maps their Delaunay complexes to convex polygons in 2 dimensions. The two polygons are embedded in parallel planes in 3 dimensions, and a point moving on the morphing path corresponds to a plane sweeping the drum connecting the two polygons. For $t \in [0, 1]$, let $M_t^*$ be the set of intersections between the edges of $\Xi$ connecting conv $P^*$ with conv $Q^*$ and the hyperplane $x_5 = t$. $M_t^*$ is the smallest point set so conv $M_t^*$ is the intersection between $\Xi$ and $x_5 = t$. Define $M_t \subseteq R^3 \times R$ so $M_t^+$ is the projection of $M_t^*$ to the first 4 coordinates. The mixed complex for P, α, Q, β, and t is $$\mathcal{K}_\alpha(P) X_t \mathcal{K}_\beta(Q) = \mathcal{K}_Y(M_t),$$

where $Y^2 = (1-t)\alpha^2 + t\beta^2$. $\mathcal{K}_Y(M_t)$ is the complex representation of the mixed shape $X_t$ mentioned in the introduction.

Note that possibly the most intuitive interpretations of the definitions is to think of $M_t$ as a sum of non-negative homothets of P and Q. Note, however, that the summation affects the weights of the points in a non-linear manner. More specifically, for each pair $p \in P$, $q \in Q$ define $m \in R^3 \times R$ so $m^+ = (1-t)p^+ + tq^+$. Hence, $z_m = (1-t)z_p + tz_q$. The weight $w_m$ of m is chosen so $\mu_4 = (1-t)\phi_4 + t\psi_4$, that is, $$w_m = \sum_{i=1}^{3} \mu_i^2 - (1-t) \left[ \sum_{i=1}^{3} \phi_i^2 - w_p \right] - t \left[ \sum_{i=1}^{3} \psi_i^2 - w_q \right].$$

Each pair $p \in P$, $q \in Q$ defines a mixed weighted point, and one could define $M_t$ to be the set of all such points. Many of these points will be redundant though, and the above definition of $M_t$ via edges of $\Xi$ selects exactly all non-redundant mixed points.

DATA STRUCTURES

This section presents the data structures used to represent this complex. The construction of mixed shapes, as explained in this specificaion, avoids the projection to the paraboloid and relies on simplicial complexes in $R^4$. To remain consistent with the notation in this specification, one uses $x_1, x_2, x_3, x_5$ to denote the four coordinate directions. Consider the Delaunay complexes, $D(P)$ and $D(Q)$, of the two point sets $P, Q \subseteq R^3 \times R$. They are embedded in two parallel hyperplanes, $x_5 = 0$ and $x_5 = 1$. Instead of taking the convex hull of two 4-dimensional convex polytopes in $R^5$, one constructs the projection of the lower faces directly in $R^4$. This is the 4-dimensional weighted Delaunay complex, $\mathcal{T}$, of $P \cup Q$ embedded in $R^4$ as explained. One is mostly interested in the simplices of $\mathcal{T}$ that connect $\mathcal{T}(P)$ and $D(Q)$. The set of such simplices is $T = \mathcal{T} - D(P) - D(Q)$. To keep the notation simple, one uses not sub- or superscript to distinguish a point in $R^3$ from its embedding in the 4-dimensional space described above.

Simplex types.

The simplices in T are classified into ten types depending on their dimension and the dimensions of their faces in $D(P)$ and $D(Q)$, see table 1. For $\sigma \in T$, let $\sigma_P \in D(P)$ and $\sigma_Q \in D(Q)$ so $\sigma = \sigma_P * \sigma_Q$, and let $i = \dim \sigma_P$ and $j = \dim \sigma_Q$. Then σ is a simplex of dimension $i+j+1$ and of type ij. For each type, one is

TABLE 1

The different types of simplices σ ∈ T, their dimension, and their cross-section

| type | dim σ | cross-section |
|------|-------|---------------|
| 03 | 4 | tetrahedron |
| 12 | 4 | triangular prism |
| 21 | 4 | triangular prism |
| 30 | 4 | tetrahedron |
| 02 | 3 | triangle |
| 11 | 3 | parallelogram |
| 20 | 3 | triangle |
| 01 | 2 | edge |
| 10 | 2 | edge |
| 00 | 1 | vertex | interested in the cross-sections with hyperplanes of the form $x_5=t$, $t \in (0, 1)$. Each cross-section is the Cartesian product of an i-simplex and a j-simplex. Note that the cross-section of a simplex is not necessarily a simplex. One uses the term cell to refer to the larger class of convex polytopes obtained by taking cross-sections.

T is stored in two data structures, one representing how the simplices are connected, and one for miscellaneous status information relevant to extracting mixed complexes. Connectivity information.

One uses a minimal approach to represent the connectivity among the simplices in T. Only 4-simplices are explicitly stored and lower dimensional simplices are implicit. Two 4-simplices are adjacent if they share a 3-simplex, and in this case they are linked by pointers. One can think of the 4-simplices as nodes of a graph and the 3-simplices as arcs between the nodes.

4-simplex = record $dim_{PQ} \in \{03, 12, 21, 30\}$;

$\sigma_P, \sigma_Q$: faces;

$adj[0 \ldots 4]$: array of 4-simplices endrecord.

The 4-simplex σ specified by this record is the join of σp ∈ $D(P)$ and $\sigma_Q \in D(Q)$. The dimensions of the two simplices can be determined from the type of σ, $dim_{pQ}$. The ordering of σ is implicit in the representation: it is the concatenation of the orderings of $\sigma_p$ and $\sigma_Q$. One assumes a function IX(σ, t) that returns the index of the t-th vertex in this ordering, for $0 \leq t \leq 4$. The adjacent 4-simplex identified by adj[t] shares all vertices with σ except for the t-th one in the ordering of σ. An adjacent 4-simplex is nil when the corresponding shared 3-simplex, τ, belongs to the frontier of $T$. There are three different cases. $\tau \in T(Q)$ occurs whenever σ is of type 03, and in this case adj[0] is the corresponding nil pointer. Symmetrically, $\tau \in D(P)$ occurs whenever σ is of type 30, and in this case adj[4] is the corresponding nil pointer. In the third case, $\tau \in T \cap Fr\ T$. This can happen for any type of 4-simplex. The type of the 4-simplex and the index of the nil pointer distinguish the third case from the first two.

It is convenient to store the collection of 4-simplices in an array rather than a pointer-based data structure:

Cx: array of 4-simplex.

Adjacency between 4-simplices is thus represented by integer indices rather than actual pointers.

Figure 2:
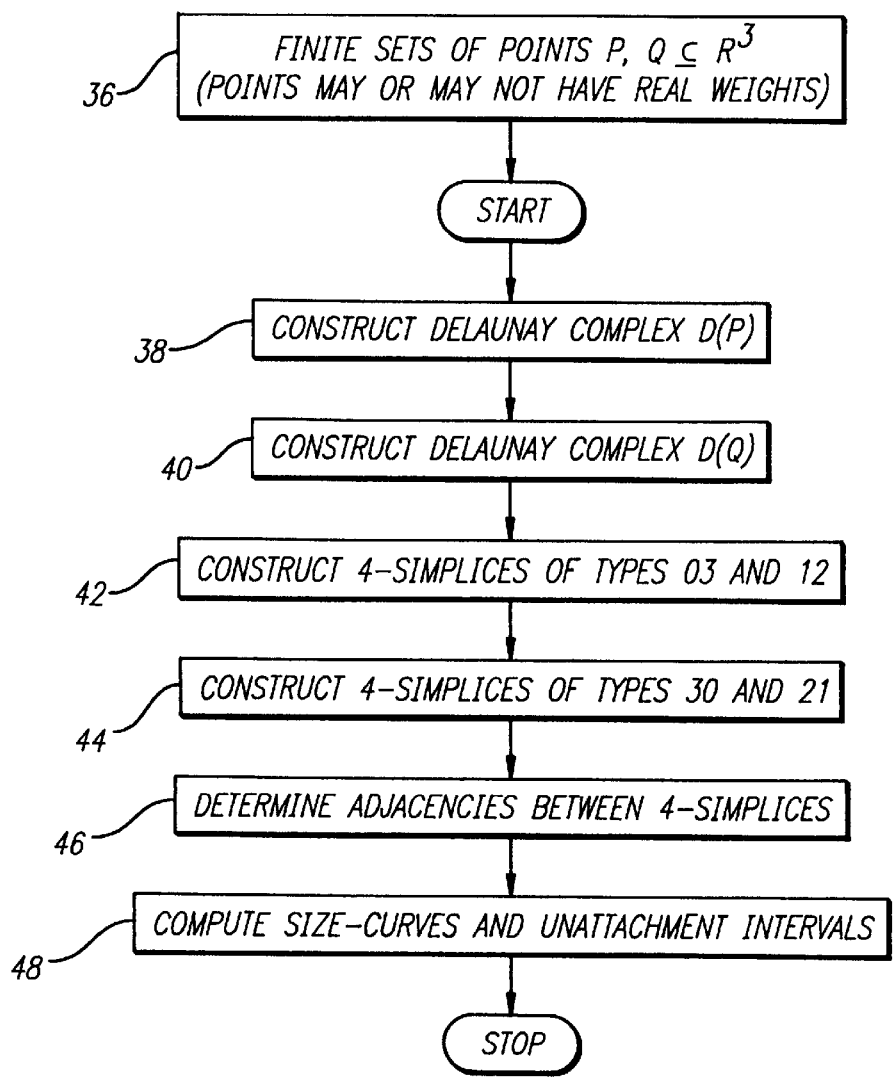
FIG. 2 is a block diagram depicting further details of the step of constructing a 4-complex shown in FIG. 1.

Note that, referring to FIG. 2, as is known to those skilled in the art, the Delaunay complexes 38 and 40 are constructed. This step may be done, for example, with the publicly available software DELCX, which has been developed by the inventors. This software provides $D(P)$ (and $D(Q)$) in a triangle-based data structure. See e.g. [D. P. DOBKIN AND M. J. LASZLO. Primitives for the manipulation of three-dimensional subdivisions. *Algorithmica* 4 (1989), 3–32], and [E. P. MÜCKE. Shapes and implementations in three-dimensional geometry. Ph. D. thesis, rept. UIUCDCS-R-93-1836, Dept. Comput. Sci., Univ. Elinois at Urbana-Champaign, Ill., 1993]. Each triangle has 6 representations (orderings) and a particular one, abc, can be used to uniquely determine a vertex, α, an edge, ab, a triangle, abc, and a tetrahedron, abcd with d on the positive side of abc in $R^3$. Independent of σp's dimension it is thus possible to specify σp through an ordering of a triangle in the data structure for $D(P)$.

Status information.

Given $T$ and $t \in [0,1]$, the mixed complex $\mathcal{K}_Y = \mathcal{K}_Y(M_t)$ is subcomplex of the cross-section of $T$ defined by $x_5=t$. $\mathcal{K}_Y$ can be computed by selecting cells one at a time. Alternatively, one can explore the structure of dependencies between mixed complexes for different values of t and precompute information speeding up the selection process, see the section of this specification addressing Extracting a Mixed Complex. The status information one considers precomputing is stored in four linear arrays or tables, one for each dimension. The relation between the connectivity and the status information is provided by a hash function from the 4-simplex records to table elements, and by explicit pointers (indices) from the array elements to 4-simplex records. A simplex is uniquely determined by the ordered sequence of vertex indices. The hash function takes this sequence as input to compute the location in the appropriate table.

The status information for a k-simplex $\tau \in T$ is stored in a table $T_k$. For k=4 one has $T_4$: array of record φ, ψ: real;

mark: boolean endrecord.

$T_4$ stores 4-simplices parallel to Cx so that no explicit pointers and hash function are needed to establish the correspondence. The real numbers φ and ψ determine the size of the cross-section $\tau_t$ of τ, see the section of this specification Extracting a Mixed Complex. The boolean mark is convenient in the selection of cells for the mixed complex, which is based on graph search methods. For k<4 one needs extra information to specify τ as a face of a 4-simplex a in Cx.

$T_k$: array of record σ: 4-simplex;

$b[0 \ldots 4]$: array of bits;

φ, μ, ψ: real;

$t_l, t_u$: real;

mark: boolean endrecord.

Here, σ is the index of a 4-simplex in the array Cx. The vector $b[0 \ldots 4]$ contains 5 bits indicating which vertices of σ are vertices of τ. Specifically, the t-th vertex of σ is a vertex of τ iff b[t]=1. The real numbers φ, μ, and ψ determine the size of $\tau_t$ as explained in the section Extracting a Mixed Complex. $t_l$ and $t_u$ are the endpoints of the interval in which τ is unattached. The interval is empty if $t_u < t_l$.

Note that the first field of any record in $T_3$, $T_2$, $T_1$ is an index into Cx and thus an integer. It is convenient to save memory by encoding σ and the 5 bits of b into a single integer. An obvious such encoding is $$r = 2^5 \cdot \sigma + \sum_{\iota=0}^{4} 2^{\iota} \cdot b[\iota]$$

The integer r is called the reference of the simplex specified by σ and b.

The 4 tables are built in a single traversal of Cx. For each 4-simplex, the faces connecting $\mathcal{D}(P)$ with $\mathcal{D}(Q)$ are hashed into $T_4$, $T_3$, $T_2$, $T_1$. Collisions between different simplices and copies of the same simplex can be distinguished by comparing canonical orderings, see REF_TO_VERTEX in the section Constructing the 4-Complex.

EXTRACTING A MIXED COMPLEX

This section explains how a mixed shape can be extracted from the complex. This is also shown in FIG. 6, with the input specified at 60. Assuming the status information provided in tables $T_4$, $T_3$, $T_2$, $T_1$, one can select the simplices whose cross-sections belong to the mixed complex. The selection is based on the simplex size, given by φ, μ, ψ, t, and on the interval of unattachedness delimited by $t_l$ and $t_\mu$. The first pass considers only unattached simplices and attached simplices are added to the complex by taking the combinatorial closure. One begins by studying how the size of a simplex cross-section changes and how it can be computed.

Size curves.

An important step in the extraction considers size curves of simplices in Cx. The construction of these curves is step 56 of the process described in FIG. 5. The input to the process is specified in 54. FIG. 6 at 64 shows how these curves are used for the extraction.

Figure 10:
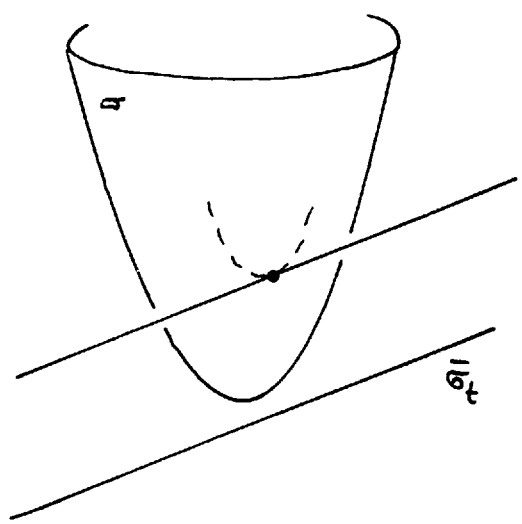
FIG. 10 illustrates that the amount of vertical displacement needed for tangential position is the size of the corresponding simplex or cell.

Each simplex σ ∈ T contributes a cell to every cross-section defined by $x_5 = t$, $t \in (0, 1)$. As shown in table 1, each such cell is the Cartesian product of two simplices whose dimensions add up to dim σ−1. To study how the size of this cross-section changes with t, one needs to look at the cells as they appear in $R^5$ and at their projections to the first 4 coordinates. Let $\sigma^*$ be the lower face of $\Xi$ in $R^5$ corresponding to σ, and let $\sigma_t$ be the intersection of $\sigma^*$ and $x_5 = t$ projected to coordinates $x_1$, $x_2$, $x_3$, $x_4$. Let $\overline{\sigma}_t = \text{aff } \sigma_t$. If $\sigma^*$ is a k-dimensional face then σ is a k-simplex, $\sigma_t$ is a (k−1)-dimensional cell, and $\overline{\sigma}_t$ is a (k−1)-flat in $R^4$. As explained in the Definitions section, the size of $\sigma_t$ is the amount of vertical translation needed to move $\overline{\sigma}_t$ tangent to $\varpi$, see FIG. 10. As shown in FIG. 10, the amount of vertical displacement needed for tangential position is the size of the corresponding simplex or cell. Translation in the direction of the positive $x_4$-axis is measured negatively, and translation against this direction is measured positively. For each σ ∈ T one considers the size function $|\sigma|$: $(0,1) \to R$ defined by $|\sigma|(t) = |\sigma_t|$.

Note that $|\sigma|$ is linear in t if dim σ=4 and quadratic in t if 1 ≤ dim σ ≤ 3. This is so for the following reasons. Consider first the case of a 4-simplex σ ∈ T. Its cross-section is a 3-dimensional cell (a tetrahedron or a triangular prism), and $\overline{\sigma}_t$ is a 3-flat (a hyperplane) in $R^4$. It is the projection to the first 4 coordinates of the intersection between the two hyperplanes aff $\sigma^*$ and $x_5 = t$ in $R^5$. Only the second hyperplane varies with t. It follows $\overline{\sigma}_t$ moves parallel to itself as t changes continuously, and the size varies linearly with t.

Let now σ ∈ T be a simplex of dimension k=dim σ ≤ 3. $\overline{\sigma}_t$ is a (k−1)-flat in $R^4$, and $|\sigma|(t)$ is the smallest signed vertical distance from $\varpi$ of any hyperplane through $\overline{\sigma}_t$:

$$|\sigma|(t) = \min_{\overline{\sigma}_t \subseteq h} |h|.$$

For each such hyperplane h let $P_h \in \varpi$ be the point where the appropriate translate of h is tangent to $\varpi$. The set $\varpi_\sigma = \{P_h | \overline{\sigma}_t \subseteq h\}$ is the intersection of $\varpi$ with a vertical (5−k)-dimensional flat, $F_\sigma$, normal to the projection to the first 3 coordinates of $\overline{\sigma}_t$. $\varpi_\sigma$ is thus a (4−k)-dimensional paraboloid. For different values of t the (k−1)-flats $\overline{\sigma}_t$ are mutually parallel. It follows the pencils of hyperplanes containing two different $\overline{\sigma}_t$ at are translates of each other. This implies $F_\sigma$ and therefore $\varpi_\sigma$ are independent of t, which justifies the notation suppressing t. The (k−1)-flat $\overline{\sigma}_t$ intersects $F_\sigma$ in a point, and $|\sigma|(t)$ is the signed vertical distance between this point and the paraboloid $\varpi_\sigma$. The point moves on a line in $F_\sigma$ as t varies between 0 and 1. It follows $|\sigma|$ varies quadratically with t.

Figure 11:
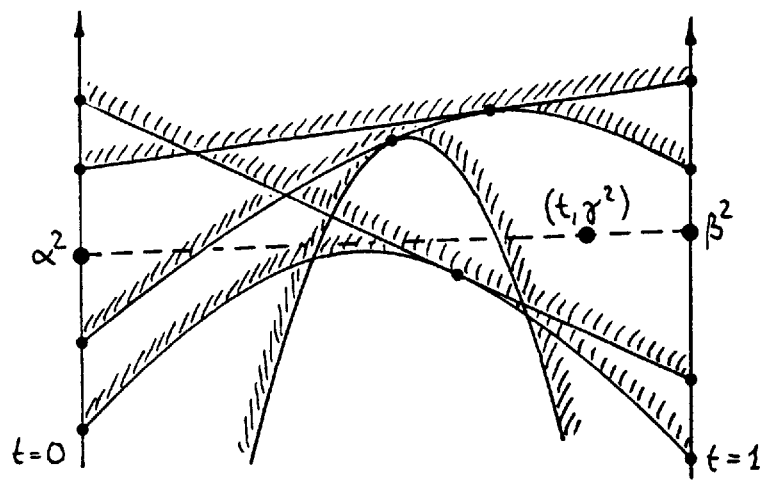
FIG. 11 illustrates crossing cells of an arrangement corresponding to different alpha complexes.

As described above, the transition from $\mathcal{K}_\alpha(P)$ to $\mathcal{K}_\beta(Q)$ can be visualized as a straight path through a parallel strip within an arrangement of lines and parabolas, see FIG. 11. As shown in FIG. 11, the two vertical lines represent the different alpha complexes possible for P and Q. The path from the α-complex of P to the β-complex of Q crosses a sequence of lines and parabolas. At each crossing a cell is added to or removed from the mixed complex. Ignoring constraints resulting from hiding cofaces, a cell belongs to $\mathcal{K}_\gamma(M_t)$ iff the point (t, $\gamma^2$), with $\gamma^2 = (1-t)\alpha^2 + t\beta^2$, lies above the corresponding line or parabola.

Computing size curves.

Computing size curves is the first half of step 48 in FIG. 2. As detailed in FIG. 5, size curves are computed at 56 for all simplices in Cx.

A line is determined by 2 points and a parabola by 3 points. One computes these points at t=0, ½, 1 using a function SIZE that computes the size of a simplex as defined in the Definition section. There are 4 versions of this function, one for tetrahedra, one for triangles, one for edges, and one for vertices. The parameters are the lifted vertices of the simplex. The number of vertices distinguishes different versions. Each version returns a real number, SIZE. Ignoring complications due to hiding cofaces, the simplex belongs to the α-complex iff SIZE ≤ $\alpha^2$.

Described are ten versions of a function SIZE_CURVE, one per type of simplex in T. The parameters are the lifted vertices of the simplex. The points of P precede the points of Q, as usual. As an example consider a 4-simplex σ ∈ T of type 12. Let conv $\{a^*, b^*, x^*, y^*, z^*\}$ be the lifted version of σ, which is a 4-dimensional lower face of $\Xi$. For all t ∈ (0, 1) the projection $\sigma_t$ is a triangular prism in $R^4$, although $\sigma_0 = \sigma_P$ is only an edge and $\sigma_1 = \sigma_Q$ is only a triangle. In order to compute the sizes at the beginning and at the end, $$\phi = |\sigma|(0) \text{ and } \psi = |\sigma|(1),$$

one thus needs to simulate a limit process shrinking the prism to an edge and a triangle, respectively. For t=0 this is done by considering the hyperplane that passes through $a^+$ and $b^+$ and is parallel to all hyperplanes $\overline{\sigma}_t$. Similarly for t=1 one considers the hyperplane that passes through $x^+$, $y^+$, $z^+$ and is parallel to all $\overline{\sigma}_t$. For each type of 4-simplex one finds points in $R^4$ that span the appropriate hyperplane. The function returns two sizes: φ, ψ, ∈ R.

SIZE_CURVE_03($a^+, w^+, x^+, y^+, z^+$):

$\phi$: = SIZE ($a^+, a^+ + x^+ - w^+, a^+ + y^+ - w^+,$ $a^+ + z^+ - w^+$);

$\psi$: = SIZE($w^+, x^+, y^+, z^+$).

SIZE_CURVE_12($a^+, b^+, x^+, y^+, z^+$):

$\phi$: = SIZE($a^+, b^+, a^+ + y^+ - x^+, a^+ + z^+ - x^+$);

$\psi$: = SIZE($x^+, y^+, z^+, x^+ + b^+ - a^+$).

The functions for 4-simplices of types 30 and 21 are symmetric to 03 and 12. The versions of SIZE_CURVE for 3-, 2-, and 1-simplices return three sizes: $\phi, \mu, \psi \in R$. For t=0, 1 one can simulate a limit process as above. For t=½ one just needs to find appropriate points spanning the 3-, 2-, and 1-flat.

SIZE_CURVE_02($a^+, x^+, y^+, z^+$):

$\phi$: = SIZE($a^+, a^+ + y^+ - x^+, a^+ + z^+ - x^+$);

$\mu$: = SIZE $\left( \dfrac{a^+ + x^+}{2}, \dfrac{a^+ + y^+}{2}, \dfrac{a^+ + z^+}{2} \right)$;

$\psi$: = SIZE($x^+, y^+, z^+$).

SIZE_CURVE_11($a^+, b^+, y^+, z^+$):

$\phi$: = SIZE($a^+, b^+, a^+ + z^+ - y^+$);

$\mu$: = SIZE $\left( \dfrac{a^+ + y^+}{2}, \dfrac{a^+ + z^+}{2}, \dfrac{b^+ + y^+}{2} \right)$;

$\psi$: = SIZE($y^+, z^+, y^+ + b^+ - a^+$).

SIZE_CURVE_01($a^+, y^+, z^+$):

$\phi$: = SIZE($a^+, a^+, + z^+ - y^+$);

$\mu$: = SIZE $\left( \dfrac{a^+ + y^+}{2}, \dfrac{a^+ + z^+}{2} \right)$;

$\psi$: = SIZE($y^+, z^+$).

SIZE_CURVE_00($a^+, z^+$):

$\phi$: = SIZE($a^+$);

$\mu$: = SIZE $\left( \dfrac{a^+ + z^+}{2} \right)$;

$\psi$: = SIZE($z^+$).

The functions for simplices of types 20 and 10 are symmetric to 02 and 01.

Note that, the function SIZE is part of the publicly available alpha shapes software, as is known to those skilled in the art. SIZE expects input points with integer coordinates and weights. This assumption is valid except possibly for parameters used in the computation of $\mu$. One gets integers by multiplying all coordinates with 2 and weights with 4. For example, if $f^+ = (\phi_1, \phi_2, \phi_3, \phi_4)$ then the new point is ($2\phi_1, 2\phi_2, 2\phi_3, 4\phi_4$). The resulting size is four times the original size. A further simplification follows by introducing $f_2^+ = (\phi_1, \phi_2, \phi_3, 2\phi_4)$.

For example, in SIZE_CURVE_02 the correct value of $\mu$ is obtained with $\mu := \frac{1}{4} \cdot \text{SIZE}(\alpha_2^+ + x_2^+, \alpha_2^+ + y_2^+, \alpha_2^+ + z_2^+)$.

Similar substitutions apply to all other versions of function SIZE_CURVE.

The effect of hiding cofaces is discussed shortly. In the absence of such cofaces, the criteria for inclusion in $\mathcal{K}_\gamma(M_t) = \mathcal{K}_\alpha(P) \; X_t \; \mathcal{K}_\beta(Q), \; \gamma^2 = (1-t)\alpha^2 + t\beta^2$, can be expressed by straightforward inequalities. If $\sigma \in T$ is a 4-simplex, it belongs to $\mathcal{K}_\gamma(M_t)$ iff $$B_\sigma t + C_\sigma \leq \gamma^2, \qquad (2)$$

with $B_\sigma = -\phi + \psi$ and $C_\sigma = \phi$. If the dimension of $\sigma \in T$ is 3, 2, or 1, then $\sigma$ belongs to $\mathcal{K}_\gamma(M_t)$ iff $$A_\sigma t^2 + B_\sigma t + C_\sigma \leq \gamma^2, \qquad (3)$$

with $A_\sigma = 2\phi - 4\mu + 2\psi$, $B_\sigma = -3\phi + 4\mu - \psi$, and $C_\sigma = \phi$. For linear dependences, which occur for 4-simplices, one has $$\mu = \frac{\phi + \psi}{2},$$

so (3) specializes to (2).

Hiding and attachment.

The second important step in the extraction of mixed shapes considers intervals of unattachedness. The construction of these intervals is step 58 of the process described in FIG. 5. The input to the process in specified in 54. FIG. 6 at 62 shows how these intervals are used for the extraction.

Recall the definition of attached and unattached simplices presented in the Definition section, and note that every attached $\tau$ has a hiding coface of dimension dim $\tau + 1$. The distinction between attached and unattached simplices is essential in the construction of alpha shapes, see [H. EDELSBRUNNER AND E. P. MÜCKE. *ACM Trans. Graphics* 13 (1994), 43–72]. The same distinction is necessary for the cells of a cross-section of $\mathcal{T}$ from which mixed complexes are extracted. The transition from $\mathcal{K}_\alpha(P)$ to $\mathcal{K}_\beta(Q)$ is embedded in the transition from $\mathcal{D}(P)$ to $\mathcal{D}(Q)$, which happens as t increases continuously from 0 to 1. The cross-sections of $\mathcal{T}$ defined for different values of t in (0,1) are combinatorially the same, only the positions of points, lengths of edges, and other metric properties are different. In particular, a cell has always the same face structure and the same faces and cofaces. Whether or not a coface hides a cell depends on metric properties and thus varies with changing t.

Recall that $\tau_t$ denotes the cross-section of $\tau \in T$ defined by $x_5 = t$, $t \in (0, 1)$. A coface $\sigma \in T$ of $\tau$ defines a cell $\sigma_t$ in the cross-section, and $\sigma_t$ is a coface of $\sigma_t$. Either $\sigma_t$ hides $\tau_t$, or it does not hide $\tau_t$. One refers to the two possibilities as states.

Note that if we let $\sigma \in T$ be a coface of $\tau \in T$ with dim $\sigma = \dim \tau + 1$, then either $\sigma_t$ hides/does not hide $\tau_t$ for all $t \in (0,1)$ or the state changes exactly once. This is so for the following reasons. Observe the size of $\tau_t$ cannot exceed that of $\sigma_t$, that is $|\tau|(t) \leq |\sigma|(t)$ for all t. In other words, the parabola of $\tau$ lies below the parabola of $\sigma$ and at best the two touch in a single point. The parabola of $\sigma$ may degenerate to a line. The moment the state between $\tau$ and $\sigma$ changes, one has $h_{\tau t} = h_{\sigma t}$. Thus, at this moment $|\tau|(t) = |\sigma|(t)$, and this is the only value of t where the two functions coincide.

As described above, the range of values t where $\tau_t$ is not hidden by at is a single interval. The range of values t where $\tau_t$ is unattached is the intersection of these intervals, which is again an interval. One calls this the unattachedness interval of $\tau$. Its lower endpoint is either 0 or the value of t where the state between $\tau$ and a coface changes from hidden to non-hidden. Similarly, its upper endpoint is either 1 or the value of t where the state between τ and a coface changes from non-hidden to hidden. The endpoints are recorded as part of the status information of τ, see section Data Structures.

Computing state changes.

Computing state changes is the second half of step 48 in FIG. 2. State changes are described by intervals of unattachedness. As detailed in FIG. 5, these intervals are computed at 58 for all simplices in Cx.

The size curves for simplices $\tau$, $\sigma \in T$ are $|\tau|(t)=A_\tau t^2+B_\tau t+C_\tau$ and $|\sigma|(t)=A_\sigma t^2+B_\sigma t+C_\sigma$, see (2) and (3). Both are defined over (0, 1) and can be extended to all $t \in [0,1]$ by taking limits. Assuming τ is a face of σ one has $|\tau|(t) \leq |\sigma|(t)$, so when the curves meet they have the same slope. In other words, $|\tau|(t)=|\sigma|(t)$ only if t is equal to $$y = \frac{B_o - B_\tau}{2(A_\tau - A_o)}.$$

One has a state change if $\gamma \in [0, 1]$ and dim σ=dim τ+1. The change is either from hidden to non-hidden or vice versa. To distinguish the two cases, one evaluates the state at t=0 and at t=1. The state is the same for all $t \in [0,y]$ and for all $t \in (y, 1]$.

To test whether or not $\sigma_t$ hides $\tau_t$ one assumes 3 versions of a function BELOW, one for triangles, one for edges, and one for vertices. In each case, a lifted point is tested whether or not it lies below the hyperplane defining the size of the triangle, edge, or vertex. For t=0 and t=1 one simulates a limit process, just as in the computation of size curves.

One uses 12 versions of a function HIDDEN to compute the states at t=0, 1, two for each type of 3-, 2-, and 1-simplex in T. Cross-sections of 4-simplices are always unattached because they do not have any proper cofaces. The input parameters are the lifted vertices of a k-simplex $\tau \in T$, $1 \leq k \leq 3$, and the additional lifted vertex of a (k+1)-simplex σ that contains τ as a face. Each function returns two bits, one for the state at t=0 and one for t=1.

For a type 02 3-simplex τ one distinguishes the case where the extra vertex of σ is in P and where it is in Q.

HIDDEN_02P($a^+, x^+, y^+, z^+, p^+$):

$b_0$: = BELOW($a^+, a^+ + y^+ - x^+, a^+ + z^+ - x^+, p^+$);

$b_1$: = BELOW($x^+, y^+, z^+, x^+ + p^+ - a^+$).

HIDDEN_02Q($a^+, x^+, y^+, z^+, q^+$):

$b_0$: = BELOW($a^+, a^+ + y^+ - x^+, a^+ + z^+ - x^+,$ $a^+ + q^+ - x^+$);

$b_1$: = BELOW($x^+, y^+, z^+, q^+$).

Similarly for all other cases one distinguishes between the two cases where the extra point is from P or from Q. The cases for type 20 and type 10 are symmetric to 02 and 01.

HIDDEN_11P($a^+, b^+, y^+, z^+, p^+$):

$b_0$: = BELOW($a^+, b^+, a^+ + z^+ - y^+, p^+$);

$b_1$: = BELOW($y^+, z^+, y^+ + b^+ - a^+, y^+ + p^+ - a^+$).

HIDDEN_11Q($a^+, b^+, y^+, z^+, q^+$):

$b_0$: = BELOW($a^+, b^+, a^+ + z^+ - y^+, a^+ + q^+ - y^+$);

$b_1$: = BELOW($y^+, z^+, y^+ + b^+ - a^+, q^+$).

-continued

HIDDEN_01P($a^+, y^+, z^+, p^+$):

$b_0$: = BELOW($a^+, a^+ + z^+ - y^+, p^+$);

$b_1$: = BELOW($y^+, z^+, y^+ + p^+ - a^+$).

HIDDEN_01Q($a^+, y^+, z^+, q^+$):

$b_0$: = BELOW($a^+, a^+ + z^+ - y^+, a^+ + q^+ - y^+$);

$b_1$: = BELOW($y^+, z^+, q^+$).

HIDDEN_00P($a^+, z^+, p^+$):

$b_0$: = BELOW($a^+, p^+$);

$b_1$: = BELOW($z^+, z^+ + p^+ - a^+$).

HIDDEN_00Q($a^+, z^+, q^+$):

$b_0$: = BELOW($a^+, a^+ + q^+ - z^+$);

$b_1$: = BELOW($z^+, q^+$).

Different cell types.

Depending on the application of mixed shapes, it may be necessary to distinguish between different cell types. For the display of a mixed shape, $\cup \mathcal{K}_\gamma = \cup \mathcal{K}_\gamma(M_t)$, the cells in the frontier of $\mathcal{K}_\gamma$ suffice. A finer distinction between edges that bound triangles or parallelograms and edges without such cofaces in Fr $\mathcal{K}_\gamma$ may also be necessary. The latter edges require an independent graphical representation, while the former are visible as a side effect of drawing 2-dimensional faces. To classify a particular cell $\sigma_t$ in $\mathcal{K}_\gamma$, a local search in the data structure for $\mathcal{T}$ usually suffices. As an example consider a 2-dimensional cell $\tau_t \in \mathcal{K}_\gamma$. It is the cross-section of a 3-dimensional simplex $\tau \in T$, and one lets σ' and σ" be the two cofaces of τ, assuming they exist. $\tau_t$ belongs to Fr $\mathcal{K}_\gamma$ iff at least one of $\sigma'_t$ and $\sigma''_t$ does not belong to $\mathcal{K}_\gamma$. The status information of τ and of its cofaces can be used to classify $\tau_t$ in constant time.

CONSTRUCTING THE 4-COMPLEX

This section discusses the methods needed to construct the complex. FIG. 2 provides further detail of the step of constructing the 4-complex. As shown at 36, the input to the system is a finite set of points. The first substeps are to construct Delaunay complexes for the source shape and the target shape, as shown at 38 and 40. The 4-dimensional weighted Delaunay complex, $\mathcal{T}$, is computed from $\mathcal{D}(P)$ and $\mathcal{D}(Q)$ in three steps. One begins by explaining two 4-dimensional geometric primitives.

Orientation and Delaunay tests.

To traverse $\mathcal{D}(P)$ and $\mathcal{D}(Q)$ and to construct $\mathcal{T}$ during the traversal, one needs a 4-dimensional Delaunay or weighted in-sphere test. Interpreted in $R^5$, the question is whether a point $f^*$ lies vertically above or below the hyperplane spanned by points $a^*, b^*, c^*, d^*, e^* \in R^5$. Verticality refers to the direction of the fourth coordinate, $x_4$. One uses $\alpha_i, \beta_i, \gamma_i, \delta_i, \epsilon_i, \phi_i$, for the coordinates of $a^*, b^*, c^*, d^*, e^*, f^*$. Recall the fifth coordinate of any point is 0 or 1 depending on whether it comes from P or from Q. The fourth coordinate is the sum of squares of the first three minus the weight, see section Definitions. Whether $f^*$ lies above or below the hyperplane can be decided by computing the following determinants:

$$\Gamma = det \begin{pmatrix} 1 & \alpha_1 & \alpha_2 & \alpha_3 & \alpha_4 & \alpha_5 \\ 1 & \beta_1 & \beta_2 & \beta_3 & \beta_4 & \beta_5 \\ 1 & \gamma_1 & \gamma_2 & \gamma_3 & \gamma_4 & \gamma_5 \\ 1 & \delta_1 & \delta_2 & \delta_3 & \delta_4 & \delta_5 \\ 1 & \epsilon_1 & \epsilon_2 & \epsilon_3 & \epsilon_4 & \epsilon_5 \\ 1 & \phi_1 & \phi_2 & \phi_3 & \phi_4 & \phi_5 \end{pmatrix}$$

and $$\Delta = det \begin{pmatrix} 1 & \alpha_1 & \alpha_2 & \alpha_3 & \alpha_5 \\ 1 & \beta_1 & \beta_2 & \beta_3 & \beta_5 \\ 1 & \gamma_1 & \gamma_2 & \gamma_3 & \gamma_5 \\ 1 & \delta_1 & \delta_2 & \delta_3 & \delta_5 \\ 1 & \epsilon_1 & \epsilon_2 & \epsilon_3 & \epsilon_5 \end{pmatrix}.$$

One assumes the use of a simulated perturbation that eliminates degenerate cases corresponding to $\Gamma \cdot \Delta = 0$, see [H. EDELSBRUNNER AND E. P. MÜCKE. Simulation of Simplicity: a technique to cope with degeneracies in geometric algorithms. *ACM Trans. Graphics* 9 (1990), 67–104], and [C. K. YAP. Symbolic treatment of geometric degeneracies. *J. Symbolic Comput.* 10 (1990), 349–370].

DELAUNAY(a, b, c, d, e, f):
  return $\Gamma \cdot \Delta < 0$.

The test returns true if $f^*$ lies above the hyperplane passing through $a^*$, $b^*$, $c^*$, $d^*$, $e^*$ and false if $f^*$ lies below the hyperplane. In the latter case, the 4-simplex abcde does not belong to $\mathcal{T}$, in the former case this possibility is left open. To see the test is correct it suffices to verify it for a single non-degenerate instance. $\Gamma \cdot \Delta$ varies continuously with the parameters, and it vanishes before it changes sign. At the moment $\Gamma \cdot \Delta$ vanishes the points form a degenerate configuration.

The second determinant, $\Delta$, acts as a corrective factor that compensates for the arbitrariness of the ordering of a, b, c, d, e. At the same time, $\Delta$ can be used to decide the orientation of 5 points in $R^4$. By definition, the sequence a, b, c, d, e has positive orientation if $\Delta > 0$.

ORIENTATION(a, b, c, d, e):
  return $\Delta > 0$.

One says e is on the positive side of abcd if a, b, c, d, e has positive orientation.

Three-step method.

As mentioned earlier, the 4-dimensional simplicial complex, $\mathcal{T}$, is constructed in three steps from the input, which consists of the two Delaunay complexes $D(P)$ and $D(Q)$, see 50.

step 1. Construct all 4-simplices of type 03 and 12, see 42 in FIG. 2.
step 2. Construct all 4-simplices of type 30 and 21, see 44 in FIG. 2.
step 3. Add all 3-simplices connecting the 4-simplices constructed in steps 1 and 2, see 46 in FIG. 2.

Figure 12:
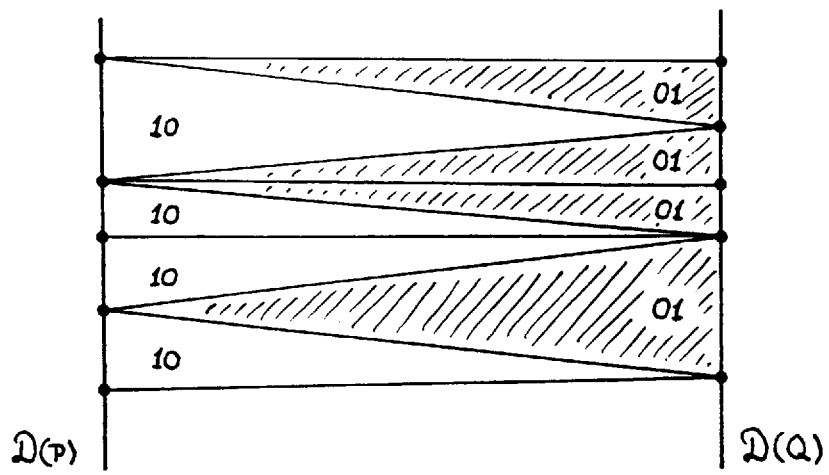
FIG. 12 illustrates the similarity of principles in two dimensions and four dimensions.
Figure 15:
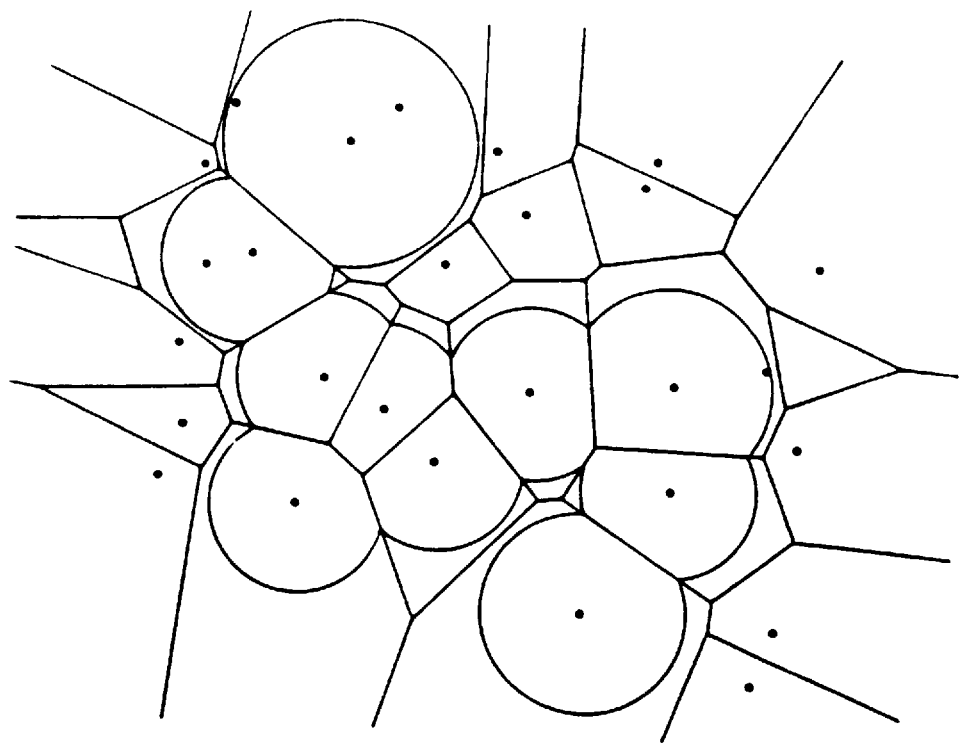
Figure 16:
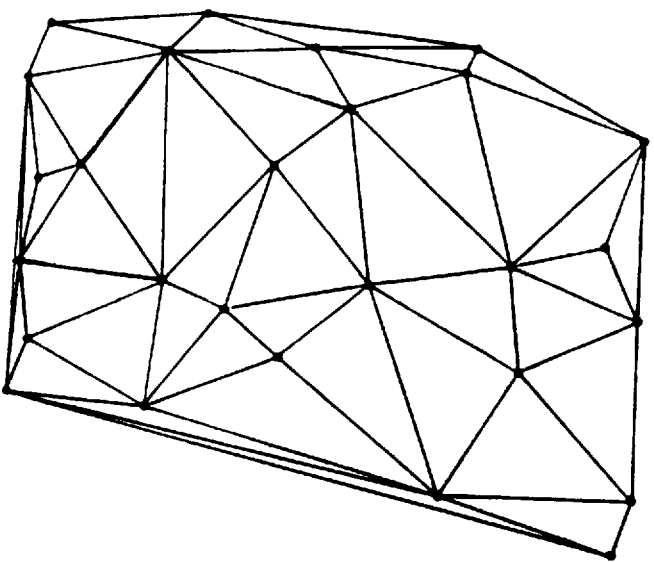
Figure 17:
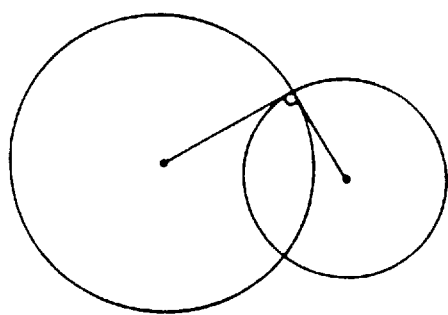
Figure 18:
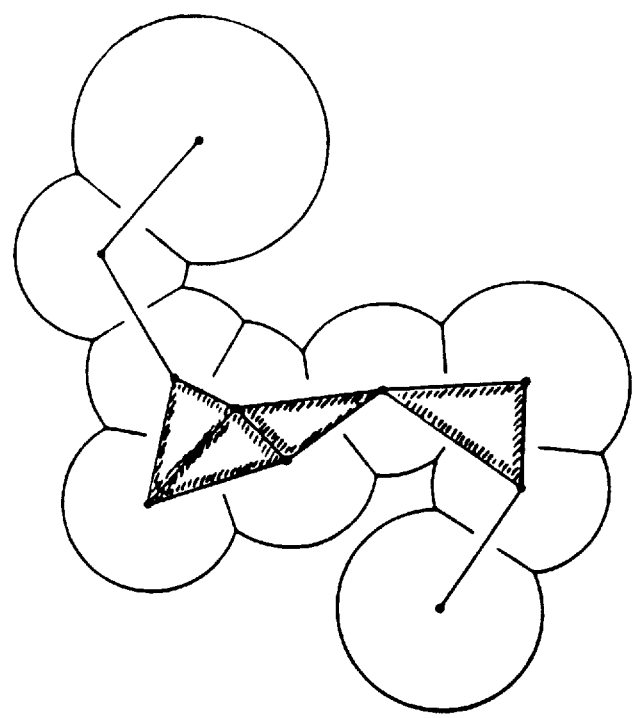

Each 4-simplex constructed in step 1 has a tetrahedron or a triangle in $D(Q)$ and a vertex or an edge in $D(P)$. The 4-simplices containing a common triangle $\tau \in D(Q)$ form a chain or sequence with contiguous 4-simplices sharing a 3-simplex of type 02. This chain begins and ends with the two 4-simplices generated from the two tetrahedral cofaces of $\tau$ in $D(Q)$, if they exist. The dual graph, whose nodes are the type 03 and 12 4-simplices and whose arcs are the type 02 3-simplices is connected. This is because the dual graph of $D(Q)$, whose nodes are the tetrahedra and whose arcs are the triangles is connected. The symmetric statements hold for the 4- and 3-simplices constructed in step 2. The two collections of 4-simplices are disjoint, and together they cover all 4-simplices in $\mathcal{T}$, see FIG. 12. All 3-simplices connecting the various types of 4-simplices are added in step 3. As shown in FIG. 12, the situation in 2 dimensions is similar to the one in 4 dimensions, except that all facets (1-simplices) are of the same type, namely 00.

Graph search for steps 1 and 2.

The two steps are symmetric, and it suffices to discuss step 1. One constructs the 4-simplices in a depth-first traversal of the tetrahedra and triangles of $D(Q)$. Simultaneously, one traverses the matching vertices and edges in $D(P)$. When a tetrahedron is visited, its 4-simplex in T is created and its triangles are visited next. When a triangle is visited, its chain of 4-simplices is created. The chain either ends at another tetrahedron in $D(Q)$, which is visited next, or it forms a dead-end, in which case the recursion discontinues.

Figure 3:
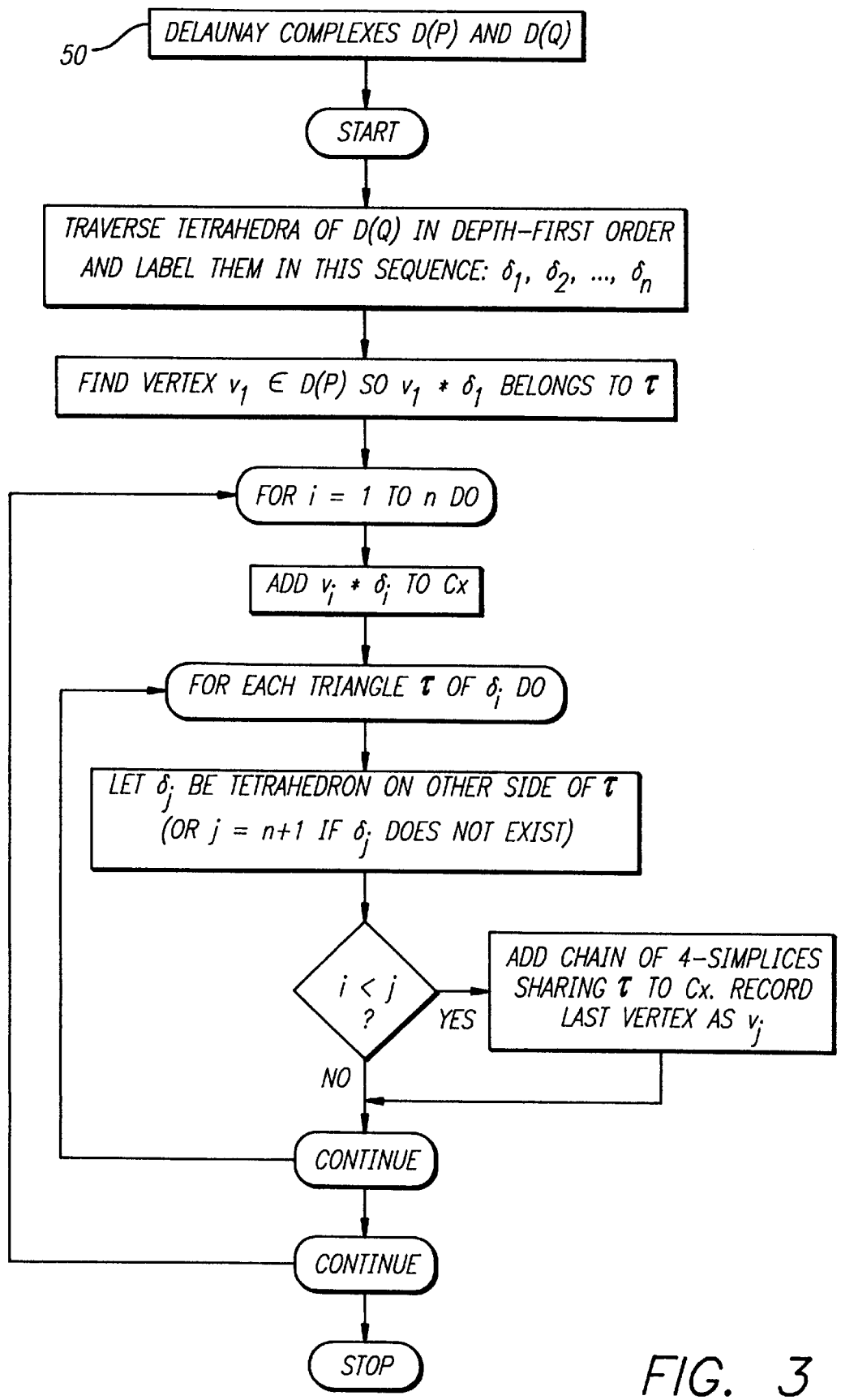
FIG. 3 is a block diagram depicting further details of the step of constructing 4-simplices of types 02 and 12 shown in FIG. 2.

The search is detailed in FIG. 3, with the input specified in 50. To start the search, one picks an arbitrary tetrahedron $\sigma \in D(Q)$ and find the vertex $v \in D(P)$ so that $v^*\sigma \in \mathcal{T}$. The vertex v can be found by exhaustively considering all vertices in $D(P)$. The input parameters to the recursive depth-first traversal are $\sigma$ and v. One uses integer labels to distinguish yet unvisited from already visited tetrahedra and to determine which of two given already visited tetrahedra was visited earlier.

```
DFS_DEL(σ,υ):
    if σ is unlabeled then
        label σ;
        add υ*σ as a new 4-simplex to Cx;
        for all four triaugles τ of σ do
            let σ' be tetrahedron on other side of τ;
            if σ' does not exist then
                ω:= MATCHING_PATH(τ,υ)
            else
                if σ' is unlabeled then
                    ω:= MATCHING_PATH(τ,υ);
                    DFS_DEL(σ,ω);
                elseif σ was labeled before σ' then
                    ω:= MATCHING_PATH(τ,υ)
                endif
            endif
        endfor
    endif.
```

The function MATCHING_PATH constructs the chain of 4-simplices sharing a triangle $\tau$ in $D(Q)$. This chain starts with the 3-simplex $v^*\tau$ and ends with $w^*\tau$. One constructs a sequence of vertices, $$v = u_0, u_1, \ldots, u_j = w,$$

so each 4-simplex in the chain is spanned by $\tau$ and two contiguous vertices in the sequence. The first 3-simplex, $v^*\tau$, connects the chain to the type 03 4-simplex that issued the chain traversal. The last 3-simplex, $w^*\tau$, connects the chain to the next type 03 4-simplex. It is possible that the latter 4-simplex does not exist.

One needs some more definitions to describe the construction of the sequence of vertices. Suppose v is a 3-simplex of $\mathcal{T}$ and a, b, c, d $\in R^d \times R$ is an ordering of its vertices. One defines a partial order over $R^4 \times R$:

y<z if DELAUNAY(a, b, c, d, y, z).

For a finite subset of weighted points in non-degenerate position, this partial order is a total order. When one constructs the sequence $u_0, u_1, \ldots, u_j$, each $v_i = u_i * \tau$ defines such a partial order, and $u_{i+1}$ is the first point in this order on the positive side of upsilon$_i$.

Recall that $\sigma$ and $\sigma'$ are the two tetrahedra sharing $\tau$. One assumes $\sigma$ lies on the negative side of $\tau$. If $\sigma'$ exists then it lies on the positive side of $\tau$ and q' denotes the vertex of $\sigma'$ that is not a vertex of $\tau$.

```
MATCHING_PATH(τ,υ):
    loop u := SEARCH_LINK(τ,υ);
        if u ≠ nil then
            if σ' = nil then
                add υ*u*τ Cx; υ := u
            else
                if DELAUNAY(υ,a,b,c,u,q') then
                    add υ*u*τ Cx; υ := u
                else exit
                endif
            endif
        else exit
        endif
    forever;
    return υ.
```

The function SEARCH_LINK used above returns the point u adjacent to v in $D(P)$ that lies on the positive side of $v = v * \tau$ and comes first in the order defined by v. One uses exhaustive search of all neighbors of v to find u. As before, the vertices of $\tau$ are denoted by a,b,c.

```
SEARCH_LINK(τ, υ):
    u := nil;
    for all u' adjacent to υ in (P) do
        if ORIENTATION(υ,a,b,c,u') then
            if u = nil or DELAUNAY(υ,a,b,c,u',u) then
                u := u'
            endif
        endif
    endfor;
    return u.
```

It is possible that no u satisfies the requirements and SEARCH_LINK returns u=nil. This is the case only if v belongs to the frontier of $\mathcal{T}$.

Note that the repeated execution of SEARCH_LINK is potentially a time-consuming and wasteful part of the above method. One could use polytope hierarchies, one per 3-dimensional Voronoi cell, so SEARCH_LINK takes only logarithmic time per constructed 4-simplex, see [D. P. DOBKIN AND D. G. KIRKPATRICK. Determining the separation of preprocessed polyhedra—a unified approach. In "Proc. Internat. Conf. Automata, Lang. Progr." Springer Lecture Notes in Comput. Sci. 443, 1990, 400–413]. The implementation of this technique would of course be considerably more complicated than the simple exhaustive search. However, it is questionable whether the additional effort would lead to better performance because typical links are rather small so that exhaustive search may be faster than hierarchical search, at least on the average.

Radix sort for step 3.

Figure 4:
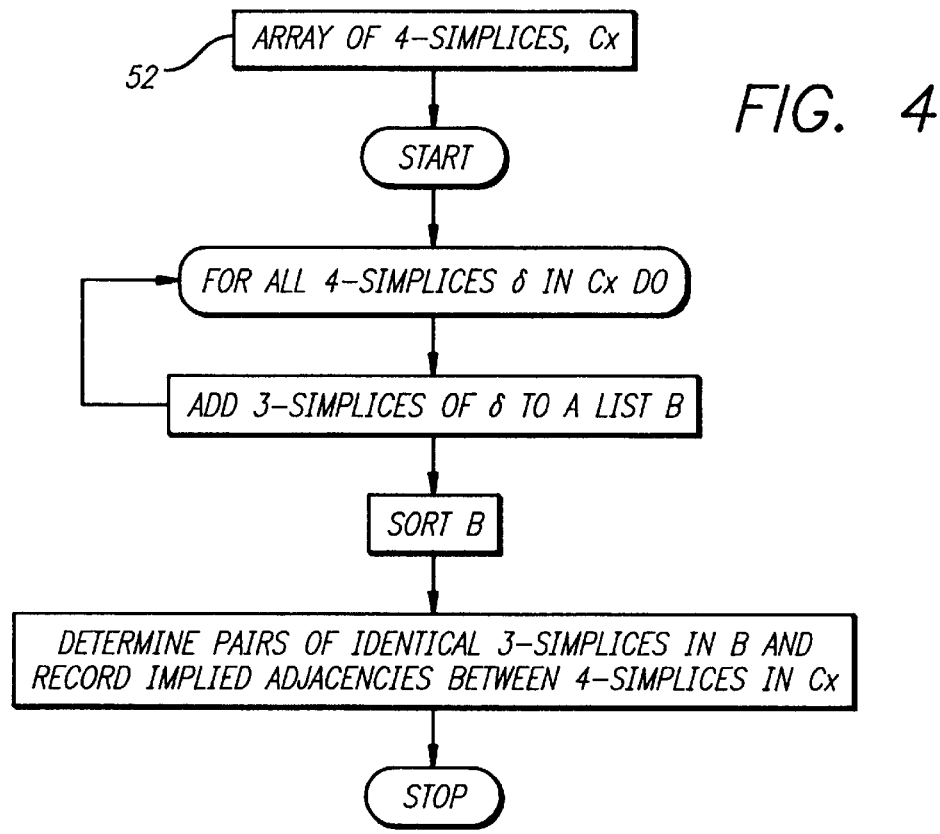
FIG. 4 is a block diagram depicting further details of the step of determining adjacancies between 4-simplices shown in FIG. 2.

The 4-simplices constructed in steps I and 2 are adjacent across shared 3-simplices. FIG. 4 shows how the 3-simplices connecting the 4-simplices are constructed. The input is specified in 52. Any 3-simplex either belongs to two or to one 4-simplex. In the former case it reveals an adjacency. In the latter case it belongs to the frontier of $\mathcal{T}$. One uses radix sort to identify and match the 4-simplices that contain the same 3-simplex. The sort operates on a multiset of 3-simplices, where each copy corresponds to a unique 4-simplex coface. The sort is based on an arbitrary but fixed ordering of the vertices of each 3-simplex. The t-th pass of radix sort assigns a 3-simplex to the bin of its t-th vertex. The fixed ordering is defined by a function REF_TO_VERTEX($\tau$, t).

$\tau$ is the reference of a 3-simplex, see the note at the end of section Definitions, and $0 \leq t \leq 3$ identifies one of its vertices. The function takes $\tau$ and t as input parameters and returns the (t+1)-smallest index of its 4 vertices.

Let B be an array of bins, one per vertex index. Each bin consists of a stack of references. Since stack sizes are difficult to predict, one uses a linked list representation and manipulate the stack B[i] with push and pop operations.

PUSH(r, i)

adds the reference $\tau$ as the new topmost element to the stack B[i].

POP(i)

removes the topmost element from the stack B[i] and returns the reference it stores. The first pass of radix sort scans the 4-simplices in Cx, and for each 4-simplex it extracts the references of the 3-dimensional faces, $\tau$, and assigns them to the bins of their last vertices:

PUSH($\tau$, REF_TO_VERTEX($\tau$, 4)).

The next three passes assign the 3-simplices to the bins of their 3rd, 2nd, and 1st vertices:

```
for ι: = 2 downto 0 do
    for all vertex indices i do
        while B[i] is non-empty do
            r: = POP(i);
            PUSH(r, REF_TO_VERTEX(r, ι + 1))
        endwhile
    endfor
endfor.
```

Of course, the same stack cannot be used for collection and assignment at the same time. To avoid this technical difficulty one uses two stacks per bin, one for collection and one for assignment. After completing a pass the two stacks change roles.

The last pass of radix sort collects the 3-simplices from the bins. The order of the computation guarantees that the two copies of the same 3-simplex are in consecutive positions inside the same bin. The two copies contain pointers to two different 4-simplices which can now be connected via adjacency pointers. Single copies of 3-simplices are ignored.

```
for all vertex indices i do
    τ₁ := nil;
    while B[i] is non-empty do
        if τ₁ = nil then
            τ₁ := POP(i)
        else
            τ₂ := POP(i);
            if τ₁ and τ₂ reference same 3-simplex then
                record 4-simplices of τ₁ and τ₂ as adjacent;
                τ₁ := nil
            else
                τ₁ := τ₂
            endif
```

-continued

```
    endif
  endwhile
endfor.
```

Note that the construction of $\mathcal{T}$ can be interpreted as a way to superimpose two 3-dimensional weighted Voronoi diagrams, the one for P with the one for Q, see section Definitions. Indeed, the weighted Voronoi diagram for P∪Q, both appropriately embedded in $R^4$, can be viewed to consist of three parts. Two parts are copies of the 3-dimensional Voronoi diagrams for P and for Q, extended orthogonally along the $x_5$-axis. These two parts meet along the third part, whose projection to the first 3 coordinates is the superposition of the two 3-dimensional weighted Voronoi diagrams.

A GENERAL FRAMEWORK

This section presents a general framework for mixed shapes including all extensions mentioned above. A filter of a simplicial complex, $\mathcal{K}$, is an ordering of its simplices so that every prefix of the ordering defines a subcomplex, see also chapter 9 of [E. H. SPANIER. *Algebraic Topology*. Springer-Verlag, New York, 1966]. The proper general framework for the morphing method of this specification consists of an extension of this notion to higher dimensional orderings using arrangements of hyperplanes and quadratic hypersurfaces. To make this precise, consider the general case, where one morphs between k shapes, $$Y_1, Y_2, \ldots, Y_k \text{ in } R^d,$$

each represented by an alpha complex, $\mathcal{K}_{\alpha_i}(P_i)$, with $P_i \subseteq R^d \times R$ and $\alpha_i^2 \in R$ for $1 \leq i \leq k$. Let $$t = (t_1, t_2, \ldots, t_k),$$

with $\Sigma^k_{i=1} t_i = 1$ and $t_i \geq 0$, and set $\gamma^2 \Sigma^k_{i=1} t_i \alpha_i^2$. The shape Y represented by $\mathcal{K}_\gamma(M_t)$ mixes the $Y_i$ in proportions $t_i$. The arrangement, H, is obtained by taking the vertices of a (k−1)-simplex, ω, in $R^k$ and drawing a line through each vertex orthogonal to the affine hull, aff ω, of ω, see FIG. 13, where the ith vertex or line represents all alpha complexes of $P_i$. Similarly, embed ω in $R^{d+k-1}$, and for each vertex consider the d-flat through the vertex orthogonal to aff ω. One uses a coordinate system so aff ω is spanned by the last k−1 axes. $Y_i$ has a natural embedding in the ith d-flat by reusing the coordinates of the points in $P_i$.

Define $P = \cup^k_{i=1} P_i$, with the $P_i$ embedded in $R^{d+k-1}$ as explained. The global data structure is the weighted Delaunay complex, $\mathcal{T}$, of P. Every convex combination of the k d-flats, which is again a d-flat orthogonal to aff ω, cuts $\mathcal{T}$ in a cross-section. The mixed shape is defined by the γ-complex of the cross-section.

Each simplex in $\mathcal{T}$ is the join of k simplices, one in each $\mathcal{D}(P_i)$. Depending on the dimension of a simplex one computes some constant number of sizes, as explained in section Extracting a Mixed Complex, so the resulting points uniquely define the corresponding hypersurface. The arrangement consists of a hypersurface per simplex in T= $\mathcal{T} - \cup^k_{i=1} \mathcal{D}(P_i)$. If σ ∈ T is the join of simplices $\sigma_i$, $1 \leq i \leq k$, then its cross-section is the Cartesian product of positive homothets of these $\sigma_i$.

Each chamber in the strip $R^d \times \omega$ of the arrangement H corresponds to a complex whose metric properties vary for different points in this chamber. For a line R×u, u ∈ ω ⊆ $R^k$, one gets a fixed cross-section of $\mathcal{T}$ and a filter of this cross-section as one travels along this line.

Now, extensions (1), (2), (3) and (4) mentioned in section Defintions should be clear. A path in H corresponds to a morphing sequence. For each chamber, one can compute properties of the corresponding mixed shape, and to continue the path one can make a choice among all neighboring chambers. For example, one could attempt to keep the volume as close to constant as possible when one morphs from one shape to another with the same volume. Additional flexibility can be derived from the possibility to bend the d-flat defining the cross-section. The geometric integrity of the mixed shapes is maintained provided the bending satisfies some mild continuity requirements.

The process for constructing the skin is described in FIG. 7. The input consists of the Delaunay complex at a certain time t as shown at 66. The skin consists of quadratic surface patches, each corresponding to a simplex in the Delaunay complex. The process scans all Delaunay simplices and constructs one patch at a time.

Figure 8:
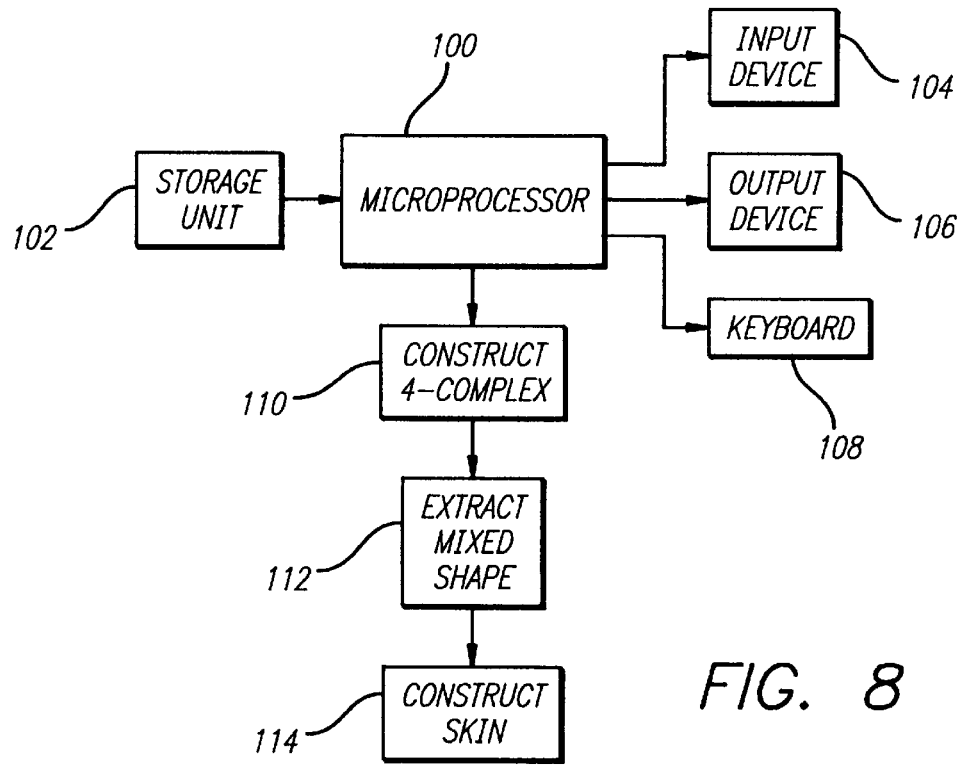
FIG. 8 is a schematic diagram of a system of a preferred embodiment of the present invention.

As shown in FIG. 8, the system includes a central processing unit or microprocessor coupled to a storage unit or storage medium 102, which may consist, for example, of a computer memory or a floppy diskette or a CD-ROM that stores a executable computer instructions of code. The storage unit 102 also stores point set data input from an input device 104. The input device 104 may take the form, for example, of a nuclear magnetic resonance measuring device, a cat scan device or a laser ray finder, each of which generates a data point sets corresponding to a particular shape. More simply, the input device may consist only of a computer file of point set data.

The output of the process is shown on an output device 106 such as a video display or virtual reality system that visually displays the morphing process from a first shape to a second shape. The microprocessor 100 also receives user commands and instructions from a keyboard 108.

As shown at 110, after the appropriate data is input into the system and the appropriate morphing parameters are defined, the system first constructs 4-complex. Then, as shown at 112, the system extracts the appropriate mixed shape, and finally constructs a skin 114. In a preferred embodiment, the skin of the mixed shape is visually depicted on an output device 106, such as a graphics monitor or a virtual environment display system.

In a preferred embodiment of the system disclosed in the patent, software written in the C programming language is run on a Silicon Graphics workstation using the Unix operating system. The workstation has 32MB RAM, 10 MB hard disk, a Mips R4000, R4400 or R8000 microprocessor and uses a color Silicon Graphics monitor. The linker required is GL/OpenGL, XLib. A copy of source code written in the C programming language is included in this specification.

As discussed previously in this application, the visual appearance is determined by the skin surface, which is described in further detailing the following. Skin or flesh is added to the alpha shapes images to produce a visually pleasing image.

The skin of a set of weighted points in $R^d$ is defined as a differentiable and orientable (d−1)-manifold surrounding the points. The skin varies continuously with the points and weights and at all times maintains the homotopy equivalence between the dual shape of the points and the body enclosed by the skin. The variation allows for arbitrary changes in topological connectivity, each accompanied by a momentary violation of the manifold property. The skin has applications to molecular modeling and docking and to geometric metamorphoss.

1 Introduction

The maiu purpose of this paper is the introduction of a new concept combining the intuitive ideas of geometric shape and continuous deformation. It is based on the combinatorial notions of Voronoi and Delaunay complexes [3, 19] developed in the area of discrete and computational geometry.

Shape and shape change.

The intuitive idea of a geometric shape seems clear or at least sufficiently clear so any further effort towards a precise definition is frequently discarded as a waste of precious time. Indeed, such contemplative effort too often results in the awkward realization that there is little hope for an exact and generally satisfying definition of shape. Too complex and too varied are the geometric sets and phenomena one would hope to encompass and classify.

The resulting common practice is the treatment of the word 'shape' as the descriptor of a vague and fuzzy concept. In contradiction to this tendency, the development of alpha shapes [8, 9] is an attempt to rigorously and unambiguously specify the shape of a finite point set. To be more accurate, a one-parametric family of polyhedra is suggested to represent the shape of the set. The parameter, $\alpha$, specifies the degree of detail or the desired compromise between crude and fine description. The purpose of this development has always been partially computational. Efficient algorithms have been described in the above references and publically available software exists for 2 and 3 dimensions [1].

The alpha shape is a polyhedron embedded in the same Euclidean space as the point data, say in $R^3$. It changes as discrete values of $\alpha$, and a typical change adds or removes a vertex, an edge, a triangle, or a tetrahedron. The piecewise linear and discretely changing nature of the concept admits a purely combinatorial treatment with all associated computational advantages. The remaining quest for a differentiable and continuously changing surface that represents shape is partly motivated by aesthetic consideration. The purpose of this paper is the introduction of such a surface that remains faithful to the idea of alpha shapes.

Illustration and summary of results.

The main new concept in this paper is the alpha skin of a finite set of points with weights. Think of a weighted point as a spherical ball with the point as center and the weight as radius. Denote the resulting set of balls by B. The parameter, $\alpha$, is used to simultaneously increase or decrease all radii and to change B to $B_\alpha$. A ball $b \in B_\alpha$ is redundant if the Voronoi complex defined by $B_\alpha$ is the same as that of $B_\alpha - \{b\}$. Let ucl $B_\alpha$ be maximal so the subsets of non-redundant balls in ucl $B_\alpha$ and in $B_\alpha$ are the same. ucl $B_\alpha$ of course contains infinitely many balls. Now shrink every ball $b \in $ ucl $B_\alpha$ by a factor 1 $\sqrt{2}$ towards its center. The union of the infinitely many reduced balls is the $\alpha$-body, $R_\alpha$, and $$S_\alpha = \text{bd } R_\alpha$$

is the $\alpha$-skin of B.

As an example consider FIG. 1. The alpha shape is the subset of $R^2$ covered by a subcomplex of the Delaunay complex. The alpha skin is a collection of simple closed curves surrounding the alpha shape. There is a closed curve for each component and for each hole of the alpha shape. The collection of closed curves decomposes $R^2$ into regions, exactly one of which is unbounded. The $\alpha$-body, $R_\alpha$, consists of all regions separated from the unbounded region by an odd number of closed curves. Each component of $R_\alpha$ contains a connected piece of the alpha shape, and each component of the complement contains a connected piece of a complementary shape covered by a subcomplex of the Voronoi complex. A short list of noteworthy properties enjoyed by the alpha skin and body follows.

(1) In the non-degenerate case, $S_\alpha$, is a differentiable (d−1)-manifold consisting of finitely many patches of low algebraic degree.

(2) There are finitely many values of $\alpha$ at which the non-degeneracy assumption does not apply. For each such $\alpha$, $S_\alpha$ has finitely many points violating the manifold requirement. This is where and when the topology of $S_\alpha$ changes.

(3) The alpha body, $R_\alpha$, is homotopy equivalent to the alpha shape.

(4) $R_\alpha$ changes continuously with $\alpha$, that is, if the difference between two values of $\alpha$ is small then the Hausdorff distance between the two $\alpha$-bodies is small.

(5) Locally, $S_\alpha$ looks the same from both sides. That is, there is a set of (weighted) points on the other side whose skin is the same as $S_\alpha$.

Style and outline.

An effort is made to describe all ideas in a concise and reasonably self-contained manner. The reader uncomfortable with the resulting style might find help in textbooks discussing similar material in a more leisurely fashion [11, 12]. Some of the concepts in this paper are well known and others are new. For example, the Voronoi and Delaunay complexes discussed in section 2 are among the most comprehensively studied data structures in computational geometry [5, 17]. On the other hand, the mixed complex of section 4 whose cells are sums of corresponding Voronoi and Delaunay cells is new. As a general policy, formal proofs are omitted and claims requiring lengthy arguments are left unjustified. The emphasis in this paper is to illustrate that Voronoi and Delaunay complexes form the foundation of a rich topological and combinatorial theory suitable to computing, studying, and describing general geometric shapes.

Section 2 introduces Voronoi and Delaunay complexes. Section 3 introduces alpha shapes, orthogonal balls, and complementary shapes. Section 4 constructs the alpha skin as the half-way point of a deformation retracting a union of balls to the complement of the union of orthogonal balls. Section 5 studies the evolution of the alpha skin over the range of alpha values. Section 6 briefly mentions possible applications to molecular modeling and docking and to geometric metamorphosis.

2 Proximity Complexes

This section reviews Voronoi and Delaunay complexes forming the combinatorial basis of all our constructions. For greater generality, the complexes are defined for sets of spherical balls (or points with weights) rather than for unweighted points.

Voronoi cells.

The (Euclidean) norm of a point $x \in R^d$ is the root of the sum of its coordinates squared, $\|x\|=(x,x)^{1/2}$. The (Euclidean) distance between two points x, $y \in R^d$ is $|xy|=\|x-y\|$. The (d-dimensional spherical) ball with center $z \in R^d$ and radius $\zeta$ is $$b(z,\zeta) = \{x \in R^d | \ |xz|^2 \leq \zeta^2\}.$$

Negative values of $\zeta^2$ are important in this paper. We thus choose $\zeta$ from the set of positive square roots of real numbers: $\zeta \in R^{1/2}$ and therefore $\zeta^2 \in R$. This convention has only formal consequences and all formulas are written in terms of $\zeta^2$ rather than $\zeta$. By definition, $b(z,\zeta)$ is empty if $\zeta^2 < 0$. The weighted distance of a point $x \in R^d$ from $b=b(z,\zeta)$ is $$\pi_b(x) = |xz|^2 - \zeta^2 = \|x\|^2 - 2(x, z) + \|z\|^2 - \zeta^2.$$

Observe $\pi_b(x)>0$ if $x \notin b$, $\pi_b(x)=0$ if $x \in $ bd b, and $\pi_b(x)<0$ if $x \in $ int b. The points with equal weighted distance from two balls lie on a hyperplane. Let B be a finite set of balls in $R^d$. The Voronoi region of $b \in B$ is $$v_b = \{x \in R^d | \pi_b(x) \leq \pi_a(x) \text{ for all } a \in B\}.$$

Voronoi regions are convex polyhedra which overlap at most along their boundaries, and if they overlap they intersect in convex polyhedra of dimension d−1 or less. A Voronoi k-cell is a k-dimensional convex polyhedron of the form $$v_X = \bigcap_{b \in X} v_b.$$

We assume $X \subseteq B$ is maximal generating the same common intersection, and we adopt the convention that $v_x = \emptyset$ for non-maximal sets X. $V_B^k$ is the set of Voronoi k-cells, and $$V_B = \bigcup_{k=0}^{d} V_B^k$$

is the Voronoi complex of B, see FIG. 2. Recall $b \in B$ is redundant if $V_B = V_{B-\{b\}}$. It is not difficult to see b is redundant iff its Voronoi region, $v_b$, has dimension d−1 or less. $V_B$ satisfies the properties of a complex: all cells are convex, the intersection of any two cells is either empty or again a cell in $V_B$, and the boundary of every cell is the union of other cells in $V_B$.

Delaunay cells.

A maximal set of Voronoi regions defines a Voronoi cell by intersection and another cell by taking the convex hull of ball centers. The Delaunay cell defined by a set $X \subseteq B$ with $v_x \in V_B$ is the convex hull of the centers of balls in X:

$$\delta_X = \text{conv } \{z \mid b(z,\zeta) \in X \text{ for some } \zeta\}.$$

The dimension of $\delta_X$ is dim $\delta_X$=d−dim $v_X$. $D_B^k$ is the set of Delaunay k-cells, and $$D_B = \bigcup_{k=0}^{d} D_B^k$$

is the Delaunay complex of B, see FIG. 3. Observe the Delaunay vertices are the centers of all non-redundant balls in B. We will see shortly that $D_B$ is indeed a complex.

Piecewise linear convex functions.

Voronoi cells can be interpreted as projections of faces of a convex polyhedron in $R^{d+1}$. Identify $R^d$ with the subspace spanned by the first d coordinate axes. The vertical direction is defined by the (d+1)-st axis. For a point $p \in R^{d+1}$ we write p=(x,ξ) if x is the projection to $R^d$ and ξ is the (d+1)-st coordinate. We also write prj p=x. The projection of a set A $\subseteq R^{d+1}$ is prj A={prj p | p $\in$ A} and its upward closure is $$\text{ucl } A = \{(x,\eta) \mid \eta \geq \xi \text{ for some } (x,\xi) \in A\}.$$

Clearly, prj ucl A=prj A.

A linear function is a map $f: R^d \to R$ defined by f(x)=(u, x)+v, for some $u \in R^d$ and $v \in R$. A point p=(x,ξ) $\in R^{d+1}$ lies on $f$ if ξ=f(x). Similarly, p lies above $f$ if ξ>f(x) and p lies below $f$ if ξ<f(x). The graph of f is the set of points on $f$; it is a non-vertical hyperplane in $R^{d+1}$. We generally ignore the difference between a function and its graph. For a ball b=b(z,ζ) define $$f_b(x) = 2(z,x) - \|z\|^2 + \zeta^2,$$

and observe that $f_b(x) = \|x\|^2 - \pi_b(x)$. It follows that x belongs to the Voronoi region of $b \in B$ iff $f_b(x) \geq f_a(x)$ for every $a \in B$. This suggests we define $$F_B(x) = \max\{f_b(x) \mid b \in B\}.$$

$F_B$ is a piecewise linear convex map. Its graph is the boundary of a convex polyhedron: $F_B$=bd ucl $F_B$. A hyperplane supports $F_B$ if its intersection with $F_B$ is non-empty and no point of the hyperplane lies above $F_B$. The faces of $F_B$ are the intersections with supporting hyperplanes. The above discussion implies the following easy and useful result.

FACT 1. The projection to $R^d$ of the faces of $F_B$ are the Voronoi cells of B.

To express the bijection we write $\rho_X$ for the face of $F_B$ with prj $\rho_X = v_X \in V_B$.

Polarity.

Similar to Voronoi cells, Delaunay cells can be interpreted as projections of faces of a convex polyhedron. The polar point of a linear function g(x)=(u, x)+v is $$p(g) = (u/2, -v),$$

which is a point in $R^{d+1}$. We write $p_b = p(g)$ if $g = f_b$, and for b=b(z,ζ) we have $$p_b = (z, \|z\|^2 - \zeta^2)$$
$$= (z, f_b(z) - 2\zeta^2).$$

The following is easy to prove.

FACT 2. Let $g_1$, $g_2$ be linear functions and $p_1 = p(g_1)$, $p_2 = p(g_2)$ the corresponding polar points.

(i) $p_1 \in g_2$ iff $p_2 \in g_1$.

(ii) $p_1$ lies above $g_2$ iff $p_2$ lies above $g_1$.

It follows every point above $F_B$ corresponds to a linear function below all points $p_b$, $b \in B$. Let Z be the set of centers of balls in B and construct $G_B$ : conv $Z \to R$ defined by $$G_B(x) = \max\{g(x) | p(g) \in \text{ucl } F_B\}.$$

Intuitively, $G_B$ is the lower boundary of the convex hull of all points $p_b$, $b \in B$. The faces of $G_B$ are the intersections with supporting hyperplanes. By fact 2, $f$ supports $F_B$ iff $p(f) \in G_B$, and g supports $G_B$ iff $p(g) \in F_B$. This implies the following useful result.

FACT 3. The projection to $R^d$ of the faces of $G_B$ are the Delaunay cells of B.

Since $G_B$ is a function, $D_B$ is indeed a complex. To express the bijection we write $\gamma_X$ for the face of $G_B$ with prj $\gamma_X = \delta_X \in D_B$.

Balls with centers at infinity.

An inessential difference between Voronoi and Delaunay complexes is that $\cup V_B = R^d$ while $\cup D_B$=conv Z is a compact subset of $R^d$. The difference fades when we grow some balls and simultaneously move their centers to infinity. Such a growing ball can be specified e.g. by fixing a point on its boundary and the tangent hyperplane through this point. The ball approaches the half-space bounded by the said hyperplane.

As the balls grow, their centers drag Delaunay cells with them. In the limit, the centers form Delaunay vertices at infinity and we have two types of Delaunay cells other than the usual ones with finite vertices only. The first type of cell extends to infinity and has at least one but not all vertices at infinity. It resembles an unbounded Voronoi cell. The second type of cell is at infinity and has all its vertices at infinity. It has no counterpart in the ordinary Voronoi complex.

How do the growing balls influence the Voronoi complex? For each ball we have a hyperplane that contains a d-dimensional face of FB. As the balls grow, the hyperplanes get steeper and eventually become vertical. The vertical hyperplanes bound the Voronoi regions of the balls with finite radii. If the limitation is to within a compact subset of $R^d$ then the Voronoi complex resembles an ordinary Delaunay complex, albeit for a different set of balls.

It will be convenient to call a Voronoi complex, $V_B$, and a Delaunay complex, $D_C$, equal if after removing all cells at infinity $V_B$ and $D_C$ are equal as sets of cells. In other words, all cells in the symmetric difference of $V_B$ and $D_C$ are at infinity.

3 Shapes and Channels

General shapes can be defined and generated by taking subcomplexes of either a 15. Delaunay or a Voronoi complex. This section discusses the notion of orthogonality between balls and describes a general method for selecting cells, see also [6].

Orthogonal balls.

Let $b=b(z,\zeta)$ and $c=b(y,\eta)$ be two balls in $R^d$ and define $$\pi_{b,c}=|yz|^2-\eta^2-\zeta^2.$$

b and c are orthogonal if $\pi_{b,c}=0$, and they are further than orthogonal if $\pi_{b,c}>0$. Indeed, $\pi_{b,c}=0$ iff $\pi_b(y)=\eta^2$ iff $\pi_c(z)=\zeta^2$. The spheres bounding two orthogonal balls thus meet at a right angle, see FIG. 4. Observe that $$\begin{aligned}\pi_{b,c} &= \|y\|^2 - 2(y,z) + \|z\|^2 - \eta^2 - \zeta^2 \\ &= \|y\|^2 - \eta^2 - f_b(y).\end{aligned}$$

In words, $\pi_{b,c}$ is the difference between the (d+1)-st coordinate of $p_c$ and $f_b(y)$. It follows b and c are orthogonal iff $p_c \in f_b$ iff $p_b \in f_c$.

Additional properties of linear functions and polar points are derived from their interaction with the graph of $\varpi$: $R^d \to R$ defined by $\varpi(x)=\|x\|^2$. This graph is a paraboloid of revolution and denoted $\varpi$, same as the map. The projection to $R^d$ of the intersection with $f_b$ is prj $(\varpi \cap f_b)$=bd b:

$$\|x\|^2-2(z,x)+\|z\|^2=\zeta^2.$$

Consider the linear function $f_x$ defined for a point $b(x,0)=x \in $ bd b. b and x are orthogonal and therefore $p_b \in f_x \cdot f_x$ is tangent to $\varpi$ and touches $\varpi$ in point $(x,\|x\|^2)$. It follows the hyperplanes $f_x$, $x \in $ bd b, are the tangents of a cone from $p_b$ to $\varpi$. To formally state this observation call $y \in \varpi$ visible from a point p below $\varpi$ if the line segment py=conv $\{p, y\}$ meets $\varpi$ in y only. By definition, no point is visible from a point on or above $\varpi$. Let vis p denote the set of points visible from p.

FACT 4. A point $x \in R^d$ is contained in a ball b iff $(x,\|x\|^2) \in \varpi$ lies on or below $f_b$ iff $(x, \|x\|^2) \in $ vis $p_b$.

Dual complex.

Figure 5:
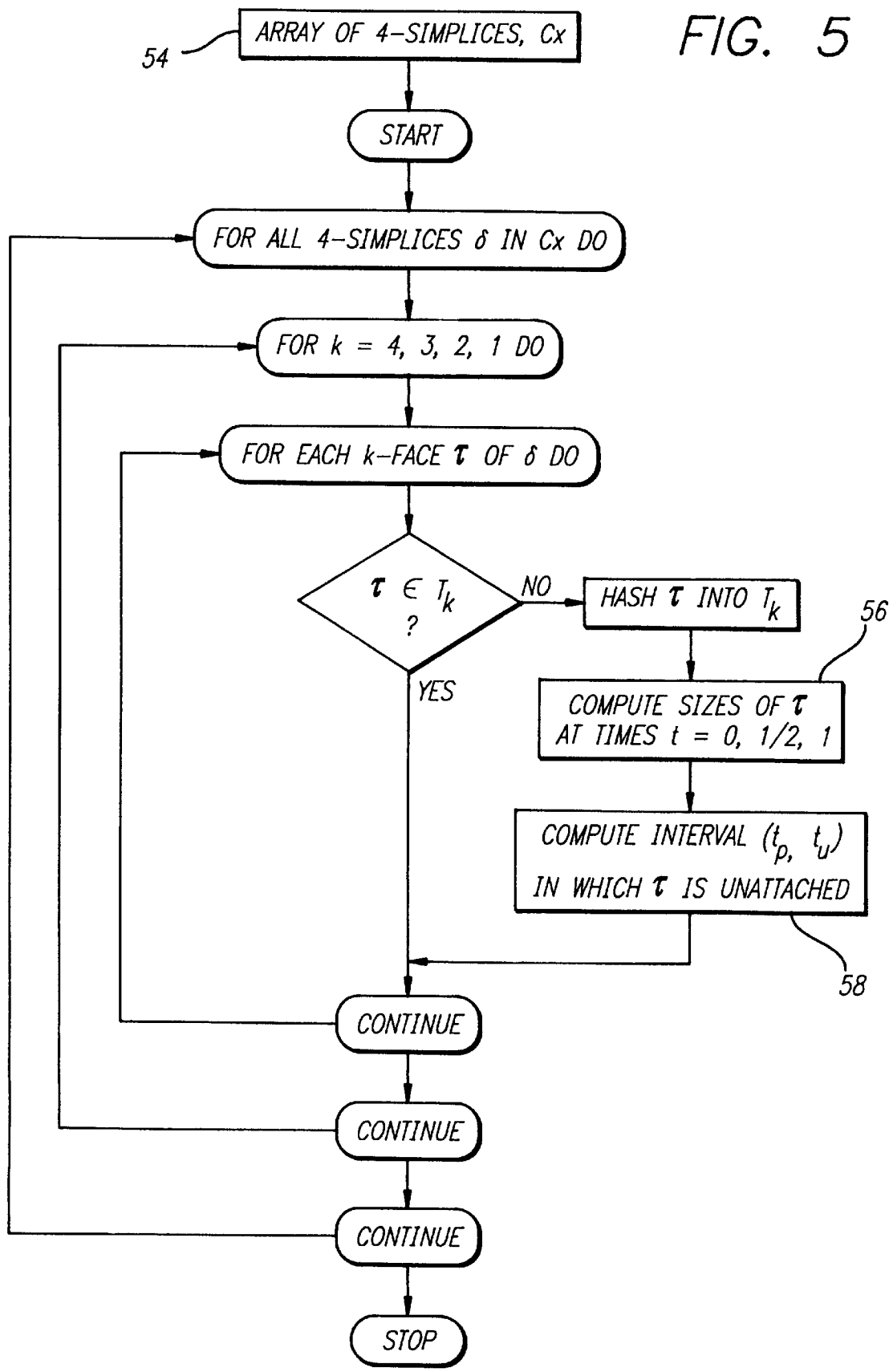
FIG. 5 is a block diagram depicting further details of the step of computing size-curves and unattachement intervals shown in FIG. 2.

Recall $D_B$ is the set of cells $\delta_X$ with $v_X=\cap_{b \in X}v_b \neq \emptyset$. We define a subcomplex by selecting $\delta_X$ only if $v_X$ contains points of the ball union. The dual complex of B is $$K_B=\{\delta_X|v_X \cap \cup B \neq \emptyset\},$$

and the dual shape is $\cup K_B$, see FIG. 5. Clearly, $K_B \subseteq D_B$ is a complex itself. Observe $v_b \cap \cup B = v_b \cap b$ for every $b \in B$, and therefore $$v_X \cap \cup B = \bigcap_{b \in X}(v_b \cap b).$$

To develop a (d+1)-dimensional interpretation of the dual complex recall the bi-jections relating $\delta_X \in D_B$ with $v_X \in V_B$, $\rho_X \subseteq F_B$, and $\gamma_X \subseteq G_B$. By fact 4, $v_X \cap \cup B \neq \emptyset$ iff $\rho_X \cap $ ucl $\varpi \neq \emptyset$. Let g be a linear function with polar point $p(g) \in \rho_X \cap $ ucl $\varpi$. By construction, g supports $G_B$, contains the face $\gamma_X$, and all points of g lie on or below $\varpi$. The existence of g implies that $\delta_X \in K_B$ only if all points of $\gamma_X$ lie on or below $\varpi$. The reverse is not necessarily true. We state the resulting characterizations of the dual complex for later reference.

FACT 5. $\delta_X \in K_B$ iff $\rho_X \cap $ ucl $\varpi \neq \emptyset$ iff there exists a supporting hyperplane g of points on or below $\varpi$ with $g \cap G_B = \gamma_X$.

Because of the symmetry between the Delaunay and Voronoi complex, we can expect the idea of the dual complex also applies to Voronoi complexes. To see this is indeed the case we construct a new set of balls, C, so $V_B$ is $D_C$.

Orthogonal complement.

We are interested in the set of balls orthogonal to or further than orthogonal from all balls $b \in B$:

$$B_\perp=\{c \in R^d \times R | \pi_{b,c} \geq 0 \text{ for all } b \in B\}.$$

This is the set of balls c with $p_c \in $ ucl $F_B$. The set $B_\perp$ can thus be represented by a finite set of balls generating the vertices of $F_B$; all other balls are implied by the upward closure operation. To reproduce the unbounded faces of $F_B$ we also choose vertices at the infinite ends of the unbounded edges. For each point $y \in R^d$, let $\eta_y^2$ be the maximum $\eta^2$ with $(y,\eta) \in B_\perp$. The orthogonal complement of B is the set C of balls $(y,\eta_y)$ over all points y that are either vertices in $V_B$ or lie at the infinite ends of unbounded edges in $V_B$. The balls of the latter type have infinite radius and are really half-spaces, as discussed at the end of section 2. Recall we agreed to call two complexes equal if they are the same after removing cells at infinity. With this understanding we have two sets of balls with interchanged Voronoi and Delaunay complexes:

FACT 6. $D_C=V_B, V_C=D_B, G_C=F_B$, and $F_C=G_B$.

If the balls in B are in general position then the Voronoi cells are simple polyhedra and the Delaunay cells are simplices. It follows the balls in C are not in general position. Indeed, the degeneracy in C suffices to generate simplicial Voronoi cells and simple Delaunay cells. Since $F_C$ and $G_C$ remain unchanged even if balls $c \in B_\perp$ are added to C, fact 6 implies $$\cup C = \cup B_\perp. \qquad (1)$$

As a consequence, the balls in B and C together cover the entire d-dimensional space, see FIG. 6:

FACT 7. $\cup B \cup \cup C = R^d$.

Indeed, if $y \in R^d$ lies outside this union we have $\eta_y^2 > 0$. Adding $(y, \eta_y)$ to C would thus increase $\cup C$, contradicting (1).

Channels.

The cells of the dual complex are contained in the union of the balls: $\cup K_B \subseteq \cup B$. To see this note $G_{R^d} = \varpi$ where $R^d$ denotes the set of balls b(x,0) with zero radius. Similarly, $G_{B \cup R^d}$ is the boundary of the convex hull of $G_B \cup \varpi$. With this preparation $$\cup K_B \subseteq prj(G_B - int\ ucl\ \varpi)$$
$$\subseteq prj(G_{B \cup R^d} - int\ ucl\ \varpi)$$
$$= prj \bigcup_{b \in B} vis\ p_b$$
$$= \cup B.$$

Observe the projection to $R^d$ of the points on $G_B$ that lie below $\varpi$ is the complement of $\cup C$. What we just proved is thus slightly stronger than the claim, namely that the dual shape of B is contained in the closure of the complement of $\cup C$, which in turn is contained in $\cup B$. By symmetry, $\cup B$ is contained in the closure of the complement of the dual shape of C:

FACT 8. $\cup K_B \subseteq cl\ \overline{\cup C} \subseteq \cup B \subseteq cl\ \overline{\cup K_C}$.

In spite of fact 8, it is possible the two dual shapes share common points, see FIG. 7. The common points are indicative of degeneracies where the spheres bounding 2 or more balls intersect in a single point.

Figure 19:
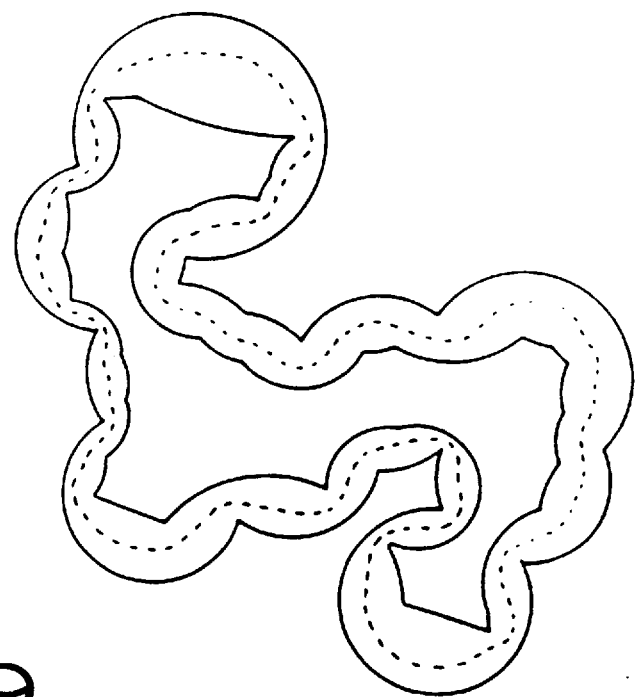
Figure 20:
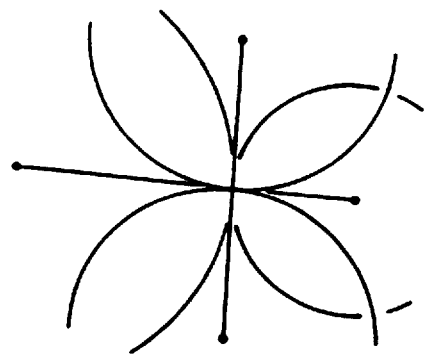
Figure 21:
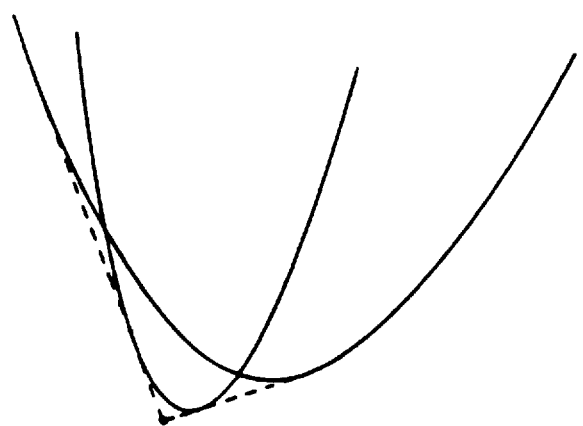

The skin of B will be constructed between the middle two sets in fact 8. Define the outer channel as the set of points that neither belong to $\cup K_B$ nor to $\cup K_C$. The inner channel is $$I_B = int\ \cup B \cap n\ int\ \cup C,$$

see FIG. 19. Both channels are open sets and the outer channel contains the inner channel. By symmetry, the inner channel of B is the same as the inner channel of C, and we write $I = I_B = I_C$.

There is an important difference between the outer and the inner channels. Consider the balls in B changing continuously. The outer channel changes abruptly as cells appear or disappear. In contrast, the inner channel changes gradually. We will exploit this property and construct the skin of B using the closures of the inner channel as the possible location for its points.

4 Skin Through Mixing

This section defines the skin of a set of balls by intersecting $\varpi$ with the graph of a convex map and projecting the intersection. If B is a non-degenerate set of balls in $R^d$, then the skin is a differentiable (d−1)-dimensional manifold separating the dual complexes of B and C.

Mixed volume construction.

The projection to $R^d$ of the points on $G_B$ that lie vertically below $\varpi$ is the complement of $\cup C$. We seek a continuous deformation of $G_B$ so eventually the points below $\varpi$ project to int $\cup B$. To describe the deformation define $$P_0 = ucl\ G_B\ and$$
$$P_1 = ucl\ G_{B \cup R^d}.$$

$P_0$ and $P_1$ are convex bodies and the points of $P_1$ below $\varpi$ indeed project to int $\cup B$. Observe the set of points common to the boundaries of $P_0$ and $P_1$ is $$bd\ P_0 \cap bd\ P_1 = G_B \cap G_{B \cup R^d},$$

and its projection to $R^d$ is the dual shape of B.

The deformation is most naturally defined using weighted Minkowski sums. For each $t \in [0,1]$ define $$P_t = (1-t) \cdot P_0 + t \cdot P_1.$$

Since $P_0 \subseteq P_1$ we have $P_t \subseteq P_u$ whenever $0 \leq t \leq u \leq 1$. Also note the points in common on the boundaries of $P_t$ and $P_u$, $t \neq u$, are the same as the points common to the boundaries of $P_0$ and $P_1$. For $t \in [0,1)$, the t-body of B is $$R_{B,t} = prj\ (P_t \cap \varpi),$$

and for t=1 we supplement $R_{B,1} = \cup B$. By inheritance from the $P_t$ we have $R_{B,t} \subseteq R_{B,u}$ whenever $0 < t < u < 1$. The t-skin of B is the boundary of the t-body:

$$S_{B,t} = bd\ R_{B,t}.$$

In section 5 we will settle for a single representative each of the family of t-bodies and the family of t-skins, both chosen for t=½: $R_{B,1/2}$ is the body and $S_B = S_{B,1/2}$ is the skin of B.

The union of all t-skins, over $t \in [0, 1]$, is the closure of the inner channel. In the non-degenerate case, the t-skin is a manifold, and even in degenerate cases all but a finite number of points $x \in S_{B,t}$ have a neighborhood homeomorphic to $R^{d-1}$.

Non-degenerate skin.

The non-degenerate case can be characterized by the absence of any tangent hyperplane $f$ of $\varpi$ that supports $P_t$ and intersects $\varpi$ and bd $P_t$ in a common point:

$$f \cap \varpi \cap bd\ P_t \neq \emptyset.$$

Such a hyperplane would indicate the existence of a subset of balls in B whose bounding spheres meet in a single point. In the non-degenerate case the t-skins satisfy a few nice properties violated in the degenerate case. For example, the points common to the boundaries of $P_t \neq P_u$ lie strictly below $\varpi$. It follows $S_{B,t} \cap S_{B,u} = \emptyset$ whenever $t \neq u$.

Since the t-skins are differentiable for all $t \in (0, 1)$, we can use the normal direction to construct a fibration of cl I. Each fiber is a simple curve with one endpoint on $S_{B,0} = bd \cup C$ and the other on $S_{B,1} = bd \cup B$. In between its endpoints the fiber meets all t-skins orthogonally. The fibers are pairwise disjoint. This is clear in the inner channel where the t-skins are differentiable. An argument for the disjointness of fibers is needed at the points where $S_{B,0}$ and $S_{B,1}$ are not differentiable. Such an argument is omitted.

FACT 9. In the non-degenerate case, $\cup_{t \in [0,1]} S_{B,t} = cl\ I$ forms an isotopy between $bd \cup C$ and $bd \cup B$.

The isotopy in fact 9 implies the t-skins are topologically all the same. It certainly follows the bodies $R_{B,t}$ are all homotopy equivalent. The homotopy equivalence between $R_{B,1} = \cup B$ and $\cup K_B$ has been established in [6], and by transitivity every $R_{B,t}$ is homotopy equivalent to $\cup K_B$, as stated in section 1, (4).

Distributing Minkowski sums.

It is possible to find a simpler convex body than $P_t$ whose boundary intersects $\varpi$ in the same set of points. First, we rewrite $P_t$ by observing that the Minkowski sum distributes over the upward closure of the convex hull of the union. To state this more clearly define $$Y \sqcup Z = ucl\ conv\ (Y \cup Z)$$

for any two sets Y, $Z \subseteq R^{d+1}$. Let X be another set in $R^{d+1}$.

FACT 10. $X + (Y \sqcup Z) = (X+Y) \sqcup (X+Z)$.

The proof is elementary. Set $\delta = 1-t$ to simplify the application of fact 10 to the definition of $P_t$:

$$P_t = s \cdot P_0 + t \cdot P_1$$
$$= s \cdot P_0 + t \cdot (P_0 - \overline{\omega})$$
$$= (s \cdot P_0 + t \cdot P_0) - (s \cdot P_0 + t \cdot \overline{\omega})$$
$$= P_0 - \sqcup_{b \in B}(s \cdot p_b + t \cdot \overline{\omega}).$$

In words, $P_t$ is the upward closure of the convex hull of $P_0$ and a number of translates of $t \cdot \overline{\omega}$, one per ball in B. Dropping $P_0$ from the expression we get $$Q_t = \sqcup_{b \in B}(s \cdot p_b + t \cdot \overline{\omega}).$$

Union of balls.

We need a few structural properties of $Q_t$, $P_t$, and how they intersect $\overline{\omega}$. Let $q=(z,\zeta)$ be a point in $R^{d+1}$ and $\overline{\omega}_q = s \cdot q + t \cdot \overline{\omega}$ a homothetic copy of $\overline{\omega}$, see FIG. 8. By fact 4, the projection to $R^d$ of the set of points on $\overline{\omega}$ visible from q is the ball $b(z,\zeta)$. Similarly, the projection of the set of visible points on $\overline{\omega}_q$ is the ball $b(z, t\cdot\zeta)$. Now consider the intersection of $\overline{\omega}$ and $\overline{\omega}_q$. Its projection to $R^d$ is a sphere bounding a somewhat larger cocentric ball, namely $$b_{q,t} = b(z, t^{1/2} \cdot \zeta).$$

Since $b_{q,t}$ contains the first ball, for all points $q \in P_0$ and all $t \in [0, 1]$, the difference $P_t - Q_t$ is disjoint from $\overline{\omega}$. This implies $$R_{B,t} = prj(P_t \cap \overline{\omega})$$
$$= prj(Q_t \cap \overline{\omega})$$

for all $t \in [0,1]$. We can thus specify the t-body of B as a union of balls, as anticipated in section 1.

FACT 11. $R_{B,t} = \cup_{q \in P_0} b_{q,t}$.

Mixed complex.

The boundary of $Q_t$ can be decomposed into faces whose projection to $R^d$ define a natural and useful complex. Recall the points $p_b$ are the vertices of $G_B$. We can therefore replace the $p_b$ in (2) by the faces of $G_B$ they span:

$$Q_t = \sqcup_{X \subseteq B}(s \cdot \gamma_X + t \cdot \overline{\omega}).$$

For each face $\delta_X$ of $G_B$, let $\Gamma_X$ be a parabolic cylinder defined by the points in the affine hull of $\gamma_X$:

$$\Gamma_X = bd(s\text{-aff } \gamma_X + t \cdot \overline{\omega}).$$

The d-dimensional face of $Q_t$ defined by X is $$\psi_X = bd Q_t \cap \Gamma_X.$$

The d-faces cover bd $Q_t$ and overlap at most along their boundaries. Let $\mu_X = prj \, \psi_X$ be the projection to $R^d$.

FACT 12. For all $0 \leq t < 1$, $\mu_X = s \cdot \delta_X + t \cdot v_X$.

Figure 22:
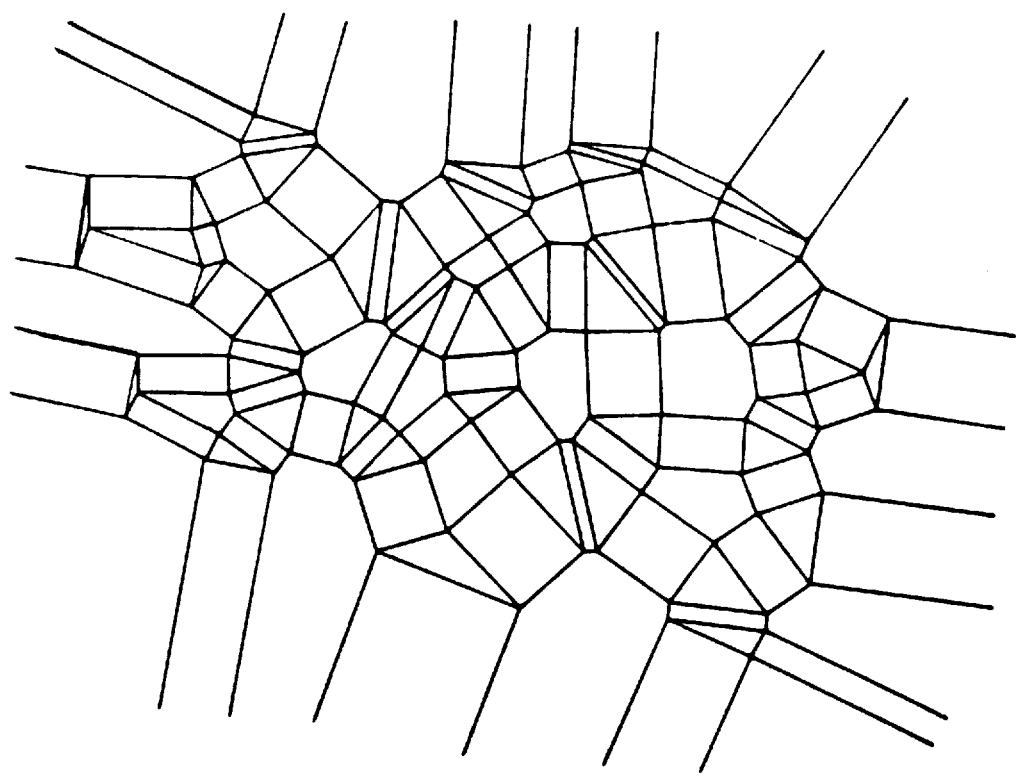

The $\mu_X$ are the d-dimensional cells of a complex in $R^d$. To include lower-dimensional cells we need to add weighted sums of $\delta_X$ with faces of $v_X$ and vice versa. The t-mixed complex of B is $$M_{B,t} = \{s \cdot \delta_X + t \cdot v_Y | X \subseteq Y\},$$

see FIG. 22. For t=0, we have $M_{B,0} = D_B$. Although $M_{B,t}$ can be obtained from $Q_t$ only for t<1, the above definition is fine also for t=1, in which case $M_{B,1} = V_B$. Observe the symmetry in the definition which implies $M_{B,t} = M_{C,s}$. For t=½ the complexes are the same for B and C, and we call $M_B = M_C = M_{B,1/2} = M_{C,1/2}$ the mixed complex of B (and C).

We remark $M_{B,t}$ is in general different from the complex obtained by projecting the faces of s·ucl $F_B$+t·ucl $G_B$.

Although the latter complex generally shares quite a few cells with $M_{B,t}$, there are differences related to Delaunay cells, $\delta_X$, disjoint from their corresponding Voronoi cells, $v_X$.

Patches and symmetry.

The t-mixed complex decomposes the t-skin into patches of low algebraic degree. Consider a d-face $\psi_X$ of $Q_t$ and the parabolic cylinder $\Gamma_X$ that contains it. The type of the cylinder is determined by k=dim $\gamma_X$, which ranges from 0 through d. $\Gamma_X$ is the sum of a k-flat and a paraboloid in the orthogonal (d–k)-dimensional linear subspace of $R^{d+1}$.

As stated in fact 11, the t-body is the union of infinitely many balls. The same is true for the projection to $R^d$ of the set of points on $\Gamma_X$ on or below $\overline{\omega}$. Let this projection be $R_{X,t} = prj \, (ucl \, \Gamma_X \cap \overline{\omega})$, and recall the definition of $b_{q,t}$. Then $$R_{X,t} = \bigcup_{q \in \text{aff}\gamma_X} b_{q,t}.$$

By construction, the patch where the boundary of $R_{X,t}$ coincides with the t-skin, $S_t$, is the part that projects to the corresponding cell in the t-mixed complex:

FACT 13. $S_t \cap \mu_X = bd \, R_{X,t} \cap \mu_X$.

We can do the same exercise the other way round, starting with a Voronoi cell, $v_X$, and the corresponding face $\rho_X$ of $F_B$. In this approach the cylinder is $$\Phi_X = bd(t \cdot \rho_X + s \cdot \overline{\omega}),$$

and the projection to $R^d$ of ucl $\Phi_X \cap \overline{\omega}$ is $$R'_{X,t} = \bigcup_{p \in \text{aff}\phi_X} b_{p,s}.$$

By construction, all balls $b_{q,1}$ with $q \in$ aff $\gamma_X$ are orthogonal to all balls $b_{p,1}$ with $p \in$ aff $\rho_X$. After shrinking two such orthogonal balls by factors $t^{1/2}$ and $s^{1/2}$ towards their respective centers, they are either disjoint or touch in a single point. The latter occurs iff the ratio between the original radii is $t^{1/2}$ to $s^{1/2}$. One of the two affine hulls, say aff $\gamma_X$, contains only points on or below $\overline{\omega}$. For each point $p \in \rho_X$ there is a point $q \in \gamma_X$ so the ratio of radii of $b_{q,1}$ and $b_{p,1}$ is $t^{1/2}$ to $s^{1/2}$. It follows the balls $b_{q,t}$ and $b_{p,s}$ cover $R^d$ without leaving any gap. Since the union of the $b_{q,t}$ shares no interior points with the union of the $b_{p,s}$, they must share the same boundary:

FACT 14. $R'_{X,t} = cl \, \overline{R_{X,t}}$ and $S'_{X,t} = R_{X,t} \cap R'_{X,t}$.

Observe fact 14 implies the skins of B and C, which are defined for s=t=½, are the same: $S_B = S_C$. The bodies are complementary: $R_B = cl \overline{R_C}$.

5 Size Variation with Alpha

The preceding sections considered a static set of balls, B, and defined the orthogonal complement, C, the dual complexes, $K_B$ and $K_C$, and the body and skin, $R_B$ and $S_B$. This section studies the dynamic situation where balls are allowed to grow.

Weighted growth model.

Of all possible growth models we consider the one that keeps the Voronoi complex invariant. The same model has been used in the extension of alpha shapes from unweighted to weighted points [1, 6]. For a ball $b=(z,\zeta)$ and a parameter $\alpha^2 \in R$ define $b_\alpha = (z, (\zeta^2 + \alpha^2)^{1/2})$. For a set of balls B define $B_\alpha = \{b_\alpha | b \in B\}$. The difference between the weighted distances of a point x from b and $b_\alpha$ is $$\pi_b(x) - \pi_{b_\alpha}(x) = |xz|^2 - \zeta^2 - |xz|^2 + \zeta^2 + \alpha^2$$
$$= \alpha^2.$$

Since the change in distance is the same for every point and ball pair, we have $V_{B\alpha}=V_B$ and $D_{B\alpha}=D_B$ for every $\alpha^2 \in R$.

The situation is somewhat different for the dual complexes, $K_B$ and $K_C$. For positive $\alpha^2$ the union of balls grows and so does the dual complex of B. In spite of the additional cells, $K_{B\alpha}$ remains a subcomplex of $D_B$. We call $K_\alpha = K_{B\alpha}$ the $\alpha$-complex of B and $\cup K_\alpha$ the $\alpha$-shape. Similarly, we call $R_\alpha = R_{B\alpha}$ the $\alpha$-body of B and $S_\alpha = S_{B\alpha}$ the $\alpha$-skin.

How does the growth of the balls in B affect the balls in C? The centers remain the same because the Voronoi vertices do not change. To maintain orthogonality, the balls in C must shrink following the same model, and more specifically the orthogonal complement of $B_\alpha$ is $C_{\alpha\sqrt{-1}}$. As mentioned earlier, the skins of a set of balls and of its orthogonal complement are the same:

FACT 15. The $\alpha$-skin of B is the $(\alpha\sqrt{-1})$-skin of C.

Skin evolution.

Although the Voronoi and Delaunay complexes do not change with $\alpha$, the associated convex maps F and G do. In particular, $$F_{B\alpha}(x)=F_B(x)+\alpha^2, \text{ and}$$

$$G_{B\alpha}(x)=G_B(x)-\alpha^2,$$

see section 2. It is convenient to change notation so the index indicates the amount of growth rather than the deformation value, which from now on is fixed to $t=\frac{1}{2}$.

We thus define $$Q_\alpha = \frac{1}{2} \cdot P_0 \frac{1}{2} \cdot \varpi,$$

where $P_0$=ucl $G_{B\alpha}$ is defined with respect to $B_\alpha$. The boundary of $Q_\alpha$ is the graph of a convex map bd $Q_\alpha$: $R^d \to R$. The vertical motion experience by $Q_\alpha$ is half the motion for $P_0$, and therefore $$bdQ_\alpha(x) = bdQ_0(x) - \frac{\alpha^2}{2}.$$

We can understand the evolution of the $\alpha$-skin through a vertical motion of bd $Q_0$. The intersection with $\varpi$ sweeps out the paraboloid, and its projection sweeps out $R^d$ with a continuous succession of skins. The same effect can be obtained by keeping bd $Q_0$ fixed and moving $\varpi$, also vertically but in opposite direction.

Shape history.

A possibly more intuitive picture can be painted by introducing another map, $H=H_B:R^d \to R$, called the history map of B and defined by $$H(x)=bdQ_0(x)- \varpi(x).$$

By construcion, the skin of B is the szero-set: $S_B=\{x \in R^d | H(x)=0\}$. Similarly, the body of B is the projection of the past history: $R_B=\{x \in R^d | H(x) \leq 0\}$. The $\alpha$-skin and $\alpha$-body can be obtained analogously at height $\alpha^2/2$:

$$\text{FACT 16} \cdot S_\alpha = \left\{ x \in R^d | H(x) = \frac{\alpha^2}{2} \right\} \text{ and}$$

$$R_\alpha = \left\{ x \in R^d | H(x) \leq \frac{\alpha^2}{2} \right\}.$$

We have arrived at a fairly satisfying picture for the succession of $\alpha$-skins and $\alpha$-bodies representing the shape of a set of balls at all levels of detail: the history map is an everywhere differentiable map, and the succession of $S_\alpha$ and $R_\alpha$ can be recovered by sweeping H with a horizontal hyperplane from bottom to top.

Similar to the skin, H consists of patches of low algebraic degree. There is one patch per d-cell of the mixed complex, $M_B$. While exchanging B and C leaves the skin invariant, it causes a reflection of the history map:

$$H_C(x) = -H_B(x)$$

for all $x \in R^d$. This is consistent with the earlier claim that the skin of B and C is common to the complementary bodies, $R_B$ and $R_C$, see fact 14.

As already mentioned in section 1, the $\alpha$-skin has the ability to change its topology with changing $\alpha$. This happens when the hyperplane passes through a critical value $\xi=H(x) \in R$ defined by a point x where all partial derivatives vanish. Right at the moment the sweep reaches $\xi$, the skin develops one or more singularities violating the manifold requirement, and these singular points disappear immediately after passing $\xi$. Each such singularity forms a local transition of connectivity. The detailed study of this phenomenon is the topic of Morse theory [16]. The algorithmic issues in maintaining the betti numbers of the the $\alpha$-body are the same as in the incremental construction of complexes [4].

6 Applications

Applications of the concepts in this paper are most interesting for the 3-dimensional real space. In $R^3$ the skin is a closed surface. The idea of defining a surface by placing points and choosing weights is reminiscent to the method of splines, see e.g. [10]. It seems worthwhile to study the use of skin in the generic construction of surfaces in computer aided geometric design. The rest of this section considers two specific problems involving surfaces.

Molecular modeling and docking.

The union of 3-dimensional spherical balls is a standard representation for molecules with known relative atom positions, see e.g. [15]. The application of this representation to the problem of molecular docking [2] suggests the construction of a similar representation for the outside or complement. This idea has been pursued by Kuntz and coworkers, see e.g. [14]. They identify regions in the complement that are of particular interest and fill these regions with spherical balls. After removing the balls of the molecule, they are left with an approximate negative imprint, which is then used to search for matching molecules through shape similarity. The spherical balls filling the complementary region have the same purpose as the balls in the orthogonal complement, see section 3. The (exact) complementarity of the bodies of B and of C is relevant in this context as it asserts there is a perfect geometric match between B, e.g. representing a biomolecule, and C, e.g. representing a ligand.

In order to limit the investigation to regions of interest, we can either use a priori knowledge to restrict the orthogonal complement to an active site, or we can compute pockets in the complement where interesting molecular interaction is likely to happen. [7] offers an unambiguous definition of a 3-dimensional pocket of a union of balls, ∪B. Intuitively, this is a region or subset of the complement with limited accessibility from the outside. By construction, part of the orthogonal complement fills up the pocket, and we may be tempted to consider that part the matching protrusion of ∪C. By symmetry, we just obtained a definition of a protrusion of ∪B.

We note the similarity between the skin of B and the molecular surface of ∪B as defined in [18]. The molecular surface suffers from occasional self-intersections, whereas the skin is the boundary of a proper body in $R^3$. Another difference between the two surfaces is the relation between inside and outside. The skin is locally symmetric in the sense it can be defined by a set of balls inside and alternatively by a set of balls outside. The molecular surface is asymmetric and an exact match with the molecular surface of a docking ligand cannot exist.

Geometric metamorphosis.

Suppose we are given two geometric objects or shapes, X and Y. The problem of geometric metamorphosis or morphing asks for the construction of some kind of continuous deformation that gradually changes X to Y. The 3-dimensional instance of this problem has been studied in the computer graphics literature, and various methods for its solution have been proposed, see e.g. [13]. The currently published methods suffer from a variety of limitations. The most difficult obstacle to overcome seems to be the meaningful planning of changing topological connectivity. Such change is necessary unless X and Y have the same homotopy type.

The author of this paper is collaborating on ideas to use alpha complexes and alpha skins in the construction of a deformation that changes X to Y. Methodologically, this means geometry is given priority over topology, which follows by the uniqueness of the alpha complex of a given input set. After constructing the succession of complexes specifying the deformation, the skin is used to obtain a gradually changing geometric representation that follows through the same sequence of topological connectivity.

It is to be understood, however, that additional alternative forms of the various components of the described embodiments are covered by the full scope of equivalents of the claimed invention. Moreover, the methods described in this specification have applications in a broad range of fields, for example, commerce and entertainment, medical imaging, dentistry, geometric modelling and CAD/CAM design, biology and chemistry modelling and grid generation.

Possible extensions. The morphing method described in this specification can be extended in various directions. Each extension increases the complexity of the methods involved.

(1) Variable morphing paths. As t increases from 0 to 1 the parameter a that controls the scale or degree of detail in the shape representation can be continuously varied. By varying α and t simultaneously, it is possible to define arbitrary morphing paths from Y to Z that remain inside the two-dimensional parameter space.

(2) More than two shapes. Given k shapes, $Y_i$, and k non-negative variables, $t_i$, with $\Sigma^k_{i=1} t_i = 1$, one can define a mixing of the $Y_i$ in the proportions specified by the $t_i$. In other words, it is possible to define morphing paths that freely mix a number of shapes in arbitrary proportions.

(3) Topological cross-sections. The morphing can be time-warped so it proceeds with different speed at different parts of space.

(4) Arbitrary dimensions. All concepts can- be extended to $R^d$, for any arbitrary fixed positive integer dimension d.

For any value of t ∈ [0, 1], $X_t$ is represented by an alpha complex in $R^3$, and there are efficient methods that compute metric, topological, and combinatorial properties, see [C. J. A. DELFINADO AND H. EDELSBRUNNER. An incremental algorithm for Betti numbers of simplicial complexes on the 3-sphere. *Comput. Aided Geom. Design* 12 (1995), 771–784], [H. EDELSBRUNNER. The union of balls and its dual shape. *Discrete Comput. Geom.* 13 (1995), 415–440], and [H. EDELSBRUNNER AND E. P. MÜCKE. Three-dimensional alpha shapes. *ACM Trans. Graphics* 13 (1994), 43–72]. Such methods can be used to monitor $X_t$ or plan a path defined by t and α in order to optimize desirable properties. This application of (1) is related to the following possibility opened up by (2). Instead of directly morphing from Y to Z one can use a third shape, Y', and plan a path from Y to Z that passes through a shape mixing fractions of all three. For example, one can define Y' as a round shape so that mixing in Y' tends to have a fattening effect. As explained below, a morphing path can be interpreted as a sequence of cross-sections with a hyperplane in $R^4$. The time-warping effects indicated in (3) can be obtained by bending this hyperplane in the 4th dimension.

By way of one example only, the system may be used to morph two brain images, such as a first abnormal brain and a second normal brain. A precise and accurate morphing of the two brain images may assist doctors and clinicians in diagnosing and analyzing brain abnormalities. Moreover, it is also possible to restrict cerain parameters during the morphing process, such as maintaining a constant brain volume, further adding to diagnostic effectiveness of the system.

To particularly point out and distinctly claim the subjects regarded as the invention, claims conclude this specification. Immediately following is the C-language listing for the instructions used in the preferred embodiment and stored in the storage unit 102:

```
/* Copyright (c) 1995, Board of Trustees of the University of Illinois */

/* Geometric Morphing Software   */
/* Department of Computer Science and National Center for Supercomputing */
/*     Applications at the University of Illinois at Urbana-Champaign */
/*******************************/
/*
/* morph.h                */
/* This is the main header file */
/* of the morphing software.    */
/*******************************/ ifndef __MORPH_H__   /* Include this file only once! */
```

```
       #define __MORPH_H__ define NIL -1

       /*----------------------------------------------------------------*/ include <string.h>
       #include "basic.h"
       #include "../mkalf/mkalf.h"
       #include "alf.h"
       #include "trist.h"

/*----------------------------------------------------------------*/

       typedef struct Mrf_info_type
       {
           int vP, eP, fP, tP;      /* number of simplices in DelP         */
                                    /* points in P have indices 1..vP      */
           int vhP, ehP, fhP;       /* number of simplices on convex hull of P */
           int ePmax, tPmax;        /* size of edge and tetra hash tables for P */
```

```
         int vQ, eQ, fQ, tQ;           /* number of simplices in DelQ        */

/* points in Q have indices vP+1..vP+vQ */ int vhQ, ehQ, fhQ;            /* number of simplices on convex hull of Q */ int eQmax, tQmax;             /* size of edge and tetra hash tables for Q */

int vX, eX, fX, tX;           /* number of simplices in cross-section, X */ int triX, qdrX;               /* fX = triX + qdrX                   */ int tetX, priX;               /* tX = tetX + priX                   */ int vhX, ehX, fhX;            /* number of simplices on convex hull of X */

         int trihX, qdrhX;             /* fhX = trihX + qdrhX                */ int sx00;                     /* vX = sx00                          */ int sx10, sx01;               /* eX = sx10 + sx01                   */ int sx20, sx11, sx02;         /* triX = sx20 + sx02, qdrX = sx11    */

         int sx30, sx21, sx12, sx03;   /* tetX = sx30 + sx03, priX = sx21 + sx12 */ int sx0, sx1, sx2, sx3, sx4;  /* number of simplices in 4-complex Cx */

/* sx0 = vP + vQ,    sx1 = eP + vX + eQ, */

/* sx2 = fP + eX + fQ, sx3 = tP + fX + tQ, */

                                       /* sx4 = tX is size of complex, Cx[1..sx4] */ int flatCx;                   /* number of flat 4-simplices         */
```

```
    } Mrf_info;

typedef struct Mrf_cx_type
    {
      int dimP;              /* dimQ = 3 - dimP: 03, 12, 21, 30      */
      int sigmaP, sigmaQ;    /* indices into tables of v, e, f, t    */
      int adj[5];            /* indices into the complex, Cx         */
    } Mrf_cx;

    typedef struct Mrf_ksx_type
    {
      int ref;
    } Mrf_ksx;

    typedef struct Mrf_type
    {
      Mrf_ksx *T1;           /* table [1..vX] of 1-simplices         */
      Mrf_ksx *T2;           /* table [1..eX] of 2-simplices         */
      Mrf_ksx *T3;           /* table [1..fX] of 3-simplices         */
      Mrf_ksx *T4;           /* table [1..tX] of 4-simplices         */
    } Mrf;
```

```
       typedef int Matrix[6][6];      /* used for determinant computation */ typedef int Vector[6];

typedef int Endpts[5];          /* end points of a 4 simplex */
```

```
       /* MORPH.C ------------------------------------------------------*/

/* Contains main program and support functions for global variables.    */

/*-------------------------------------------------------------------*/ extern Mrf *mrf_tbls; extern Mrf_cx *Cx; extern int Cxsize; extern Mrf_info *mrfi; extern
       Alf_vect *coords; extern Alf_adt alf1, alf2;

void create_vertex_ef ();           /* to be moved to alf library */ int alf_vertex_ef ();
                  /* to be moved to alf library */ void init_info (); void increment_info ();
       void init_Cx (); void copy_4sx (); int double_Cx (); int compactify_Cx ();
       /* COMPLEX.C ---------------------------------------------------*/

/* Contains functions for the construction of the 4-complex, Cx.     */

/*-------------------------------------------------------------------*/

       extern int PQ;
```

BANNER & ALLEGRETTI, LTD.
10 South Wacker Drive
Chicago, Illinois 60606
Telephone (312) 715-1000
Facsimile (312) 715-1234 void init_marks (); int facet_of_tetra (); void join (); void add_to_Cx (); int any_tetra (); int matching_vertex (); int better_match (); void mark_vertex (); int is_unmarked_vertex (); int DFS_link (); int matching_path (); void label_tetra (); int is_unlabeled_tetra (); int is_younger_tetra (); void DFS_Del (); void fill_Cx (); int is_flat_4sx (); void connect_Cx ();

/* GEOTEST.C ----------------------------------------------------------*/
/* Contains geometric predicates and supporting determinant computation.  */
/*---------------------------------------------------------------------*/

int basic_det (); int sign_of_minor (); int rows_of_minor (); int columns_of_minor (); int sign_of_det (); int sort_rows (); int load_matrix_6 (); int load_matrix_5 (); extern int orientation (); extern int delaunay ();

/* MKTBL.C ------------------------------------------------------------*/
/* Contains functions for the construction of the simplex tables.    */
/* This includes radix sort and ref_to_... library functions.         */
/*---------------------------------------------------------------------*/ void print_buckets ();                    /* for debugging only */ void init_buckets ();
void push (); int pop (); int is_empty (); int encode_ref (); int ref_to_4sx (); int ref_to_dim (); int ref_to_type (); void order_vx (); int ref_to_vertex (); int ref_is_same (); int ref_is_hull_witness (); int ref_to_freevtx (); void radix_init (); void radix_spread (); void radix_count (); void radix_collect (); void make_tables ();

```
     /* PRINT.C ------------------------------------------------------*/
     /* Contains various print routines.                            */
     /*--------------------------------------------------------------*/ void print_matrix ();              /* for debugging only */ void print_vector ();
            /* for debugging only */ void print_endpts ();
     /* for debugging only */ void print_Cx ();                /* for debugging
     only */ void init_global_stat (); void init_local_stat (); void incr_path_length (); void
     incr_link_size (); void print_global_stat (); void print_local_stat (); void print_table ();
            /* for debugging only */ void print_info ();

     /* CHECK.C ------------------------------------------------------*/
     /* Contains functions to check the correctness of 4-complex and tables.  */
     /*--------------------------------------------------------------*/ void print_Dx ();                  /* for debugging only */ void init_Dx (); int
     load_filter (); void add_to_Dx (); void fill_Dx_slow (); void connect_Dx_slow (); int
```

```
        is_same_4sx (); void DFS_Dx (); void isomorphism (); void sanity_Cx (); void euler_test ();

void sanity_tables ();              /* to be extended    */ void checking ();

/*-----------------------------------------------------------*/
        #endif /* #ifndef __MORPH_H__ */

        /*-----------------------------------------------------------*/
        /* Improvements and additions.                              */
        /*                                                          */
        /*    ( ) Add long integer computation for basic_det.       */
        /*    ( ) Add hast tables for ref_to_idx library functions (hash function */
        /*        is computed from ordered list of vertices).       */
        /*    ( ) Finish implementation of table creation:          */
        /*         - "delaunay size" for vertices, edges, triangles, tetrahedra, */
        /*         - compute phi, mu, psi information,              */
        /*         - "hiding" funtions for vertices, edges, triangles, tetrahedra, */
        /*         - compute unattachment intervals.                */
        /*-----------------------------------------------------------*/
```

```
/*----------------------------------------------------------*/
/*   ../morphing/check.c                                    */
/*                                                          */
/*                                                          */
/*----------------------------------------------------------*/ include "morph.h"

typedef struct PQsimplex_type
{
  int dim;
  int ix;          /* index into tables of v, e, f, t in DelP/DelQ */
} PQsimplex;

PQsimplex *Pfilter;    /* for indices obtained from master list for DelP */
PQsimplex *Qfilter;    /*                                     for DelQ */
Mrf_cx *Dx; int Dxsize = 0; int *Pi;      /* array of labels parallel to Dx; also used to store the */
              /* correspondence: Dx[i] == Cx[Pi[i]]              */

/* PRINT DX ----------------------------------------FOR DEBUGGING ONLY */
```

```
        /* Print 4-simplex array, Dx[1..Dxsize]; mostly used for debugging.       */

/*-----------------------------------------------------------------*/ void print_Dx()
        { int s, j;

Endpts vx;

Assert_always (PQ == 0);
          upfor (s, 1, Dxsize) {
              printf("\nDx[%d] = Cx[%d]  dimP: %d", s, Pi[s], Dx[s].dimP);

join (vx, Dx[s].dimP, Dx[s].sigmaP, Dx[s].sigmaQ);

print_endpts (vx);

printf("  adjcnt:");

upfor (j, 0, 4)
                  printf(" %d", Dx[s].adj[j]);

if (is_flat_4sx (vx))

printf(" *FLAT*");

} /* end for s */

}
20
          /* INIT DX -------------------------------------------------*/
```

```
            /* Initialize array of 4-simplices, Dx[1..sx4]; set all fields to NIL.   */

/*----------------------------------------------------------------*/ void init_Dx ()
            { int s, j;

Pi = MALLOC (int, mrfi->sx4+1);

Dx = MALLOC (Mrf_cx, mrfi->sx4+1);

upfor(s, 0, mrfi->sx4) {
                    Pi[s] = NIL;

Dx[s].dimP = -1;

Dx[s].sigmaP = NIL;

Dx[s].sigmaQ = NIL;

upfor (j, 0, 4)
                        Dx[s].adj[j] = NIL;

} /* end for s */

}

/* LOAD FILTER ----------------------------------------------------*/
            /* Load the filter by traversing the corresponding masterlist and copying  */

/* first occurrences of simplices.                                 */
```

```
        int load_filter (PQsimplex *Filter)

{ int n = 0;  /* size of the filter */ int rank, max_rank; int ef, i, a, b, c, d;

/* load simplices from master list of P or Q*/ if (! PQ)

alf_set_context(alf1);  /* set to access data structures for P */ else
              alf_set_context(alf2);  /* set to access data structures for Q */ max_rank = alf_ml_ranks();  /* set max_rank and initialize ml pointers */ upfor (rank, 1, max_rank)

if (alf_ml_sublist(rank)) do {

               if (alf_ml_is_first()) { n++;

Filter[n].ix = alf_ml_index();

Filter[n].dim = alf_ml_f_type() - 1;  /* dim = num of endpoints -1 */ if (PQ && Filter[n].dim == 0)

                     Filter[n].ix += mrfi->vP;  /* for points in Q, add offset */ if 0
```

```
                printf("\n dim: %d, ix: %d ", Filter[n].dim, Filter[n].ix);

switch (Filter[n].dim) { case 0: ef = alf_vertex_ef (PQ, Filter[n].ix);

printf(" ef: %d ", ef);

                           break;

case 1: ef = alf_edge_ef (Filter[n].ix);

a = Org(ef); b = Dest(ef);

printf(" ef: %d, a: %d, b: %d ", ef, a, b);

break;

                   case 2: printf("ef: ");

upfor (i, 0, 5) { ef = EdFacet(Filter[n].ix, i);

printf(" %d ", ef);

}

                           trist_triangle(EdFacet(Filter[n].ix, 0), &a, &b, &c);

printf(" a: %d, b: %d, c: %d", a, b, c);

break;

case 3: ef = alf_tetra_ef (Filter[n].ix);

trist_tetra(ef, &a, &b, &c, &d);

                           printf(" ef: %d, a: %d, b: %d, c: %d, d: %d", ef, a,b,c,d);

break;
```

```
            } /* end switch */
    #endif
        } /* end if alf_ml_is_first */
    } while (alf_ml_next());
    return n;
}

/* ADD TO DX ------------------------------------------------------*/
/* The information about a 4-simplex is added at the end of Dx. The global */
/* variable PQ decides which simplex belongs to DelP and which to DelQ.   */
/*----------------------------------------------------------------*/ void add_to_Dx (int dimP, int Pix, int Qix)
{
    Dxsize++;
    Assert_always (Dxsize <= mrfi->sx4);
    if (! PQ) {
        Dx[Dxsize].dimP = dimP;
        Dx[Dxsize].sigmaP = Pix;
        Dx[Dxsize].sigmaQ = Qix;
    }
```

```
        else {

Dx[Dxsize].dimP = 3 - dimP;

Dx[Dxsize].sigmaP = Qix;

Dx[Dxsize].sigmaQ = Pix;
        }
    }

/* FILL DX SLOW ------------------------------------------------*/
    /* Fill array Dx[1..Dxsize] with 4-simplices.            */
    /* After loading the filters of P and Q, Dx is filled in a double for-loop */
    /* over all pairs, one simplex from P the other from Q. The join of each   */
    /* pair is a 4-simplex whose delaunayhood is tested in another for-loop.   */
    /*-------------------------------------------------------------*/

    void fill_Dx_slow ()
    { int i, j, k, f, valid; int pn, qn, n;
      Endpts vx;   /* stores dimension and 5 vertex indices of a 4-simplex */      double time_total, time_terminal;

        printf("\n    fill_Dx_slow ...\n");
        /* measure CPU time */
```

90

```
        time_total   =   basic_utime ();

time_terminal = basic_seconds ();

/* load simplices from master list of P and Q*/
        PQ = 0;

pn = mrfi->vP+mrfi->eP+mrfi->fP+mrfi->tP;

Pfilter = MALLOC (PQsimplex, pn+1);

n = load_filter (Pfilter);

Assert_always (n == pn);

PQ = 1;

qn = mrfi->vQ+mrfi->eQ+mrfi->fQ+mrfi->tQ;

Qfilter = MALLOC (PQsimplex, qn+1);

n = load_filter (Qfilter);

        Assert_always (n == qn);

PQ = 0;

/* construct 4-simplex array Dx[1..Dxsize] */ upfor (i, 1, pn) {
           upfor (j, 1, qn) {
               if ((Pfilter[i].dim + Qfilter[j].dim) == 3) {
```

```
                /* test delaunayhood of the current 4-simplex, s = p*q */ join (vx, Pfilter[i].dim, Pfilter[i].ix, Qfilter[j].ix);

valid = TRUE;

                upfor (f, 1, mrfi->sx0) { if (f != vx[0] && f != vx[1] && f != vx[2] && f != vx[3] && f != vx[4]) { if (! delaunay (vx, f)) valid = FALSE;

}

                } /* end for all points in P and Q*/ if (valid && (! is_flat_4sx (vx)))

add_to_Dx (Pfilter[i].dim, Pfilter[i].ix, Qfilter[j].ix);

              } /* end if P.dim+Q.dim==3 */

} /* end for j */

} /* end for i */ time_total    =   basic_utime () -  time_total;

        time_terminal = basic_seconds () - time_terminal;

print ("\n\tTotal CPU time used: %.2f sec\n", time_total);
```

BANNER & ALLEGRETTI, LTD.
10 South Wacker Drive
Chicago, Illinois 60606
Telephone (312) 715-1000
Facsimile (312) 715-1234

```
            print ("\tReal time:      %.2f sec\n", time_terminal);
        }

/* CONNECT DX SLOW -------------------------------------------------*/
        /* Construct adjacency pointers connecting the 4-simplices in Dx[1..Dxsize].*/
        /* Adjacent pairs are discovered in a double for-loop over all 4-simplex  */
        /* pairs. The 4-simplex of the ith adjacency pointer shares all vertices  */
        /* except the ith one.                                              */
        /*-----------------------------------------------------------------*/
        void connect_Dx_slow()
        { int i, j, k, l, count;
        Endpts vert1, vert2; int dupl[5]; double time_total, time_terminal;

            printf("\n    connect_Dx_slow ...\n");
            /* measure CPU time */
            time_total  =   basic_utime ();
            time_terminal = basic_seconds ();

            Assert_always (PQ == 0);
            upfor(i, 1, Dxsize)
```

93

```
         upfor(j, 1, Dxsize)

if (i != j) { join (vert1, Dx[i].dimP, Dx[i].sigmaP, Dx[i].sigmaQ);

join (vert2, Dx[j].dimP, Dx[j].sigmaP, Dx[j].sigmaQ);

            /* test vertices of Dx[i] for duplication in Dx[j] */ upfor(k, 0, 4) { dupl[k] = FALSE;

upfor(l, 0, 4)

if (vert1[k] == vert2[l]) dupl[k] = TRUE;

             } /* end for k */ count = dupl[0] + dupl[1] + dupl[2] + dupl[3] + dupl[4];

/* count reaches 5 only if a duplicate 4-simplex is found */

Assert_always (count < 5);

/* set adj pointer of Dx[i] that corresponds to unique endpoint */

             if (count == 4) { upfor(k, 0, 4)

if (dupl[k] != TRUE) Dx[i].adj[k] = j;

}

} /* end if i!=j */

time_total =   basic_utime () -   time_total;
```

```
        time_terminal = basic_seconds () - time_terminal;

print ("\n\tTotal CPU time used: %.2f sec\n", time_total);

print ("\tReal time:        %.2f sec\n", time_terminal);

}

    /* IS SAME 4SX -------------------------------------------------*/

/* Compare two 4-simplices, one in Dx the other in Cx, and return TRUE if   */

/* they are the same and FALSE otherwise.                                   */

/*-------------------------------------------------------------*/

    int is_same_4sx (int i, int j)

{

Assert_always ((1 <= i) && (i <= Dxsize));

Assert_always ((0 <= j) && (j <= mrfi->sx4));

if ((Dx[i].sigmaP == Cx[j].sigmaP) && (Dx[i].sigmaQ == Cx[j].sigmaQ))

            return TRUE;

else return FALSE;

}

    /* DFS DX -------------------------------------------------*/

/* Traverse Dx in depth-first order, and for each 4-simplex Dx[i] maintain  */
```

```
        /* the corresponding (same) 4-simplex Cx[j].                    */
        /*----------------------------------------------------------------*/ void DFS_Dx (int i, int j)
        { int k, x, y;

Pi[i] = j;
          if (! is_same_4sx(i, j)) {
            printf("\nISOMORPHISM ERROR:");
            printf(" mismatch between Dx[%d] and Cx[%d].", i, j);
          }
          upfor (k, 0, 4) {
            x = Dx[i].adj[k];
            y = Cx[j].adj[k];
            if ((x == NIL) && (y != NIL)) {
              printf("\nISOMORPHISM ERROR:");
              printf(" neighbor mismatch because Dx[%d].adj[%d] = NIL", i, k);
            }
            else if ((x != NIL) && (y == NIL)) {
              printf("\nISOMORPHISM ERROR:");
              printf(" neighbor mismatch because Cx[%d].adj[%d] = NIL", j, k);
```

```
            if (Pi[x] == NIL)

DFS_Dx (x, 0);    /* Cx[0] is initialized to empty 4-simplex */

} else if ((x != NIL) && (y != NIL)) {
                if (Pi[x] == NIL)

DFS_Dx (x, y);

else { if (Pi[x] != y) { printf("\nISOMORPHISM ERROR:");
                        printf(" mismatch between Dx[%d].adj[%d] and Cx[%d].adj[%d].", i, k, j, k);

}

} /* end else */

} /* end else if */
        } /* end upfor k */

}

/* ISOMORPHISM -------------------------------------------------*/

/* Test whether or not the two 4-complexes in Dx and Cx are isomorphic.  */
        /* They should be, and if not, error messages with indications of the    */
        /* discrepency are printed.                                              */
```

BANNER & ALLEGRETTI, LTD.
10 South Wacker Drive
Chicago, Illinois 60606
Telephone (312) 715-1000
Facsimile (312) 715-1234

```
        /*---------------------------------------------------------------*/ void isomorphism ()

{ int i, j;

/* find the 4-simplex in Cx that corresponds to Dx[1] */ j = 1;

while ((! is_same_4sx (1, j)) && (j <= mrfi->sx4)) j++;

           if (j > mrfi->sx4)

printf("\nISOMORPHISM ERROR: no match for Dx[1] in Cx.");

else {

/* construct permutation between Dx and Cx in depth-first traversal */

DFS_Dx (1, j);
              /* Check sizes and permutation. */ if (Dxsize != mrfi->sx4)

printf("\nISOMORPHISM ERROR: sizes of Dx and Cx not the same.");

upfor (i, 1, Dxsize) {
                 if (Pi[i] == NIL) {
                    printf("\nCONNECTIVITY ERROR:");
```

```
                    printf(" not all 4-simplices reached by DF traversal.");
                }
                else
                    if (! is_same_4sx(i, Pi[i])) {
                        printf("\nISOMORPHISM ERROR:");
                        printf(" mismatch between Dx[%d] and Cx[%d].", i, Pi[i]);
                    }
            } /* end upfor */
        } /* end else */
        printf("\n    ... connectivity and isomorphism test completed.\n");
    }

/* SANITY CX ----------------------------------------------------------*/
    /* Test all 4-simplex values agains appropriate bounds:              */
    /*   0 <= dimP <= 3, sigmaP, sigmaQ, and 1 <= adj[j] <= sx4.         */
    /*-------------------------------------------------------------------*/ void sanity_Cx ()
    { int s, j;
```

BANNER & ALLEGRETTI, LTD.
10 South Wacker Drive
Chicago, Illinois 60606
Telephone (312) 715-1000
Facsimile (312) 715-1234

```
        upfor (s, 1, mrfi->sx4) {

Assert_always ((0 <= Cx[s].dimP) && (Cx[s].dimP <= 3));

switch (Cx[s].dimP) { case 0: Assert_always (1<=Cx[s].sigmaP && Cx[s].sigmaP<=mrfi->vP);
                        break;

case 1: Assert_always (1<=Cx[s].sigmaP && Cx[s].sigmaP<=mrfi->ePmax);
                        break;

case 2: Assert_always (1<=Cx[s].sigmaP && Cx[s].sigmaP<=mrfi->fP);
                        break;

                case 3: Assert_always (1<=Cx[s].sigmaP && Cx[s].sigmaP<=mrfi->tPmax);
                        break;

} switch (3 - Cx[s].dimP) {

                case 0: Assert_always (mrfi->vP+1<=Cx[s].sigmaQ

&& Cx[s].sigmaQ<=mrfi->sx0);

break;

case 1: Assert_always (1<=Cx[s].sigmaQ && Cx[s].sigmaQ<=mrfi->eQmax);
                        break;

                case 2: Assert_always (1<=Cx[s].sigmaQ && Cx[s].sigmaQ<=mrfi->fQ);
                        break;
```

```
        case 3: Assert_always (1<=Cx[s].sigmaQ && Cx[s].sigmaQ<=mrfi->tQmax);
            break;
        }

        upfor (j, 0, 4)
            Assert_always (NIL<=Cx[s].adj[j] && Cx[s].adj[j]<=mrfi->sx4);
        } /* end for s */ printf("\n   ... sanity test for 4-complex, Cx, completed.\n");
     }

/* EULER TEST ---------------------------------------------------------*/
    /* Test whether global info counters satisfy cross and Euler relations.  */
    /*--------------------------------------------------------------------*/
    void euler_test ()
    {
        /* check trivial relations between complexes */
        Assert_always (mrfi->vX == mrfi->sx00);
        Assert_always (mrfi->eX == mrfi->sx10+mrfi->sx01);
        Assert_always (mrfi->fX == mrfi->sx20+mrfi->sx11+mrfi->sx02);
```

101

```
        Assert_always (mrfi->tX   == mrfi->sx30+mrfi->sx21+mrfi->sx12+mrfi->sx03);

Assert_always (mrfi->triX == mrfi->sx20+mrfi->sx02);

Assert_always (mrfi->qdrX == mrfi->sx11);

Assert_always (mrfi->tetX == mrfi->sx30+mrfi->sx03);

        Assert_always (mrfi->priX == mrfi->sx21+mrfi->sx12);

Assert_always (mrfi->fhX  == mrfi->trihX+mrfi->qdrhX);

Assert_always (mrfi->tetX  == mrfi->tP+mrfi->tQ);

Assert_always (mrfi->trihX == mrfi->fhP+mrfi->fhQ);

Assert_always (mrfi->sx0 == mrfi->vP+mrfi->vQ);

Assert_always (mrfi->sx1 == mrfi->eP+mrfi->vX+mrfi->eQ);

Assert_always (mrfi->sx2 == mrfi->fP+mrfi->eX+mrfi->fQ);

Assert_always (mrfi->sx3 == mrfi->tP+mrfi->fX+mrfi->tQ);

        Assert_always (mrfi->sx4 == mrfi->tX);

/* check dehn-sommerville equations */

Assert_always (2*mrfi->ehP == 3*mrfi->fhP);

Assert_always (2*mrfi->ehQ == 3*mrfi->fhQ);

        Assert_always (2*mrfi->ehX == 3*mrfi->trihX+4*mrfi->qdrhX);

Assert_always (2*mrfi->fP-mrfi->fhP == 4*mrfi->tP);
```

Assert_always (2*mrfi->fQ-mrfi->fhQ == 4*mrfi->tQ);

Assert_always (2*mrfi->fX-mrfi->fhX == 4*mrfi->tetX+5*mrfi->priX);

Assert_always (2*mrfi->sx3-(mrfi->tP+mrfi->fhX+mrfi->tQ) == 5*mrfi->sx4);

/* check euler characteristics */

Assert_always (mrfi->vP-mrfi->eP+mrfi->fP-mrfi->tP == 1);

Assert_always (mrfi->vQ-mrfi->eQ+mrfi->fQ-mrfi->tQ == 1);

Assert_always (mrfi->vX-mrfi->eX+mrfi->fX-mrfi->tX == 1);

Assert_always (mrfi->sx0-mrfi->sx1+mrfi->sx2-mrfi->sx3+mrfi->sx4 == 1);

Assert_always (mrfi->vhP-mrfi->ehP+mrfi->fhP == 2);

Assert_always (mrfi->vhQ-mrfi->ehQ+mrfi->fhQ == 2);

Assert_always (mrfi->vhX-mrfi->ehX+mrfi->fhX == 2);

printf("\n   ... euler tests for global info counters completed.\n");

}

/* SANITY TABLES ----------------------------------------TO BE EXTENDED */

/* Test the values in tables T1 through T4 against obvious bounds.      */

/*--------------------------------------------------------------------*/

void sanity_tables ()

```
     { int k, s, t, tmax;

Mrf_ksx *T;

upfor (k, 1, 3) {
             switch (k) { case 1:  tmax = mrfi->vX;

T = mrf_tbls->T1;

break;

case 2:  tmax = mrfi->eX;
                          T = mrf_tbls->T2;

break;

case 3:  tmax = mrfi->fX;

T = mrf_tbls->T3;

break;

                 case 4:  tmax = mrfi->tX;

T = mrf_tbls->T4;

break;

} /* end switch */

             upfor (t, 1, tmax) {

Assert_always (ref_to_dim (T[t].ref) == k);
```

```
            s = ref_to_4sx (T[t].ref);

Assert_always ((1 <= s) && (s <= mrfi->sx4));

} /* end for t */

} /* end for k */

printf("\n    ... sanity test for simplex tables completed.\n");

}

/* CHECKING -------------------------------------------------------*/
    /* The output is checked for correctness.  This includes           */
    /*      (1) test sanity of 4-complex, Cx,                          */
    /*      (2) test isomorphism between Cx (fill_Cx and connect_Cx)   */
    /*                      and Dx (fill_Dx_slow and connect_Dx_slow). */
    /*      (3) test sanity of simplex tables.                         */
    /*      (4) test cross and euler relations for global info counters. */
    /*----------------------------------------------------------------*/ void checking ()

{
20      printf("\n\nchecking ...\n");
```

```
            /* (1) are entries in Cx reasonable? */ sanity_Cx ();

if 0
            /* (2) construct Dx and compare with Cx */ init_Dx ();

fill_Dx_slow ();

connect_Dx_slow ();

isomorphism ();

            #endif

/* (3) are entries in simplex tables reasonable? */ sanity_tables ();

            /* (4) check relations among global info counters */ euler_test ();

free (Pfilter);

free (Qfilter);

free (Dx);

20          free (Pi);
        }
```

```
/*-------------------------------------------------------------*/
/*    ../morphing/complex.c                              */
/*                                                       */
/*                                                       */
   /*-------------------------------------------------------------*/ include "morph.h"

int PQ;   /* The construction of Cx is symmetric in P and Q.  PQ provides  */
            /* global orientation to decide which set determines a given      */
            /* simplex.  PQ = 0/1: P/Q-tetrahedra and P/Q-triangles are       */
            /* matched with Q/P-vertices and Q/P-edges                        */
                        int *Lt;     /* labels for tetrahedra (parallel to tetra
   tables) */ int LABELt;    /* last (largest) label applied to any tetrahedron    */
   int *Bv;      /* marks for vertices (parallel to vertex tables)   */ int MARKv;    /*
   MARKv = T/F when vertices are marked/unmarked              */

    /* INIT MARKS ----------------------------------------------------*/
    /* The size of the first array of marks, Lt, is set to the size of the    */
```

```
         /* larger tetrahedron table of P and Q.  Because the vertex tables are    */
         /* concatenated, the size of the second array, Bv, is set to the sum of   */
         /* the sizes of the vertex tables of P and Q.                             */
         /*----------------------------------------------------------------*/
         void init_marks ()
         { int nv, nt; static int first = TRUE;

nt = Max(mrfi->tPmax, mrfi->tQmax);
             if (first) {

Lt = MALLOC(int, (nt+1));

Bv = MALLOC(int, (mrfi->sx0+1));

first = FALSE;

}

             else {

REALLOC(Lt, int, nt + 1);

REALLOC(Bv, int, mrfi->sx0 + 1);

}

BZERO (Lt, int, nt + 1);

             BZERO (Bv, int, mrfi->sx0 + 1);

}
```

```
/* FACET OF TETRA ----------------------------------------------------*/
/* Compute reference of i-th facet facing tetrahedron with given index, t.  */
/* ------------------------------------------------------------------*/
```

```
        int facet_of_tetra (int t, int i)
        { int tef;

if (! PQ)
                alf_set_context(alf1);
            else
                alf_set_context(alf2);

tef = alf_tetra_ef(t);
            switch (i) {
            case 0: tef = tef;
                break;
            case 1: tef = Sym(Fnext(tef));
                break;
            case 2: tef = Sym(Fnext(Enext(tef)));
                break;
            case 3: tef = Sym(Fnext(Enext(Enext(tef))));
```

```
            break;
        }
        return tef;
    }

    /* JOIN ------------------------------------------------------------*/
    /* Get vertex indices of the 4-simplex defined as join of two simplices  */
    /* with indices Pix and Qix and dimensions dimP and 3 - dimP. The global */
    /* variable PQ decides which one belongs to DelP and which to DelQ.      */
    /*------------------------------------------------------------------*/ void join (Endpts vx, int dimP, int Pix, int Qix)
    { int a, b, c, d, e; int tmp, Pef, Qef;

        if (PQ) { /* PQ == 1 iff Pix actually belongs to DelQ and Qix to DelP */
            dimP = 3 - dimP;
            tmp = Pix;  Pix = Qix;  Qix = tmp;
        }

        switch (dimP) {
            case 0:
```

```
              a = Pix;

alf_set_context(alf2);

Qef = alf_tetra_ef (Qix);

Assert_always (! trist_hull_facet (Qef));

                 trist_tetra(Qef, &b, &c, &d, &e);

break;

case 1:

alf_set_context(alf1);

Pef = alf_edge_ef(Pix);

                  a = Org(Pef); b = Dest(Pef);

alf_set_context(alf2);

Qef = EdFacet(Qix, 0);

trist_triangle(Qef, &c, &d, &e);

break;

          case 2:

alf_set_context(alf1);

Pef = EdFacet(Pix, 0);

trist_triangle(Pef, &a, &b, &c);

alf_set_context(alf2);

                  Qef = alf_edge_ef(Qix);

d = Org(Qef); e = Dest(Qef);
```

```
                    break;
            case 3:
                    alf_set_context(alf1);
                        Pef = alf_tetra_ef (Pix);
                        Assert_always (! trist_hull_facet (Pef));
                        trist_tetra(Pef, &a, &b, &c, &d);
                        e = Qix;
                        break;
            } /* end switch */
            vx[0] = a; vx[1] = b; vx[2] = c; vx[3] = d; vx[4] = e;
    }

/* IS FLAT 4SX ---------------------------------------------------*/
    /* Return TRUE/FALSE if 4-simplex with endpoints in vx has measure zero.  */
    /* NOTE. It seems flat 4-simplices can occur only at (near) the frontier  */
    /*       and can thus be removed without distroying the complex property. */
    /*       (This should be formally proved to be sure ... if it is not true */
    /*       then inconsistencies would be detected by euler tests.)          */
20  /*----------------------------------------------------------------*/
```

```
    int is_flat_4sx (Endpts vx)

{ int perm, j;

Vector row, col;

        perm = load_matrix_5 (vx);

upfor (j, 0 , 4)

row[j] = col[j] = j;

return If(basic_det (row, col, 5) == 0, TRUE, FALSE);

}

        /* ADD TO CX ------------------------------------------------------------*/

/* The information about a 4-simplex is added at the end of Cx. The global */

/* variable PQ decides which simplex belongs to DelP and which to DelQ.    */

/*------------------------------------------------------------------------*/

        void add_to_Cx (int dimP, int Pix, int Qix, int flat)

{ int dimPQ, tmp;

if (flat)

mrfi->flatCx++;

        else { if (mrfi->sx4+1 > Cxsize)
```

```
            Cxsize = double_Cx ();

Assert_always (mrfi->sx4 <= Cxsize);

if (PQ) { /* exchange P and Q */ dimP = 3 - dimP;

            tmp = Pix;  Pix = Qix;  Qix = tmp;

} dimPQ = (10 * dimP) + (3 - dimP);

increment_info (FALSE, dimPQ);

Cx[mrfi->sx4].dimP = dimP;

        Cx[mrfi->sx4].sigmaP = Pix;

Cx[mrfi->sx4].sigmaQ = Qix;

} /* end else */

}

    /* ANY TETRA ------------------------------------------------*/

/* Compute index of any tetrahedron in DelP/DelQ if PQ = 0/1.     */

/*----------------------------------------------------------*/ int any_tetra ()

20  { int fef;
```

```
        if (! PQ)
            alf_set_context(alf1);
        else
            alf_set_context(alf2);

        fef = EdFacet(1,0);      /* take the first edge-facet, version 0 */
        if (trist_hull_facet(fef))
            fef = Sym(fef);
        return alf_tetra_index(fef);
    }

/* MATCHING VERTEX ---------------------------------------------------*/
    /* Compute the (index of the) matching vertex of a tetrahedron in the  */
    /* other Delaunay simplicial complex.  t is the index of the tetrahedron. */
    /*--------------------------------------------------------------------*/ int matching_vertex (int t)
    {
        Endpts vx;    /* the 5 endpoints of vx are the endpoints of t and a vertex */ int match, i;
        int first, last;
```

```
        if (! PQ) {
            first = mrfi->vP + 1;
            last = mrfi->sx0;
        }
        else {
            first = 1;
            last = mrfi->vP;
        }
        match = first;
        join(vx, 3, t, match);
        upfor (i, first+1, last)
                /* not delaunay means best match is not yet found: */
                /*        substitute i for the earlier match. */
            if (! delaunay(vx, i)){
                match = i;
                join (vx, 3, t, match);
            }
        return match;
        }
        /* BETTER MATCH ----------------------------------------------*/
```

```
/* Decide which of the destinations of bestef and contef is a better match */
/* for the 3-simplex spanned by the first 3 vertices of vx30 and the common */
/* origin of bestef and contef.  This is also the last vertex of vx30.      */
/*------------------------------------------------------------------*/

        int better_match (Endpts vx30, int bestef, int contef)
        { int i, best, cont;
        Endpts vx21;

        if (contef == NIL)
                return bestef;
        else if (bestef == NIL)
                return contef;
        else { /* both contef and bestef are not NIL */
            if (! PQ) {
                alf_set_context(alf2);
                    cont = Dest(contef);
                    Assert_always (Org(contef) == vx30[4]);
                    best = Dest(bestef);
                    Assert_always (Org(bestef) == Org(contef));
            }
```

```
        else { alf_set_context(alf1);

cont = Dest(contef);

Assert_always (Org(contef) == vx30[4]);

                best = Dest(bestef);

Assert_always (Org(bestef) == Org(contef));

} upfor (i, 0, 4)  vx21[i] = vx30[i];

        vx21[3] = cont;

/* cont is a better match for the 3-simplex than best iff vx21 and */

/* vx30 have different orientation and best does not violate the   */

/* delaunayhood of vx21                                            */

        if (orientation (vx21) != orientation (vx30)) { if (delaunay (vx21, best))

return contef;

else return bestef;

        } else   /* vx21 and vx30 have the same orientation */
```

```
            return bestef;

} /* else */

}

    /* MARK VERTEX ----------------------------------------------------*/

/* Mark vertex if MARKv = TRUE and otherwise unmark it.            */

/*-----------------------------------------------------------------*/ void mark_vertex (int v)
    {
        Assert_always ((1 <= v) && (v <= mrfi->sx0));

Bv[v] = MARKv;

}

    /* IS UNMARKED VERTEX ---------------------------------------------*/

/* Return TRUE if vertex is unmarked and MARKv = TRUE,             */

/*      or if vertex is marked and MARKv = FALSE.                  */

/*-----------------------------------------------------------------*/

    int is_unmarked_vertex (int v)

{
```

```
        Assert_always ((1 <= v) && (v <= mrfi->sx0));

return If(Bv[v] != MARKv, TRUE, FALSE);

}

        /* DFS LINK ------------------------------------------------------------*/

/* Traverse vertices of link of vertex v = Orf(vef) in depth-first order.  */

/* u = Dest(vef) is the current vertex in the link. The first 3 vertices  */

/* of the 4-simplex vx30 span triangle whose matching path is traversed.  */

        /*----------------------------------------------------------------------*/ int DFS_link (Endpts vx30, int vef)

{ int i, firstef, bestef, contef; int u;

Endpts vx21;

            if (! PQ)

alf_set_context (alf2);

else alf_set_context (alf1);

            u = Dest(vef);
```

```
        if (is_unmarked_vertex (u)) { if (! MARKv)  incr_link_size ();

mark_vertex (u);

            /* Initialize vef to the current best match unless its    */
            /* 4-simplex (vx21) has the same orienation as vx30.      */
            upfor (i, 0, 4)  vx21[i] = vx30[i];

vx21[3] = u;

if (orientation(vx30) != orientation(vx21))
                bestef = vef;
            else
                bestef = NIL;

/* Visit all neighbors of Dest(vef) in the link of v.     */
            /* This is done by pivoting the edge-facet about the OrgDest */
            /* edge and considering the respective 3rd endpoints.     */
            firstef = vef;

do { vef = Fnext(vef);

                contef = DFS_link (vx30, Enext(Sym(vef)));

/* Enext(Sym(vef)) is the version of vef with the */
```

```
                    /* same origin, v, but different destination.    */ bestef = better_match (vx30, bestef, contef);

} while (vef != firstef);

return bestef;

        } /* end if */ else /* destination of vef has already been traversed */ return NIL;

}

    /* MATCHING PATH -------------------------------------------------*/
    /* Traverse the path of vertices matching the triangle with reference fef; */
    /* v is first vertex on this path.  hull == TRUE iff fef lies on convex    */
    /* hull of P (or Q).  fef and its matching path belong to different Del.   */
    /*-------------------------------------------------------------------------*/

    int matching_path (int hull, int fef, int v)

{ int a, b, c, d, a2, b2, c2, d2; int vef, nextef, edge, dest, tri; int i, flat;

Endpts vx30, vx21;

             init_local_stat ();

if (! PQ)
```

```
                alf_set_context(alf1);
        else
                alf_set_context(alf2);
        trist_tetra (fef, &a, &b, &c, &d);
        tri = TrIndex (fef);
        if (! hull)
                trist_tetra (Sym(fef), &a2, &b2, &c2, &d2);

while (1) {
                vx30[0] = a; vx30[1] = b; vx30[2] = c; vx30[3] = d; vx30[4] = v;
                vef = alf_vertex_ef (!PQ, v);

MARKv = TRUE;
                nextef = DFS_link (vx30, vef);
                /* 2nd DF traversal unmarks vertices and updates path statistics */
                MARKv = FALSE;
                nextef = DFS_link (vx30, vef);

if (nextef != NIL) {
                        if (! PQ) {
                                alf_set_context(alf2);
```

```
            edge = alf_edge_index(nextef);

dest = Dest(nextef);

} else {

            alf_set_context(alf1);

edge = alf_edge_index(nextef);

dest = Dest(nextef);

}

        /* The new 4-simplex, tri*edge, belongs to Cx iff fef lies on  */
        /* convex hull of P (or Q), or else the destination of nextef  */
        /* is a better match than d2.                                  */ upfor (i, 0, 4)  vx21[i] = vx30[i];

vx21[3] = dest;

        flat = is_flat_4sx (vx21);

if (hull) { incr_path_length ();

add_to_Cx (2, tri, edge, flat);

v = dest;

20      } else {
```

```
                if (delaunay (vx21, d2)) { incr_path_length ();

add_to_Cx (2, tri, edge, flat);

v = dest;

                } else /* v is last vertex on the matching path */ break;

}

} /* endif nextef */

        else /* v is last vertex on the matching path */ break;

} print_local_stat ();

        return v;

}

/* LABEL TETRA ---------------------------------------------------------*/

/* Increment LABELt by 1 and label tetrahedron with index t.          */

    /* ---------------------------------------------------------------------*/
```

BANNER & ALLEGRETTI, LTD.
10 South Wacker Drive
Chicago, Illinois 60606
Telephone (312) 715-1000
Facsimile (312) 715-1234

```
        void label_tetra (int t)

{

Assert_always ((1 <= t) && (t <= Max(mrfi->tPmax, mrfi->tQmax)));

LABELt ++;

            Lt[t] = LABELt;

}

/* IS UNLABELED TETRA ----------------------------------------------*/

/* Return TRUE if the tetrahedron is unlabeled and FALSE otherwise.  */

        /*-----------------------------------------------------------------*/ int is_unlabeled_tetra (int t)

{

Assert_always ((1 <= t) && (t <= Max(mrfi->tPmax, mrfi->tQmax)));

            return If( Lt[t] == 0, TRUE, FALSE);

}

/* IS YOUNGER TETRA ------------------------------------------------*/

/* Return TRUE if first tetrahedron, t1, is labeled later than second, t2. */

        /*-----------------------------------------------------------------*/
```

BANNER & ALLEGRETTI, LTD.
10 South Wacker Drive
Chicago, Illinois 60606
Telephone (312) 715-1000
Facsimile (312) 715-1234

```
        int is_younger_tetra (int t1, int t2)

{

Assert_always ((1 <= t1) && (t1 <= Max(mrfi->tPmax, mrfi->tQmax)));

Assert_always ((1 <= t2) && (t2 <= Max(mrfi->tPmax, mrfi->tQmax)));

          return If(Lt[t1] > Lt[t2], TRUE, FALSE);

}

/* DFS DEL ------------------------------------------------------*/

/* Traverse the tetrahedra of DelP (or DelQ) in depth-first order reflected */

       /* by integer labels of the tetrahedra.  At the same time, the matching    */

/* vertex, v, of the current tetrahedron, t, is maintained by a traversal  */

/* of a matching edge path in DelQ (or DelP).                              */

/*-------------------------------------------------------------*/

       void DFS_Del (int t, int v)

{ int i, w, a, b, c, d; int fef, tadj, hull;

if (is_unlabeled_tetra (t)) { label_tetra (t);

               add_to_Cx (3, t, v, FALSE);

upfor (i, 0, 3) {
```

```
            fef = facet_of_tetra (t, i);

hull = trist_hull_facet(Sym(fef));

if (hull) { w = matching_path (hull, fef, v);

            } else { tadj = alf_tetra_index(Sym(fef));

/* tadj is the i-th adjacent tetrahedron of t */ if (is_unlabeled_tetra (tadj)) {

                    w = matching_path (hull, fef, v);

DFS_Del (tadj, w);

} else if (is_younger_tetra (tadj, t))

w = matching_path (hull, fef, v);

            } /* end else ! hull */

} /* end for i */

} /* end if */

}

    /* FILL CX -------------------------------------------------------*/

/* Compute the 4-simplices in Cx by traversing each 3-dimensional Delaunay */
```

```
        /* simplicial complex and finding matching simplices in a concurrent    */
        /* traversal of the other.                                              */
        /*--------------------------------------------------------------*/

        void fill_Cx ()
        { int t, v; double time_total, time_terminal;

printf("\nfill_Cx ...\n");
            /* measure CPU time */
            time_total    =   basic_utime ();
            time_terminal = basic_seconds ();

init_global_stat ();

            PQ = 0;
            init_marks ();
            t = any_tetra ();
            v = matching_vertex (t);
            LABELt = 0;
20          DFS_Del (t, v);
```

```
        PQ = 1;

init_marks ();

t = any_tetra ();

v = matching_vertex (t);
        LABELt = 0;

DFS_Del (t, v);

PQ = 0;

Cxsize = compactify_Cx ();
        print_global_stat ();

time_total   =   basic_utime () -   time_total;

time_terminal = basic_seconds () - time_terminal;

print ("\n\tTotal CPU time used: %.2f sec\n", time_total);
        print ("\tReal time:     %.2f sec\n", time_terminal);

}

/* CONNECT CX -------------------------------------------------*/

/* Construct adjacency pointers connecting the 4-simplices in Cx[1..sx4].  */
    /* Adjacent pairs are discovered by radix sort applied to 4-simplices.     */

/*-----------------------------------------------------------------------*/
```

```
      void connect_Cx ()

{ int i, s1, s2, j1, j2, ref1, ref2; double time_total, time_terminal;

printf("\nconnect_Cx ...\n");
          /* measure CPU time */ time_total    = basic_utime ();

time_terminal = basic_seconds ();

init_buckets ();
          radix_init (3);

radix_spread (3);

upfor (i, 1, mrfi->sx0) { ref1 = NIL;
              while (1) { if (ref1 == NIL) {    /* no reference looking for a match */ if (is_empty (0, i))

break;

else
                          ref1 = pop (0, i);

}
```

```
              else {          /* ref1 is looking for a match    */

Assert_always (ref1 != NIL);

if (is_empty (0, i)) { s1 = ref_to_4sx (ref1);

                     j1 = ref_to_freevtx (ref1);

Assert_always (Cx[s1].adj[j1] == NIL);

break;

}
                  else {

                      ref2 = pop (0, i);

if (ref_is_same (ref1, ref2)) { s1 = ref_to_4sx (ref1);

s2 = ref_to_4sx (ref2);

j1 = ref_to_freevtx (ref1);

                          j2 = ref_to_freevtx (ref2);

Cx[s1].adj[j1] = s2;

Cx[s2].adj[j2] = s1;

ref1 = NIL;

}

                      else { s1 = ref_to_4sx (ref1);
```

BANNER & ALLEGRETTI, LTD.
10 South Wacker Drive
Chicago, Illinois 60606
Telephone (312) 715-1000
Facsimile (312) 715-1234

132

```
                    j1 = ref_to_freevtx (ref1);

Assert_always (Cx[s1].adj[j1] == NIL);

ref1 = ref2;

}
            } /* end else */

} /* end else */

} /* end while */

} /* end for i */

    time_total =   basic_utime () -  time_total;

time_terminal = basic_seconds () - time_terminal;

print ("\n\tTotal CPU time used: %.2f sec\n", time_total);

print ("\tReal time:      %.2f sec\n", time_terminal);

}
15
```

```
/*----------------------------------------------------------*/
/*   ../morphing/geotest.c                         */
/*                                                 */
/*                                                 */
/*----------------------------------------------------------*/ include "morph.h"

Matrix M;

/* BASIC DET ----------------------------------------------*/
/* Compute determinant of the integer matrix M[r[0]..r[k-1],c[0]..c[k-1]. */
/* The method develops along the last column, which is half 0 by design.  */
/* For speed, determinants for k <= 3 are computed directly.             */
/* NOTE.  As a current shortcoming integer coordinates cannot be too large */
/*        to avoid overflow: in [-100,100] should be save.                */
/*----------------------------------------------------------*/ int basic_det (Vector r, Vector c, int k)
{
    Vector row, col; int det, sign, i, j;
```

```
        Assert_always (k > = 0);

if (k == 0)

det = 1;

else if (k == 1)

            det = M[r[0]][c[0]];

else if (k == 2)

det = M[r[0]][c[0]] * M[r[1]][c[1]]

- M[r[0]][c[1]] * M[r[1]][c[0]];

else if (k == 3)

            det = M[r[0]][c[0]] * M[r[1]][c[1]] * M[r[2]][c[2]]

+ M[r[0]][c[1]] * M[r[1]][c[2]] * M[r[2]][c[0]]

+ M[r[0]][c[2]] * M[r[1]][c[0]] * M[r[2]][c[1]]

- M[r[0]][c[0]] * M[r[1]][c[2]] * M[r[2]][c[1]]

- M[r[0]][c[1]] * M[r[1]][c[0]] * M[r[2]][c[2]]

                - M[r[0]][c[2]] * M[r[1]][c[1]] * M[r[2]][c[0]];

else { /* k >= 4 */ det = 0; sign = 1;

downfor (i, k-1, 0) { /* develop det along last column */ upfor (j, 0, i-1) row[j] = r[j];

                upfor (j, i, k-2) row[j] = r[j+1];

upfor (j, 0, k-2) col[j] = c[j];
```

```
              if (M[r[i]][c[k-1]] != 0)

det = det + sign * M[r[i]][c[k-1]] * basic_det (row, col, k-1);

sign = -sign;

} /* end for i */

      } /* end else k >= 4 */ return det;

}

/* SIGN OF MINOR ---------------------------------------------------------*/

/* Compute the sign of the minor defined by the vector pert[0..k-1]. The  */

/* vector selects minors in the SoS sequence of infinitesimal perturbation. */

/*------------------------------------------------------------------------*/ int sign_of_minor (int *pert, int k)

{ int sign, i;

sign = 1;
      upfor(i, 0, k-1)
          if (pert[i] < pert[i+1])
              if (Odd(i+pert[i])) sign = -sign;
      return sign;
```

}

/* ROWS OF MINOR ----------------------------------------------------*/

/* Compute the indices of the rows in the minor selected by pert. Also, */

/* return the length of the vector holding the row indices.          */

/*------------------------------------------------------------------*/

```
int rows_of_minor (int *pert, int k, Vector row)
{ int irow, i;

irow = -1;
    upfor(i, 0, k-1)
        if (pert[i] == pert[i+1]) {
            irow++; row[irow] = i;
        }
    return (irow + 1);
}
```

/* COLUMNS OF MINOR -------------------------------------------------*/

/* Compute the indices of the columns in the minor selected by pert. Also, */

/* return the length of the vector holding the column indices.       */

```
        /*----------------------------------------------------------*/ int columns_of_minor (int *pert, int k, Vector col)

{ int icol, i, j;

icol = -1;

upfor(j, 0, pert[0]-1) { icol++; col[icol] = j;

}

        upfor(i, 0, k-1) { if (pert[i] < pert[i+1])

upfor(j, pert[i]+1, pert[i+1]-1) { icol++; col[icol] = j;

}

            } /* end for i */ icol++; col[icol] = k - 1;

return (icol + 1);

}

        /* SIGN OF DET ----------------------------------------------*/

/* Compute the sign of det M[0..k-1, 0..k-1].  SoS is used to reduce the    */
```

```
       /* degenerate case (det == 0) to the general case (sign det == 1 or -1).  */

/* Vector pert[0..6] is used to select minors in the appropriate sequence. */

/* NOTE. Although only 4 of 6 (or 3 of 5) columns are perturbed, a nonzero */

/*       determinant is guaranteed because at least one row in M is from P */

       /*       and at least one is from Q. Therefore, M[0,k-1] = 0 and           */

/*       M[k-1,k-1] = 1. The determinant of the corresponding minor        */

/*       (rows 0 and k-1 and columns 0 and k-1) is 1.                      */

/*-----------------------------------------------------------------------*/

       int sign_of_det (int k)

{ int pert[7], oldpertj; int det, sign, i, j, l, lrow, lcol;

Vector row, col;

/* initialize pert[0..k] and use pert[k] as dummy */

            upfor(i, 0, k) pert[i] = k - 1;

while (1) {          /* advance pert until determinant is non-zero */ sign = sign_of_minor(pert, k);

lrow = rows_of_minor(pert, k, row);

                lcol = columns_of_minor(pert, k, col);
```

```
            Assert_always (lrow == lcol);

l = lrow;

Assert_always (2 <= l && l <= k);

/* 2 <= l because the first and last columns are not perturbed */
            det = basic_det(row, col, l);

if (det != 0) break;

j = 0;

while (pert[j] == 1) j++;   /* j is first index where pert can move */
            Assert_always (j <= k-1);

/* j cannot reach k, which is the dummy row */

/* move row j and line up preceding rows */ oldpertj = pert[j];

            downfor(i, j, 0) pert[i] = oldpertj - 1;

} return If(det>0, sign, -sign);

}

/* SORT ROWS ----------------------------------------------------------*/
```

```
    /* Sort row indices in h[0..k-1] and return +1 or -1 if the number of     */
    /* exchanges is even or odd. The method of choice is insertion sort.       */
    /*-----------------------------------------------------------------------*/

    int sort_rows (Vector h, int k)
    { int sign, tmp, i, j;

sign = 1;
        upfor(i, 1, k-1) {
            j = i;
            while (j >= 1 && h[j] < h[j-1]) {
                tmp = h[j]; h[j] = h[j-1]; h[j-1] = tmp;
                sign = -sign; j--;
            } /* end while */
        } /* end for */
        return sign;
    }

/* LOAD MATRIX 6 -------------------------------------------------------*/
    /* Load the 6x6 matrix needed for the delaunay test. The points are first */
    /* sorted in the order of increasing indices to simplify SoS. The indices */
```

```
    /* are stored in vector h[0..5] which is then sorted.              */
    /*------------------------------------------------------------------*/ int load_matrix_6 (Endpts vx, int f)
    {
    Vector h; int i, sign;

upfor(i, 0, 4) {
            /* the first 5 points are vertices of a 4-simplex, the 6th is f */
            h[i] = vx[i];
        }
        h[5] = f;

/* the points are loaded in the order of increasing indices */
        sign = sort_rows(h, 6);
        upfor(i, 0, 5) {
            M[i][0] = 1;
            M[i][1] = coords[h[i]][ALF_X];
            M[i][2] = coords[h[i]][ALF_Y];
            M[i][3] = coords[h[i]][ALF_Z];
            M[i][4] = coords[h[i]][ALF_X] * coords[h[i]][ALF_X] +
```

```
                    coords[h[i]][ALF_Y] * coords[h[i]][ALF_Y] + coords[h[i]][ALF_Z] * coords[h[i]][ALF_Z] - coords[h[i]][ALF_W] * coords[h[i]][ALF_W];

M[i][5] = If(h[i] > mrfi->vP, 1, 0);

        } /* end for */ return sign;

}

/* LOAD MATRIX 5 ------------------------------------------------*/

    /* Load the 5x5 matrix needed for the delaunay and orientation tests.   */

/* Similar to the 6x6 case, the points are sorted to simplify SoS.      */

/*--------------------------------------------------------------*/ int load_matrix_5 (Endpts vx)

    {

Vector h; int i, sign;

upfor(i, 0, 4) {

/* the 5 points are the vertices of a 4-simplex */

20          h[i] = vx[i];

}
```

```
        /* the points are loaded in the order of increasing indices */ sign = sort_rows(h, 5);

upfor(i, 0, 4) {

M[i][0] = 1;

            M[i][1] = coords[h[i]][ALF_X];

M[i][2] = coords[h[i]][ALF_Y];

M[i][3] = coords[h[i]][ALF_Z];

M[i][4] = If(h[i] > mrfi->vP, 1, 0);

} /* end for */

        return sign;

}

/* ORIENTATION -------------------------------------------------*/
    /* Return TRUE if the 5 vertices of vx have positive orientation in R^4.  */
    /*-------------------------------------------------------------*/ int orientation (Endpts vx)

{ int perm;

        /* perm = +1/-1 if the number of row swaps is even/odd */ perm = load_matrix_5 (vx);
```

```
            return (perm * sign_of_det (5));
        }

/* DELAUNAY ------------------------------------------------------*/
        /* Return FALSE if point f contradicts delaunayhood of the 4-simplex vx.  */
        /*---------------------------------------------------------------*/ int delaunay (Endpts vx, int f)
        { int i, perm, sign6, sign5;
            /* perm = +1/-1 if the number of row swaps is even/odd */
            perm = load_matrix_6 (vx, f);
            sign6 = perm * sign_of_det (6);
            sign5 = orientation (vx);
            /* return TRUE/FALSE if two determinants have different/same signs  */
            return If(sign6 != sign5, TRUE, FALSE);
        }

20
```

```
/*------------------------------------------------------------*/
/*   ../morphing/mktbl.c                         */
/*                                               */
/*                                               */
/*------------------------------------------------------------*/ include "morph.h"

typedef struct bucket_type
{
    int ref;            /* simplex reference (encoded index)   */
    int next;           /* pointer (index) to next node in bucket */
} Bucket_node;

int **Bu;               /* two rows of buckets or stacks       */
Bucket_node *Nd;        /* all buckets are embedded in array Nd */

/* PRINT BUCKETS --------------------------------FOR DEBUGGING ONLY */
/* Print the contents of all buckets, for Bu[0..1][0..sx0].         */
/* This function is used only for debugging and should be removed.  */
```

```
            /*----------------------------------------------------------------*/ void print_buckets ()

{ int i, j, from;
upfor (from, 0, 1)

upfor (i, 0, mrfi->sx0) { printf("\n Bu[%d][%d]:", from, i);

j = Bu[from][i];
                        while (j != NIL) { printf(" %d", Nd[j].ref);

j = Nd[j].next;

}

}
            }

/* INIT BUCKETS ----------------------------------------------*/

/* Initialize the array of buckets or stacks, Bu[0..1][1..sx0], parallel   */

/* to the array of vertices.  Bu[0][0] is used as bucket of free nodes.    */

            /* Initialize all bucket nodes, Nd[0..Ndsize], to belong to free bucket.   */

/*----------------------------------------------------------------*/
```

```
        void init_buckets ()
        { int i, Ndsize;

Bu = (int **) malloc (2 * sizeof(int*));
            Bu[0] = (int *) malloc ((mrfi->sx0+1) * sizeof(int));
            Bu[1] = (int *) malloc ((mrfi->sx0+1) * sizeof(int));

upfor (i, 0, mrfi->sx0) {
                Bu[0][i] = NIL;
                Bu[1][i] = NIL;
            }
            Bu[0][0] = 0;     /* points to the first bucket node */

Ndsize = 6*mrfi->sx30 + 9*mrfi->sx21 + 9*mrfi->sx12 + 6*mrfi->sx03;
            Nd = MALLOC (Bucket_node, (Ndsize+1));
            upfor (i, 0, Ndsize) {
                Nd[i].ref = NIL;
                Nd[i].next = i+1;
            }
            Nd[Ndsize].next = NIL;
        }
```

```
/* PUSH ----------------------------------------------------------------*/
/* Push new node storing a simplex reference onto jth bucket. To simplify */
/* the simultaneous collection and spreading of items in radix sort, the  */
/* j-th bucket is really two buckets: Bu[0][j] and Bu[1][j].              */
```
```
/*----------------------------------------------------------------------*/ void push (int to, int j, int ref)

{ int mu;   /* pointer to a bucket node */
```

```
        Assert_always ((0 < j) && (j <= mrfi->sx0));

Assert_always (Bu[0][0] != NIL);   /* Bu[0][0] contains a free node */ mu = Bu[0][0];    /* first free bucket node */

Bu[0][0] = Nd[mu].next;

Nd[mu].ref = ref;
```
```
        Nd[mu].next = Bu[to][j];

Bu[to][j] = mu;

}
```

```
        /* POP ----------------------------------------------------------------*/
```
```
        /* Pop a node from j-th bucket, Bu[from][j]. The reference stored in the */

/* node is returned and the node is moved back to the bucket of free nodes. */
```

149

```
       /*------------------------------------------------------------*/ int pop (int from, int j)

{ int mu; int ref;
           Assert_always ((0 < j) && (j <= mrfi->sx0));

mu = Bu[from][j];

Assert_always (mu != NIL);

ref = Nd[mu].ref;

           Bu[from][j] = Nd[mu].next;

Nd[mu].ref = NIL;

Nd[mu].next = Bu[0][0];

Bu[0][0] = mu;

return ref;

       }

/* IS EMPTY ---------------------------------------------------*/
       /* Decide whether or not bucket Bu[i][j] is empty.            */
       /*------------------------------------------------------------*/
           int is_empty (int i, int j)
```

150

```
        {
            Assert_always ((0 < j) && (j <= mrfi->sx0));

return If(Bu[i][j] == NIL, TRUE, FALSE);

}
        /* ENDCODE REF ----------------------------------------------------*/

/* Encode the address of face of 4-simplex Cx[s] in a single integer.    */
        /* 5 boolean variables indicate which of the 5 vertices span the face.    */
        /*----------------------------------------------------------------*/

        int encode_ref (int s, int b0, int b1, int b2, int b3, int b4)

{
            Assert_always (s < (1 << 27));

return ((s<<5) + (b4<<4) + (b3<<3) + (b2<<2) + (b1<<1) + b0);

}
        /* REF TO 4SX ----------------------------------------------------*/

/* Compute index of 4-simplex that contains simplex specified by reference. */
        /*----------------------------------------------------------------*/

        int ref_to_4sx (int ref)

{
```

```
          return (ref >> 5);

}

/* REF TO DIM --------------------------------------------------*/

      /* Compute the dimension of a simplex specified by reference.   */

/*--------------------------------------------------------------*/ int ref_to_dim (int ref)

{ int j, k;
          k = -1;

upfor (j, 0, 4) { if ((ref % 2) == 1)  k++;

ref = ref >> 1;
          } return k;

}

/* REF TO TYPE -------------------------------------------------*/

       /* Compute the type (dimPQ) of a simplex specified by reference. */

/*--------------------------------------------------------------*/
```

```
    int ref_to_type (int ref)

{ int j, s, dimP, dimQ;

s = ref_to_4sx (ref);
        dimP = dimQ = -1;
        upfor (j, 0, 4) {
            if ((ref % 2) == 1) {
                if (j <= Cx[s].dimP) dimP++;
                else dimQ++;
            }
            ref = ref >> 1;
        } /* end for */
        return (10*dimP + dimQ);
    }
    /* ORDER VX ----------------------------------------------------------*/
    /* Order vertex indices of k-simplex vx[0..k] in increasing order.     */
    /* The method is insertion sort.                                       */
    /*--------------------------------------------------------------------*/
    void order_vx (Endpts vx, int k)
```

```
        { int i, j, tmp;

upfor (i, 1, k) { j = i;

                while (j >= 1 && vx[j] < vx[j-1]) { tmp = vx[j]; vx[j] = vx[j-1]; vx[j-1] = tmp;

j--;

}

} /* end for */

        }
```

```
        /* REF TO VERTEX -------------------------------------------------------*/

/* Return index of l-smallest vertex (0 <= l <= 4) of simplex specified by */

/* reference, ref. All indices are computed, sorted, and l-th is returned. */

        /* The ordering is necessary for radix sort because the same simplex face */

/* of different 4-simplices can otherwise have different vertex sequences. */

/*--------------------------------------------------------------------*/ int ref_to_vertex (int ref, int l)

        { int j, k, s;

Endpts vx;
```

154

```
         s = ref_to_4sx (ref);

Assert_always (PQ == 0);

join (vx, Cx[s].dimP, Cx[s].sigmaP, Cx[s].sigmaQ);

k = -1;

         upfor (j, 0, 4) { if ((ref % 2) == 1) { k++;

vx[k] = vx[j];

}

              ref = ref >> 1;

} /* end for */ order_vx (vx, k);

Assert_always (0 <= 1 && 1 <= k);

return (vx[l]);

    }

/* REF IS SAME ---------------------------------------------------------*/

/* Return TRUE/FALSE if two simplices specified by reference as faces of  */

/* possibly different 4-simplices are the same/different.                 */

20  /*----------------------------------------------------------------------*/
```

```
        int ref_is_same (int ref1, int ref2)
      { int k, l, answer;

k = ref_to_dim (ref1);
           if (k != ref_to_dim (ref2))
              return FALSE;
           else {
              answer = TRUE;
              upfor (l, 0, k)
                  if (ref_to_vertex (ref1, l) != ref_to_vertex(ref2, l))
                     answer = FALSE;
              return answer;
           }
      }
      /* REF IS HULL WITNESS ------------------------------------------*/
      /* Reference, ref, specifies a 4-simplex and face of it.  Return TRUE/FALSE */
      /* if 4-simplex contains frontier 3-simplex (on bd conv) containing face.  */
      /* TRUE implies face belongs to frontier, FALSE leaves both options open. */
20    /*-----------------------------------------------------------------*/
```

```
     int ref_is_hull_witness (int ref)

{ int j, s, hull;

s = ref_to_4sx (ref);
         hull = FALSE;
         upfor (j, 0, 4) {
             if (((ref % 2) == 0) && (Cx[s].adj[j] == NIL))
                 hull = TRUE;
             ref = ref >> 1;
         }
         return hull;
     }

/* REF TO FREEVTX ----------------------------------------------------------*/
     /* Return index l (0 <= l <= 4) so l is only vertex of 4-simplex that is   */
     /* not vertex of 3-simplex specified by ref.  adj[j] points to neighboring */
     /* 4-simplex sharing the 3-simplex.                                        */
     /*-------------------------------------------------------------------------*/

     int ref_to_freevtx (int ref)
     { int l;
```

```
        Assert_always (ref_to_dim (ref) == 3);

l = 0;

while ((ref % 2) == 1) { l++; ref = ref >> 1;

       } return l;

}

/* RADIX INIT ----------------------------------------------------*/

    /* Initialize radix sort of all k-simplices (with multiple copies, one per */

/* containing 4-simplex). The k-simplices are extracted from 4-simplices  */

/* and collected in bucket Bu[0][1].                                */

/*---------------------------------------------------------------*/

    void radix_init (int k)

{ int s;

upfor (s, 1, mrfi->sx4) { switch (k) {

                case 1: /* 1-simplices connecting P and Q */ switch(Cx[s].dimP) {
```

```
            case 0:  push (0, 1, encode_ref (s, 1, 1, 0, 0, 0));
                     push (0, 1, encode_ref (s, 1, 0, 1, 0, 0));
                     push (0, 1, encode_ref (s, 1, 0, 0, 1, 0));
                     push (0, 1, encode_ref (s, 1, 0, 0, 0, 1));
                     break;
            case 1:  push (0, 1, encode_ref (s, 1, 0, 1, 0, 0));
                     push (0, 1, encode_ref (s, 1, 0, 0, 1, 0));
                     push (0, 1, encode_ref (s, 1, 0, 0, 0, 1));
                     push (0, 1, encode_ref (s, 0, 1, 1, 0, 0));
                     push (0, 1, encode_ref (s, 0, 1, 0, 1, 0));
                     push (0, 1, encode_ref (s, 0, 1, 0, 0, 1));
                     break;
            case 2:  push (0, 1, encode_ref (s, 1, 0, 0, 1, 0));
                     push (0, 1, encode_ref (s, 1, 0, 0, 0, 1));
                     push (0, 1, encode_ref (s, 0, 1, 0, 1, 0));
                     push (0, 1, encode_ref (s, 0, 1, 0, 0, 1));
                     push (0, 1, encode_ref (s, 0, 0, 1, 1, 0));
                     push (0, 1, encode_ref (s, 0, 0, 1, 0, 1));
                     break;
            case 3:  push (0, 1, encode_ref (s, 1, 0, 0, 0, 1));
                     push (0, 1, encode_ref (s, 0, 1, 0, 0, 1));
```

```
                    push (0, 1, encode_ref (s, 0, 0, 1, 0, 1));

push (0, 1, encode_ref (s, 0, 0, 0, 1, 1));

break;

}
            break;

case 2: /* 2-simplices connecting P and Q */
            switch(Cx[s].dimP) {
                case 0: push (0, 1, encode_ref (s, 1, 1, 1, 0, 0));

push (0, 1, encode_ref (s, 1, 1, 0, 1, 0));

                    push (0, 1, encode_ref (s, 1, 1, 0, 0, 1));

push (0, 1, encode_ref (s, 1, 0, 1, 1, 0));

push (0, 1, encode_ref (s, 1, 0, 1, 0, 1));

push (0, 1, encode_ref (s, 1, 0, 0, 1, 1));

break;

                case 1: push (0, 1, encode_ref (s, 1, 1, 1, 0, 0));

push (0, 1, encode_ref (s, 1, 1, 0, 1, 0));

push (0, 1, encode_ref (s, 1, 1, 0, 0, 1));

push (0, 1, encode_ref (s, 1, 0, 1, 1, 0));

push (0, 1, encode_ref (s, 1, 0, 1, 0, 1));

20                  push (0, 1, encode_ref (s, 1, 0, 0, 1, 1));

push (0, 1, encode_ref (s, 0, 1, 1, 1, 0));
```

```
                    push (0, 1, encode_ref (s, 0, 1, 1, 0, 1));

push (0, 1, encode_ref (s, 0, 1, 0, 1, 1));

break;

case 2: push (0, 1, encode_ref (s, 1, 1, 0, 1, 0));

push (0, 1, encode_ref (s, 1, 1, 0, 0, 1));

push (0, 1, encode_ref (s, 1, 0, 1, 1, 0));

push (0, 1, encode_ref (s, 1, 0, 1, 0, 1));

push (0, 1, encode_ref (s, 0, 1, 1, 1, 0));

push (0, 1, encode_ref (s, 0, 1, 1, 0, 1));

push (0, 1, encode_ref (s, 1, 0, 0, 1, 1));

push (0, 1, encode_ref (s, 0, 1, 0, 1, 1));

push (0, 1, encode_ref (s, 0, 0, 1, 1, 1));

break;

case 3: push (0, 1, encode_ref (s, 1, 1, 0, 0, 1));

push (0, 1, encode_ref (s, 1, 0, 1, 0, 1));

push (0, 1, encode_ref (s, 1, 0, 0, 1, 1));

push (0, 1, encode_ref (s, 0, 1, 1, 0, 1));

push (0, 1, encode_ref (s, 0, 1, 0, 1, 1));

push (0, 1, encode_ref (s, 0, 0, 1, 1, 1));

break;
        }
```

```
                break;
        case 3: /* 3-simplices connecting P and Q */
            switch(Cx[s].dimP) {
                case 0: push (0, 1, encode_ref (s, 1, 1, 1, 1, 0));
                        push (0, 1, encode_ref (s, 1, 1, 1, 0, 1));
                        push (0, 1, encode_ref (s, 1, 1, 0, 1, 1));
                        push (0, 1, encode_ref (s, 1, 0, 1, 1, 1));
                    break;
                case 1: push (0, 1, encode_ref (s, 1, 1, 1, 1, 0));
                        push (0, 1, encode_ref (s, 1, 1, 1, 0, 1));
                        push (0, 1, encode_ref (s, 1, 1, 0, 1, 1));
                        push (0, 1, encode_ref (s, 1, 0, 1, 1, 1));
                        push (0, 1, encode_ref (s, 0, 1, 1, 1, 1));
                    break;
                case 2: push (0, 1, encode_ref (s, 1, 1, 1, 1, 0));
                        push (0, 1, encode_ref (s, 1, 1, 1, 0, 1));
                        push (0, 1, encode_ref (s, 1, 1, 0, 1, 1));
                        push (0, 1, encode_ref (s, 1, 0, 1, 1, 1));
                        push (0, 1, encode_ref (s, 0, 1, 1, 1, 1));
                    break;
                case 3: push (0, 1, encode_ref (s, 1, 1, 1, 0, 1));
```

```
                    push (0, 1, encode_ref (s, 1, 1, 0, 1, 1));

push (0, 1, encode_ref (s, 1, 0, 1, 1, 1));

push (0, 1, encode_ref (s, 0, 1, 1, 1, 1));

break;

5               } break;

} /* end switch (k) */

} /* end upfor */

}

/* RADIX SPREAD ------------------------------------------------------*/

/* Do k+1 iterations of bucket sort, spreading the references to the    */

/* buckets corresponding to the vertex indices of the k-simplices.      */

/*-------------------------------------------------------------------*/

void radix_spread (int k)

{ int l, i, j, ref, tmp;

downfor (l, k, 0) {

          upfor (j, 1, mrfi->sx0)

while (! is_empty (0, j)) {
```

```
                ref = pop (0, j);

i = ref_to_vertex (ref, 1);

push (1, i, ref);

} /* end while */
upfor (j, 1, mrfi->sx0) {

Assert_always (Bu[0][j] == NIL);

tmp = Bu[0][j]; Bu[0][j] = Bu[1][j]; Bu[1][j] = tmp;

}
        } /* end downfor */

}

/* RADIX COUNT ---------------------------------------------------------*/

/* Count the number of different simplices stored in the buckets.  They are */
    /* all the same dimension, and multiple simplices occur contiguously.       */

/* Duplicates are eliminated by saving only one copy.  At the same time,    */

/* global counters are adjusted using hull to indicate whether or not the   */

/* last simplex belongs to the frontier (bd conv).                          */

/*---------------------------------------------------------------------*/
            void radix_count ()
```

```
    { int j, last, curr, hull;

upfor (j, 1, mrfi->sx0) {
        if (! is_empty (0, j)) {
          last = pop (0, j);
          hull = ref_is_hull_witness (last);
          while (! is_empty (0, j)) {
            curr = pop (0, j);
            if (ref_is_same (last, curr)) {
              if (! hull)
                hull = ref_is_hull_witness (curr);
            }
            else {
              push (1, j, last);
              increment_info (hull, ref_to_type (last));
              hull = ref_is_hull_witness (curr);
            }
            last = curr;
          } /* end while */
          push (1, j, last);
          increment_info (hull, ref_to_type (last));
```

```
          } /* end if */
        } /* end upfor */
      }
         /* RADIX COLLECT ------------------------------------------------*/
         /* Collect the simplices stored in the buckets.  Each simplex occurs only  */
         /* once, and its reference is copied to the appropriate simplex table.     */
         /*------------------------------------------------------------------*/ void radix_collect (Mrf_ksx *T)
         { int t, j, ref;

t = 0;
           upfor (j, 1, mrfi->sx0) {
             while (! is_empty (1, j)) {
                 ref = pop (1, j);
                 t++;
                 T[t].ref = ref;
             } /* end while */
           } /* end for j */
20       }
```

```
        /* MAKE TABLES ----------------------------------------------------------*/

/* Create the simplex tables, T1, T2, T3, storing status information about */

/* 1-, 2-, 3-simplices connecting points of P with points of Q.          */

/*----------------------------------------------------------------------*/
        void make_tables ()

{ int k, t;

Mrf_ksx *T;   /* T[1..t] */ double time_total, time_terminal;

        printf("\nmake_tables ...\n");

/* measure CPU time */ time_total    =  basic_utime ();

time_terminal = basic_seconds ();

        /* buckets have been initialized earlier (in connect_Cx) and are ready */

/* to be used for radix sort                              */ upfor (k, 1, 3) { radix_init (k);

radix_spread (k);

            radix_count ();
```

```
        switch (k) { case 1: mrf_tbls->T1 = MALLOC (Mrf_ksx, mrfi->vX+1);

radix_collect (mrf_tbls->T1);

break;

            case 2: mrf_tbls->T2 = MALLOC (Mrf_ksx, mrfi->eX+1);

radix_collect (mrf_tbls->T2);

break;

case 3: mrf_tbls->T3 = MALLOC (Mrf_ksx, mrfi->fX+1);

radix_collect (mrf_tbls->T3);

            break;

} /* end switch */

} time_total =   basic_utime () -  time_total;

15      time_terminal = basic_seconds () - time_terminal;

print ("\n\tTotal CPU time used: %.2f sec\n", time_total);

print ("\tReal time:      %.2f sec\n", time_terminal);

}

20
```

```
       /*-----------------------------------------------------------*/
       /*  ../morphing/morph.c                                    */
       /*                                                         */
       /*                                                         */
   5   /*-----------------------------------------------------------*/ include "morph.h"

include <sys/types.h>

     Mrf *mrf_tbls;

Mrf_cx *Cx; int Cxsize;

Mrf_info *mrfi;

Alf_adt alf1, alf2;

     Alf_vect *coords;

typedef struct alf_vertex_key_type

{ int min_ef;

     } Alf_vertex_key;

Alf_vertex_key *Pv_table, *Qv_table;
```

```
/* CREATE VERTEX EF --------------------------TO BE MOVE TO ALF LIBRARY */
/* For each vertex compute an edge-facet reference with origin the vertex.  */
/* Store the references in an array parallel to the vertex array. This      */
/* array is used for retrieval by alf_vertex_ef.                            */
/*------------------------------------------------------------------------*/ void create_vertex_ef ()
{ int f, fef, i, v;

Pv_table = MALLOC(Alf_vertex_key, (mrfi->vP+1));
    Qv_table = MALLOC(Alf_vertex_key, (mrfi->vQ+1));

BZERO (Pv_table, Alf_vertex_key, mrfi->vP+1);
    BZERO (Qv_table, Alf_vertex_key, mrfi->vQ+1);

alf_set_context(alf1);
    trist_for(f) {
        fef = EdFacet(f, 0);
        upfor (i, 0, 2) {
            fef = Enext(fef);
```

```
                v = Org(fef);

Pv_table[v].min_ef = fef;

Assert_always (fef > = 0);

} /* end for i */
        } /* end trist_for */ alf_set_context(alf2);

trist_for(f) { fef = EdFacet(f, 0);

            upfor (i, 0, 2) { fef = Enext(fef);

v = Org(fef) - mrfi->vP;

Qv_table[v].min_ef = fef;

Assert_always (fef > = 0);

            } /* end for i */

} /* end trist_for */

}

/* ALF VERTEX EF -------------------------------TO BE MOVED TO ALF LIBRARY */
    /* Return an edge-facet references with given origin, ix.  fromQ is TRUE    */

/* (FALSE) if the point and edge-facet are from Q and Del Q (P and Del P).  */
```

```
        /* This function should eventually be moved to the alf library.          */

/*---------------------------------------------------------------*/ int alf_vertex_ef (int fromQ, int ix)
        {
            if (! fromQ) {
                Assert_always (1 <= ix && ix <= mrfi->vP);
                return Pv_table[ix].min_ef;
            }
            else {
                Assert_always (1+mrfi->vP <= ix && ix <= mrfi->sx0);
                return Qv_table[ix-mrfi->vP].min_ef;
            }
        }
        /* INIT INFO ---------------------------------------------------*/
        /* Initialize the info variables with 0 or the numbers for DelP and DelQ.   */
        /*---------------------------------------------------------------*/

        void init_info ()
        {
```

```
        Alf_info *alfi;

mrfi = MALLOC (Mrf_info, 1);

        alf_set_context(alf1);

alfi = alf_info();

mrfi->vP = alfi->n;

mrfi->eP = alfi->dt_num.e;

mrfi->fP = alfi->dt_num.f;

        mrfi->tP = alfi->dt_num.t;

mrfi->vhP = alfi->dt_num.vh;

mrfi->ehP = alfi->dt_num.eh;

mrfi->fhP = alfi->dt_num.fh;

mrfi->ePmax = alfi->edge_index_max;

        mrfi->tPmax = alfi->tetra_index_max;

alf_set_context(alf2);

alfi = alf_info();

mrfi->vQ = alfi->n;

        mrfi->eQ = alfi->dt_num.e;

mrfi->fQ = alfi->dt_num.f;
```

```
        mrfi->tQ    = alfi->dt_num.t;

mrfi->vhQ   = alfi->dt_num.vh;

mrfi->ehQ   = alfi->dt_num.eh;

mrfi->fhQ   = alfi->dt_num.fh;

       mrfi->eQmax = alfi->edge_index_max;

mrfi->tQmax = alfi->tetra_index_max;

mrfi->vX   = mrfi->eX   = mrfi->fX   = mrfi->tX = 0;

mrfi->triX = mrfi->qdrX = 0;

        mrfi->tetX = mrfi->priX = 0;

mrfi->vhX   = mrfi->ehX   = mrfi->fhX = 0;

mrfi->trihX = mrfi->qdrhX = 0;

mrfi->sx00 = 0;

        mrfi->sx10 = mrfi->sx01 = 0;

mrfi->sx20 = mrfi->sx11 = mrfi->sx02 = 0;

mrfi->sx30 = mrfi->sx21 = mrfi->sx12 = mrfi->sx03 = 0;

mrfi->sx0 = mrfi->vP + mrfi->vQ;

        mrfi->sx1 = mrfi->eP + mrfi->eQ;

mrfi->sx2 = mrfi->fP + mrfi->fQ;
```

```
            mrfi->sx3 = mrfi->tP + mrfi->tQ;

mrfi->sx4 = 0;

mrfi->flatCx = 0;

}

/* INCREMENT INFO ----------------------------------------------------*/

/* Increment the global counters for a simplex of given type. The boolean, */

/* hull, indicates whether or not simplex belongs to frontier (bd conv).   */

/*-------------------------------------------------------------------*/

void increment_info (int hull, int dimPQ)

{ switch (dimPQ) { case 00: mrfi->sx1++; mrfi->sx00++; mrfi->vX++;
                      break;

case 10: mrfi->sx2++; mrfi->sx10++; mrfi->eX++;
                      break;

case 01: mrfi->sx2++; mrfi->sx01++; mrfi->eX++;
                      break;

                case 20: mrfi->sx3++; mrfi->sx20++; mrfi->fX++; mrfi->triX++;
                      break;
```

```
            case 11:  mrfi->sx3++;  mrfi->sx11++;  mrfi->fX++;  mrfi->qdrX++;
                break;

case 02:  mrfi->sx3++;  mrfi->sx02++;  mrfi->fX++;  mrfi->triX++;
                break;

            case 30:  mrfi->sx4++;  mrfi->sx30++;  mrfi->tX++;  mrfi->tetX++;
                break;

case 21:  mrfi->sx4++;  mrfi->sx21++;  mrfi->tX++;  mrfi->priX++;
                break;

case 12:  mrfi->sx4++;  mrfi->sx12++;  mrfi->tX++;  mrfi->priX++;
                break;

case 03:  mrfi->sx4++;  mrfi->sx03++;  mrfi->tX++;  mrfi->tetX++;
                break;

} /* end switch */

        if (hull) { switch (dimPQ) { case 00:  mrfi->vhX++;
                    break;

case 10:  mrfi->ehX++;
                    break;

case 01:  mrfi->ehX++;
```

```
                    break;
            case 20: mrfi->fhX++;  mrfi->trihX++;
                    break;
            case 11: mrfi->fhX++;  mrfi->qdrhX++;
                    break;
            case 02: mrfi->fhX++;  mrfi->trihX++;
                    break;
        } /* end switch */
      } /* end if (hull) */
    }

/* INIT CX ------------------------------------------------------------*/
    /* Initialize array of 4-simplices, Cx[1..Cxsize]; set all fields to -1.  */
    /*--------------------------------------------------------------------*/
    void init_Cx ()

{ int s, j;

Cxsize = mrfi->fP + mrfi->tP + mrfi->fQ + mrfi->tQ;
        Cx = MALLOC (Mrf_cx, Cxsize+1);
```

```
         upfor(s, 0, Cxsize) {

Cx[s].dimP = -1;

Cx[s].sigmaP = NIL;

Cx[s].sigmaQ = NIL;

             upfor (j, 0, 4)

Cx[s].adj[j] = NIL;

} /* end for s */

}

     /* COPY 4SX ----------------------------------------------------------*/

/* Copy a 4-simplex from one complex (array) to another.           */

/*-------------------------------------------------------------------*/ void copy_4sx (Mrf_cx *Cx1, int s1, Mrf_cx *Cx2, int s2)

     { int j;

Cx2[s2].dimP   = Cx1[s1].dimP;

Cx2[s2].sigmaP = Cx1[s1].sigmaP;

Cx2[s2].sigmaQ = Cx1[s1].sigmaQ;

         upfor (j, 0, 4)

Cx2[s2].adj[j] = Cx1[s1].adj[j];
```

}

```
        /* DOUBLE CX ------------------------------------------------------------*/

/* Double the size of the 4-complex (array Cx).  Twice the amount of memory */
        /* of the old array is allocated, the old array is copied and then freed.   */

/*----------------------------------------------------------------------*/ int double_Cx ()

{ int s;

          Mrf_cx *Cx2;

printf("\n[resizing from %d to %d 4-simplices ... ", Cxsize, 2*Cxsize);

Cx2 = MALLOC (Mrf_cx, 2*Cxsize + 1);

upfor (s, 0, Cxsize)

copy_4sx (Cx, s, Cx2, s);

            upfor (s, Cxsize+1, 2*Cxsize)

copy_4sx (Cx, 0, Cx2, s);        /* Cx[0] is the empty 4-simplex */ free (Cx);

Cx = Cx2;

printf("done]\n");

            return (2*Cxsize);

}
```

```
        /* COMPACTIFY CX -------------------------------------------------*/
        /* Free the extra memory not needed for the 4-complex (array Cx).    */
        /*-----------------------------------------------------------------*/

        int compactify_Cx ()

{ int s;

Mrf_cx *Cx2;

Cx2 = MALLOC (Mrf_cx, mrfi->sx4 + 1);
            upfor (s, 0, mrfi->sx4)

copy_4sx (Cx, s, Cx2, s);

free (Cx);

Cx = Cx2;

return mrfi->sx4;
        }

/* MAIN ---------------------------------------------------------*/
        /* The simplicial 4-complex, Cx, is constructed by first collecting all    */
        /* Delaunay 4-simplices and then connecting adjacent pairs.          */
20      /*-----------------------------------------------------------------*/
```

```
         main (int argc, char **argv)
         {
             char fileP[80], fileQ[80];
             FILE *fptP, fptQ;
             Dt *dt1, *dt2;
             char *data_path1, *data_path2;
             char *dt_path1, *dt_path2;
             char *alf_path1, *alf_path2;
             if(argc != 3) {
                 printf("USAGE: morph file1 file2\n");
                 return -1;
             }
             else {
                 dt_path1 = MALLOC (char, (int) strlen (argv[1]) + 3);
                 dt_path2 = MALLOC (char, (int) strlen (argv[2]) + 3);
                 alf_path1 = MALLOC (char, (int) strlen (argv[1]) + 4);
                 alf_path2 = MALLOC (char, (int) strlen (argv[2]) + 4);
                 data_path1 = strdup (argv[1]);
                 data_path2 = strdup (argv[2]);
```

```
        strcat (strcpy(dt_path1, data_path1), ".dt");

strcat (strcpy(dt_path2, data_path2), ".dt");

strcat (strcpy(alf_path1, data_path1), ".alf");

strcat (strcpy(alf_path2, data_path2), ".alf");
     } alf1 = alf_load_all (data_path1, dt_path1, alf_path1);

alf2 = alf_load_all (data_path2, dt_path2, alf_path2);

     alf_set_context(alf1); dt1 = alf_dt();

alf_set_context(alf2); dt2 = alf_dt();

coords = alf_get_coords_all();

init_info ();

     /* construct 4-complex, Cx */ create_vertex_ef ();

init_Cx ();

fill_Cx ();

     connect_Cx ();

#if 0
```

```
        print_Cx ();

#endif

/* construct simplex tables, T1, T2, T3, T4 */

        mrf_tbls = MALLOC (Mrf, 1);

make_tables ();

if 0 print_table (1);

print_table (2);

        print_table (3);

#endif

/* summarize results */ print_info ();

/* check correctness of 4-complex and of simplex tables */ checking ();

printf("\n\n");

        basic_malloc_info_print(stdout);

}
```

BANNER & ALLEGRETTI, LTD.
10 South Wacker Drive
Chicago, Illinois 60606
Telephone (312) 715-1000
Facsimile (312) 715-1234

183

```
        /*---------------------------------------------------------------*/
        /*   ../morphing/print.c                          */
        /*                                            */
        /*                                            */
 5      /*---------------------------------------------------------------*/ include "morph.h"

typedef struct Stax_type
        {
            int path_n;    /* number of matching paths;    path_n = fP + fQ      */
            int path_l;    /* number of tetrahedra in path                       */
            int path_lt;   /* total path length;      path_lt = priX + flatCx   */
            int link_n;    /* number of link traversals;  link_n = path_n + path_lt */
            int link_s;    /* size of links in edge path                         */
            int link_stt;  /* total size of traversed links                      */
            int link_st;   /* total link size                                    */
                           /* link_st = 2(tP+tQ) + 2(vP+vQ) + (ehP+ehQ) - (vhP+vhQ) */
        } Stax;
            Stax stax;
```

```
     /* PRINT MATRIX -------------------------------------FOR DEBUGGING ONLY */

/* Print the matrix M[0..k-1,0..k-1]; mostly used for debugging purposes.   */

/*-------------------------------------------------------------------*/

     void print_matrix (Vector row, Vector col, int k, Matrix M)

{ int i, j;

upfor (i, 0, k-1) { printf("\n");

           upfor (j, 0, k-1)

printf("%d ", M[row[i]][col[j]]);

}

}

     /* PRINT VECTOR -------------------------------------FOR DEBUGGING ONLY */

/* Print a vector v[0..k-1]; mostly used for debugging purposes.         */

/*-------------------------------------------------------------------*/ void print_vector (Vector v, int k)

20   { int i;
```

```
        printf("\n");
        upfor (i, 0, k-1)
            printf("%d ", v[i]);
    }

    /* PRINT ENDPTS -------------------------------------FOR DEBUGGING ONLY */
    /* Print the indices of the endpoints of a 4-simplex.            */
    /*------------------------------------------------------------------*/void print_endpts (Endpts vx)
    { int j;

printf(" endpts:");
        upfor(j, 0, 4)
            printf(" %d", vx[j]);

    }
        /* PRINT CX ----------------------------------------FOR DEBUGGING ONLY */
    /* Print the 4-simplex array, Cx[1..sx4].                        */
    /*------------------------------------------------------------------*/
        void print_Cx ()
```

```
        { int s, j;

Endpts vx; extern Mrf_cx *Cx;

Assert_always (PQ == 0);
            upfor (s, 1, mrfi->sx4) {
                printf("\nCx[%d]  dimP: %d", s, Cx[s].dimP);
                join (vx, Cx[s].dimP, Cx[s].sigmaP, Cx[s].sigmaQ);
                print_endpts (vx);
                printf("  adjcnt:");
                upfor (j, 0, 4)
                    printf(" %d", Cx[s].adj[j]);
                if (is_flat_4sx (vx))
                    printf("  *FLAT*");
            }
        }

/* INIT GLOBAL STAT ---------------------------------------------------*/
        /* Initialize variables collecting statistics of all matching path.    */
        /*--------------------------------------------------------------------*/
            void init_global_stat ()
```

```
        {
            stax.path_n  = 0;
            stax.path_lt = 0;
            stax.link_stt = 0;
        }

/* INIT LOCAL STAT ----------------------------------------------------*/
        /* Initialize variables collecting statistics of single matching path.  */
        /* At the same time, increment the number of paths.                     */
        /*---------------------------------------------------------------------*/ void init_local_stat ()
        {
            stax.path_n ++;
            stax.path_l = 0;
            stax.link_s = 0;
        }

/* INCR PATH LENGHT ---------------------------------------------------*/
        /* Increment the path length by one 4-simplex.                         */
        /*---------------------------------------------------------------------*/
```

```
        void incr_path_length ()

{ stax.path_l ++;

stax.path_lt ++;

        }

/* INCR LINK SIZE ------------------------------------------------*/

/* Increment the link size by one vertex.                        */

/*---------------------------------------------------------------*/

void incr_link_size ()

{ stax.link_s ++;

stax.link_stt ++;

        }

/* PRINT GLOBAL STAT ---------------------------------------------*/

/* Print global statistics: number of paths, average path length, and  */

/* average (individual) link size.                               */

        /*---------------------------------------------------------------*/
```

BANNER & ALLEGRETTI, LTD.
10 South Wacker Drive
Chicago, Illinois 60606
Telephone (312) 715-1000
Facsimile (312) 715-1234

```
     void print_global_stat ()

{ printf("\n\n  4-simplices collected:       %d", mrfi->sx4);

printf("\n  flat 4-simplices refused:    %d", mrfi->flatCx);

Assert_always (stax.path_n == mrfi->fP + mrfi->fQ);

Assert_always (stax.path_lt == mrfi->priX + mrfi->flatCx);

stax.link_n = stax.path_n + stax.path_lt;

stax.link_st = 2 * (mrfi->tP + mrfi->tQ) + 2 * (mrfi->vP + mrfi->vQ)
                        + (mrfi->ehP + mrfi->ehQ) - (mrfi->vhP + mrfi->vhQ);

printf("\n\n  matching paths traversed:    %d", stax.path_n);

printf("\n  average path length:         %f  tetrahedra", (float) stax.path_lt/stax.path_n);

         printf("\n  average traversed link size: %f  vertices", (float) stax.link_stt/stax.link_n);

printf("\n  average link size:           %f  vertices \n", (float) stax.link_st/(mrfi->vP + mrfi->vQ));

}
         /* PRINT LOCAL STAT ----------------------------------------------*/
```

```
        /* Print local statistics: path length and combined link size for path.   */
        /*--------------------------------------------------------------*/ void print_local_stat ()
        { static int i = 1;

if (i == 1) printf("\n ");

printf("%d(%d) ", stax.path_l, stax.link_s);

if (i < 10) i++;
           else i = 1;
        }

/* PRINT TABLE ---------------------------------------FOR DEBUGGING ONLY */
        /* Print a table, T1[1..vX], T2[1..eX], T3[1..fX], or T4[1..tX].     */
        /*--------------------------------------------------------------*/ void print_table (int k)
        { int t, s, j, tmax, ref; int b, dimPQ, dimP, dimQ;

Mrf_ksx *T;

20
                switch (k) {
```

```
            case 1: T = mrf_tbls->T1;  tmax = mrfi->vX;
               break;
            case 2: T = mrf_tbls->T2;  tmax = mrfi->eX;
               break;
            case 3: T = mrf_tbls->T3;  tmax = mrfi->fX;
               break;
            case 4: T = mrf_tbls->T4;  tmax = mrfi->tX;
               break;
         } /* end switch */
         printf("\n");
         upfor (t, 1, tmax) {
            ref = T[t].ref;
            s = ref_to_4sx (ref);
            printf("\nT%d[%d]  ref: %d in Cx[%d]", k, t, ref, s);
            printf("  vts: ");
            upfor (j, 0, 4) {
               b = ref % 2;
               printf(" %d", b);
20             ref = ref >> 1;
            }
```

```
                ref = T[t].ref;

dimPQ = ref_to_type (ref);

dimQ = dimPQ % 10;  dimP = (dimPQ - dimQ) / 10;

printf(" type: %d%d", dimP, dimQ);

                printf(" endpts:");

upfor (j, 0, k)

printf(" %d", ref_to_vertex (ref, j));

}

}

/* PRINT INFO ---------------------------------------------------------*/

/* Print information about the 4-complex, including number of simplices  */
    /* in DelP, DelQ, a cross-section of Cx, and Cx itself.  Most numbers are */
    /* printed in form of Euler relations, which are also evaluated.          */
    /*----------------------------------------------------------------------*/ void print_info ()
    {
        printf("\n\n  |  Number of simplices in DelP, DelQ, X_t, and Cx.");
        /* Euler characteristics */
```

```
         printf("\n |\n |   %d =  vP - eP + fP - tP     = %d - %d + %d - %d",
             mrfi->vP - mrfi->eP + mrfi->fP - mrfi->tP,
             mrfi->vP, mrfi->eP, mrfi->fP, mrfi->tP);
         printf("\n |   %d =  vQ - eQ + fQ - tQ     = %d - %d + %d - %d",
             mrfi->vQ - mrfi->eQ + mrfi->fQ - mrfi->tQ,
             mrfi->vQ, mrfi->eQ, mrfi->fQ, mrfi->tQ);
         printf("\n |   %d =      vX - eX + fX - tX = %d - %d + %d - %d",
             mrfi->vX - mrfi->eX + mrfi->fX - mrfi->tX,
             mrfi->vX, mrfi->eX, mrfi->fX, mrfi->tX);
         printf("\n |   %d = s0 - s1 + s2 - s3 + s4 = %d - %d + %d - %d + %d",
             mrfi->sx0 - mrfi->sx1 + mrfi->sx2 - mrfi->sx3 + mrfi->sx4,
             mrfi->sx0, mrfi->sx1, mrfi->sx2, mrfi->sx3, mrfi->sx4);
         printf("\n |\n |   %d = vhP - ehP + fhP       = %d - %d + %d",
             mrfi->vhP - mrfi->ehP + mrfi->fhP,
             mrfi->vhP, mrfi->ehP, mrfi->fhP);
         printf("\n |   %d = vhQ - ehQ + fhQ       = %d - %d + %d",
             mrfi->vhQ - mrfi->ehQ + mrfi->fhQ,
             mrfi->vhQ, mrfi->ehQ, mrfi->fhQ);
         printf("\n |   %d =     vhX - ehX + fhX   = %d - %d + %d",
             mrfi->vhX - mrfi->ehX + mrfi->fhX,
             mrfi->vhX, mrfi->ehX, mrfi->fhX);
```

BANNER & ALLEGRETTI, LTD.
10 South Wacker Drive
Chicago, Illinois 60606
Telephone (312) 715-1000
Facsimile (312) 715-1234

```
                        /* different types of simplices */ printf("\n |\n  |  fX  =         triX  + qdrX   =  %d + %d", mrfi->triX, mrfi->qdrX);

printf("\n  |  tX  =         tetX  + priX   =  %d + %d",
                                mrfi->tetX, mrfi->priX);

printf("\n  |  fhX =         trihX + qdrhX  =  %d + %d", mrfi->trihX, mrfi->qdrhX);

printf("\n |\n  |  vX  =              s00    =  %d", mrfi->sx00);

                        printf("\n  |  eX  =         s10  + s01    =  %d + %d", mrfi->sx10, mrfi->sx01);

printf("\n  |  fX  =      s20 + s11 + s02   =  %d + %d + %d", mrfi->sx20, mrfi->sx11, mrfi->sx02);

printf("\n  |  tX  =  s30 + s21 + s12 + s03 =  %d + %d + %d + %d",
                                mrfi->sx30, mrfi->sx21, mrfi->sx12, mrfi->sx03);

}
```

What is claimed is:

1. A method of geometric morphing between a first object having a first shape and a second object having a second shape comprising the steps in combination:

generating a first Delaunay complex corresponding to said first shape and a second Delaunay complex corresponding to said second shape;

generating a plurality of intermediary Delaunay complexes defined by a continuous family of mixed shapes corresponding to a mixing of said first shape and said second shape;

extracting a plurality of alpha complexes corresponding to said plurality of intermediary Delaunay complexes:

generating a first alpha complex corresponding to said first shape and a second alpha complex corresponding to said second shape;

constructing a first skin corresponding to said first alpha complex and a second skin corresponding to said second alpha complex;

constructing a plurality of intermediary skins corresponding to said plurality of alpha complexes; and visually displaying said first skin, said second skin and one or more of said plurality of intermediary skins on an output device.

2. A method as in claim 1 wherein said first Delaunay complex and said second Delaunay complexes and said plurality of intermediary Delaunay complexes are three dimensional complexes.

3. A method as in claim 1 further including the steps of:

receiving from a measuring device a first point set corresponding to said first object and a second point set corresponding to said second object; and generating said first Delaunay complex from said first point set and said second Delaunay complex from said second point set.

4. A method as in claim 1 wherein said first shape defines a first 4-dimensional convex polytope, said second shape defines a second 4-dimensional convex polytope, and said plurality of intermediary Delaunay complexes correspond to Minkowksi sums formed between said first 4-dimensional convex polytope and said second 4-dimensional convex polytope.

5. A method as in claim 1 further including the step of continuously varying the scale degree of detail in said plurality of intermediary skins produced by variable morphing paths.

6. A method as in claim 1 wherein said continuous family of mixed shapes further depends on at least a third object.

7. A method as in claim 1 wherein said morphing proceeds with different speed at different parts of space.

8. A method as in claim 1 wherein said method is carried out by a computer program embodied in a tangible medium.

9. A method as in claim 8 wherein said tangible medium is selected from the group consisting of a floppy diskette, a hard disk, a CD-ROM and a network.

10. A method as in claim 1 wherein said method is a machine-executable method in a computer system which executes a computer program, the computer system including a storage unit, a central processing unit, input means for providing input data to the storage unit and central processing unit, and output means for providing discernible indications of actions performed by the central processing unit.

11. A method of transforming a source shape corresponding to a source object to a target shape corresponding to a target object comprising the steps in combination:

storing in a memory a first set of data points corresponding to said source shape and a second set of data points corresponding to said target shape;

generating a four dimensional simplical complex corresponding to said source shape and said target shape; and extracting one or more mixed shapes from one or more cross-sections of said four dimensional simplical complex, each of said mixed shapes depending on said source shape and said target shape;

constructing one or more skins, each of said skins corresponding to one or more of said mixed shapes; and displaying one or more of said skins on an output device.

12. A method as in claim 11 wherein said four dimensional simplical complex is a weighted Delaunay complex, and said generating step comprises, in combination:

constructing a source Delaunay complex corresponding to said source shape;

constructing a target Delaunay complex corresponding to said target shape;

generating a collection of 4-simplices corresponding to predetermined simplice types; and adding 3-simplices connecting said 4-simplices.

13. A method as in claim 11 wherein said four dimensional simplical complex is a weighted Delaunay complex, and said generating step comprises, in combination:

constructing a source Delaunay complex corresponding to said source shape;

storing said source Delaunay complex in a memory;

constructing a target Delaunay complex corresponding to said target shape;

storing said target Delaunay complex in said memory;

determining connecting simplices of said weighted Delaunay complex that connect said source Delaunay complex and said target Delaunay complex;

generating a collection of 4-simplices corresponding to said connecting simplices;

storing said collection of 4-simplices in a first and a second data structure, said first data structure representing said collection of said connecting simplices and used for determining adjacancies in said collection of 4-simplices, and said second data structure storing a first, second, third and fourth table corresponding to each dimension and used for generating size curves and unattachment intervals corresponding to said 4-simplices.

14. A method as in claim 11 wherein said step of extracting a mixed shape comprises, in combination:

generating a plurality of tables of k-simplices each containing table items;

detecting whether at least one of said k-simplices in said tables is unattached;

detecting whether at least one of said k-simplices in said tables has a coface in said mixed shape;

detecting whether at least one of said k-simplices in said tables has size less than or equal to a predetermined value; and adding a cross section of at least one of said k-simplices to said mixed shape.

15. A method as in claim 11 wherein said method is an encoded machine-readable computer program stored on a storage medium.

16. A method as in claim 11 further including the step of measuring with a measuring device a first set of data points corresponding to said source shape and a second set of data points corresponding to said target shape.

17. A method as in claim 11 wherein said output device is selected from the group consisting of a video display, a graphic monitor and a virtual reality system.

18. Apparatus for graphically transforming a source shape to a target shape comprising, in combination:
- a storage device for storing a first data point set corresponding to said source shape and a second data point set corresponding to said target shape;
- a memory for storing a series of computer instructions and data structures;
- a microprocessor for executing said series of computer instructions, said microprocessor generating a first Delaunay complex and a first skin corresponding to said first data point set, said microprocessor generating a second Delaunay complex and a second skin corresponding to said second data point set, said microprocessor generating a plurality of alpha complexes corresponding to the transformation of said source shape to said target shape, and said microprocessor generating a plurality of skins corresponding to said plurality of alpha complexes;
- an output device for graphically depicting said first skin, said second skin, and one or more of said plurality of skins.

19. Apparatus as in claim 18 wherein said output device is selected from the group consisting of a video display, a graphic monitor and a virtual environment apparatus.

20. Apparatus as in claim 18 further comprising a measuring device for generating said first data point set and said second data point set.

21. Apparatus as in claim 20 wherein said measuring device is selected from the group consisting of a nuclear magnetic resonance apparatus, a cat scan apparatus, a digital scanner and a laser range finder.

22. Apparatus for graphically transforming a first geometric object to a second geometric object comprising, in combination:
- measuring means for generating a first point set corresponding to said first object and generating a second point set corresponding to said second object;
- storage means for storing said first data point set and said second data point set;
- generating means for:
  (a) generating a first combinatorial representation of said first data point set;
  (b) generating a second combinatorial representation of said second data point set;
  (c) defining a motion between said first point set and said second point set and between said first combinatorial representation and said second combinatorial representation; and
- transforming said first combinatorial representation into said second combinatorial representation in response to said motion.

23. Apparatus as in claim 22 wherein said first combinatorial representation is a first alpha complex and said second combinatorial representation is a second alpha complex.

* * * * *